(12) United States Patent
Park et al.

(10) Patent No.: US 10,182,234 B2
(45) Date of Patent: Jan. 15, 2019

(54) METHOD AND APPARATUS FOR APPLYING VIEW SYNTHESIZED PREDICTION ACCORDING TO ILLUMINATION COMPENSATION

(71) Applicant: SAMSUNG ELECTRONICS CO., LTD., Suwon-si (KR)

(72) Inventors: Min-woo Park, Yongin-si (KR); Jin-young Lee, Hwaseong-si (KR); Ho-cheon Wey, Seongnam-si (KR); Yong-jin Cho, Seoul (KR); Byeong-doo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 297 days.

(21) Appl. No.: 15/098,544

(22) Filed: Apr. 14, 2016

(65) Prior Publication Data

US 2016/0249059 A1   Aug. 25, 2016

Related U.S. Application Data

(63) Continuation of application No. PCT/KR2014/009642, filed on Oct. 14, 2014.
(Continued)

(51) Int. Cl.
*H04N 19/159* (2014.01)
*H04N 19/187* (2014.01)
(Continued)

(52) U.S. Cl.
CPC ......... *H04N 19/159* (2014.11); *H04N 19/105* (2014.11); *H04N 19/176* (2014.11);
(Continued)

(58) Field of Classification Search
CPC .. H04N 19/159; H04N 19/105; H04N 19/176; H04N 19/186; H04N 19/187;
(Continued)

(56) References Cited

U.S. PATENT DOCUMENTS 8,948,264 B2    2/2015  Park et al.
2010/0098157 A1*  4/2010  Yang ................... H04N 19/597
                                                  375/240.12
(Continued)

FOREIGN PATENT DOCUMENTS

KR    10-2009-0076762 A    7/2009
KR    10-2013-0085388 A    7/2013

OTHER PUBLICATIONS

Jewon Kang, et al. "CE4.h related: Coding of illumination compensation flag.", JCT3V document JCT3V-E0135, Jul. 27, 2013, pp. 1-9.
(Continued)

*Primary Examiner* — Marnie A Matt
(74) *Attorney, Agent, or Firm* — Sughrue Mion, PLLC

(57) ABSTRACT

An inter-layer video decoding method is described including reconstructing a color image and a depth image of a first layer based on encoding information about the color image and the depth image of the first layer obtained from a bitstream. When it is determined that a prediction mode of a current block of a second layer image to be decoded is a view synthesized prediction mode based on an image synthesized from the first layer image a determination is made whether to perform luminance compensation on the second layer current block to be reconstructed. Use of the view synthesized prediction mode to reconstruct the second layer current block depends on the luminance compensation determination.

11 Claims, 28 Drawing Sheets

Related U.S. Application Data

(60) Provisional application No. 61/890,432, filed on Oct. 14, 2013.

(51) Int. Cl.
*H04N 19/176* (2014.01)
*H04N 19/105* (2014.01)
*H04N 19/597* (2014.01)
*H04N 19/30* (2014.01)
*H04N 19/186* (2014.01)
*H04N 19/96* (2014.01)

(52) U.S. Cl.
CPC ......... *H04N 19/186* (2014.11); *H04N 19/187* (2014.11); *H04N 19/30* (2014.11); *H04N 19/597* (2014.11); *H04N 19/96* (2014.11)

(58) Field of Classification Search
CPC ...... H04N 19/30; H04N 19/597; H04N 19/96; G09G 2320/0233
USPC .................................................... 375/240.13
See application file for complete search history.

(56) References Cited

U.S. PATENT DOCUMENTS

| | | | | | |
|---|---|---|---|---|---|
| 2013/0028322 | A1* | 1/2013 | Fujibayashi | ........... | H04N 19/61 375/240.12 |
| 2013/0176389 | A1* | 7/2013 | Chen | ................... | H04N 19/597 348/43 |
| 2013/0194505 | A1* | 8/2013 | Pahalawatta | ............. | H04N 5/21 348/607 |
| 2013/0243085 | A1* | 9/2013 | Kovliga | ............... | H04N 19/597 375/240.12 |
| 2014/0028793 | A1* | 1/2014 | Wiegand | ............ | H04N 13/0011 348/42 |
| 2014/0085415 | A1* | 3/2014 | Bici | ................. | H04N 19/00769 348/43 |
| 2014/0139627 | A1* | 5/2014 | Chen | ................... | H04N 13/0048 348/43 |
| 2014/0253681 | A1* | 9/2014 | Zhang | ............... | H04N 13/0048 348/43 |
| 2014/0341292 | A1* | 11/2014 | Schwarz | .................... | H04N 19/597 375/240.16 |
| 2014/0348232 | A1* | 11/2014 | Leontaris | ............. | H04N 19/597 375/240.12 |
| 2015/0010074 | A1* | 1/2015 | Choi | ..................... | H04N 19/51 375/240.12 |
| 2015/0023422 | A1* | 1/2015 | Zhang | .................... | H04N 19/51 375/240.16 |
| 2015/0181229 | A1* | 6/2015 | Lin | ........................ | H04N 19/31 375/240.02 |
| 2015/0326881 | A1* | 11/2015 | Ikai | ...................... | H04N 19/117 375/240.12 |
| 2015/0382019 | A1* | 12/2015 | Chen | ................... | H04N 19/597 348/43 |
| 2016/0150238 | A1* | 5/2016 | Park | .................... | H04N 19/103 375/240.08 |
| 2016/0212446 | A1* | 7/2016 | Liu | ...................... | H04N 19/597 |

OTHER PUBLICATIONS

International Search Report for PCT/KR2014/009642 dated Jan. 19, 2015 [PCT/ISA/210].
Written Opinion for PCT/KR2014/009642 dated Jan. 19, 2015 [PCT/ISA/237].

* cited by examiner

REFERENCE PICTURE          CURRENT PICTURE

CODING UNIT (1010)

METHOD AND APPARATUS FOR APPLYING VIEW SYNTHESIZED PREDICTION ACCORDING TO ILLUMINATION COMPENSATION

TECHNICAL FIELD

The present invention relates to an inter-layer video decoding method and apparatus and an inter-layer video encoding method and apparatus. More specifically, the present invention relates to inter-layer video encoding and decoding methods and apparatuses that apply a view synthesized prediction mode to a current block according to luminance compensation.

BACKGROUND ART

As hardware for reproducing and storing high resolution or high quality video content is being developed and supplied, a need for a video codec for effectively encoding or decoding the high resolution or high quality video content is increasing. According to a video codec of the related art, a video is encoded according to a limited encoding method based on coding units of a tree structure.

Image data of a spatial domain is transformed into coefficients of a frequency domain via frequency transformation. According to a video codec, an image is split into blocks of predetermined size, discrete cosine transformation (DCT) is performed on each block, and frequency coefficients are encoded in block units, for rapid calculation of frequency transformation. Compared with image data of a spatial domain, coefficients of a frequency domain are easily compressed. In particular, since an image pixel value of a spatial domain is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated with small-sized data.

A multilayer video codec encodes and decodes a first layer video and one or more second layer videos. By removing temporal/spatial redundancies of the first layer video and the second layer video, and redundancies between layers, amounts of data of the first layer video and the second layer video may be reduced.

DETAILED DESCRIPTION OF THE INVENTION

Technical Problem

According to an embodiment of the present invention, there are provided inter-layer video encoding and decoding methods that are capable of improving encoding efficiency by determining whether to apply a view synthesized prediction mode to a current block according to luminance compensation.

Technical Solution

According to an embodiment of the present invention, there is provided inter-layer video encoding and decoding methods that are capable of encoding efficiency by determining whether to apply a view synthesized prediction mode to a current block according to luminance compensation.

Advantageous Effects of the Invention

Inter-layer video encoding and decoding efficiencies are improved.

BEST MODE

Figure 1A:
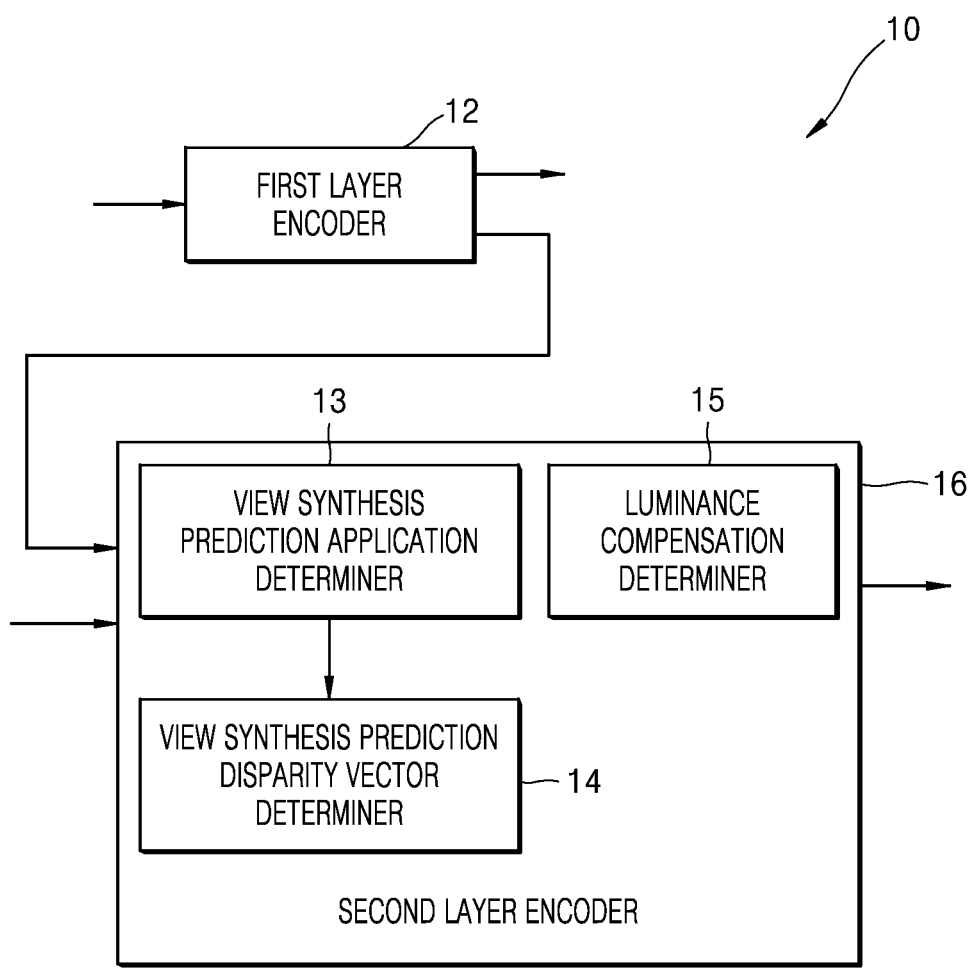
FIG. 1A illustrates a block diagram of an inter-layer video encoding apparatus, according to an embodiment.

An inter-layer video decoding method according to an embodiment includes: reconstructing a color image and a depth image of a first layer based on encoding information about the color image and the depth image of the first layer obtained from a bitstream; when it is determined that a prediction mode of a current block of a second layer image to be decoded is a view synthesized prediction mode wherein prediction is performed based on an image synthesized from the first layer image, determining whether to perform luminance compensation on the second layer current block to be reconstructed; and reconstructing the current block by determining whether to apply view synthesized prediction to the current block, according to a result of the determining of whether to perform the luminance compensation.

The determining of the prediction mode of the current block as the view synthesized prediction mode may include determining the prediction mode of the current block as the view synthesized prediction mode when a block selected for predicting the current block from among blocks temporally and spatially adjacent to the current block is decoded in the view synthesized prediction mode.

The determining of whether to apply the view synthesized prediction mode to the current block may include determining to apply the view synthesized prediction mode to the current block only when it is determined not to perform the luminance compensation.

The inter-layer video decoding method may further include: determining a depth correspondence block of the first layer by inferring an initial disparity vector for the current block, from the block selected for predicting the current block from among the blocks temporally and spatially adjacent to the current block; determining a depth value of the depth correspondence block and determining another disparity vector indicating a color correspondence block of the first layer with respect to the current block; and predicting the current block by referring to the color correspondence block of the first layer that the other disparity vector indicates.

When it is determined to perform the luminance compensation, the determining of whether to apply the view synthesized prediction mode to the current block may include determining not to apply the view synthesized prediction mode to the current block, and the inter-layer video decoding method may further include: determining a first layer reference block corresponding to the current block by inferring a disparity vector from the block selected for predicting the current block among the blocks temporally and spatially adjacent to the current block; and reconstructing the current block by predicting the current block by using the first layer reference block.

The inter-layer video decoding method may further include, when it is determined to perform the luminance compensation, compensating for a luminance difference between the first layer reference block and the second layer current block with respect to the current block.

An inter-layer video encoding method according to an embodiment includes: generating a bitstream including encoding information generated by encoding a color image and a depth image of a first layer; when it is determined that a prediction mode of a current block of a second layer image to be encoded is a view synthesized prediction mode wherein a current block is predicted based on an image synthesized from the first layer, determining whether to perform luminance compensation on the second layer current block to be reconstructed; and determining whether to apply the view synthesized prediction mode to the current block according to a result of the determining of whether to perform the luminance compensation, and encoding the current block.

The determining of the prediction mode of the current block as the view synthesized prediction mode may include determining the prediction mode of the current block as the view synthesized prediction mode when a block selected for predicting the current block from among blocks temporally and spatially adjacent to the current block is decoded in the view synthesized prediction mode.

The determining of whether to apply the view synthesized prediction mode to the current block may include determining to apply the view synthesized prediction mode to the current block only when it is determined not to perform the luminance compensation.

The inter-layer video encoding method may further include: determining a depth correspondence block of the first layer by inferring an initial disparity vector for the current block, from the block selected for predicting the current block from among the blocks temporally and spatially adjacent to the current block; determining a depth value of the depth correspondence block and determining another disparity vector indicating a color correspondence block of the first layer with respect to the current block; and predicting the current block by referring to the color correspondence block of the first layer that the other disparity vector indicates.

When it is determined to perform the luminance compensation, the determining of whether to apply the view synthesized prediction mode to the current block may include determining not to apply the view synthesized prediction mode to the current block, and the inter-layer video encoding method may further include: determining a first layer reference block corresponding to the current block by inferring a disparity vector from the block selected for predicting the current block among the blocks temporally and spatially adjacent to the current block; and reconstructing the current block by predicting the current block by using the first layer reference block.

The inter-layer video encoding method may further include, when it is determined to perform the luminance compensation, compensating for a luminance difference between the first layer reference block and the second layer current block with respect to the current block.

An inter-layer video decoding apparatus according to an embodiment includes: a first layer decoder configured to reconstruct a color image and a depth image of a first layer based on encoding information about the color image and the depth image of the first layer obtained from a bitstream; a luminance compensation determiner configured to, when it is determined that a prediction mode of a current block of a second layer image to be decoded is a view synthesized prediction mode wherein prediction is performed based on an image synthesized from a first layer image, determine whether to perform luminance compensation on the second layer current block to be reconstructed; and a second layer decoder configured to reconstruct the current block by determining whether to apply view synthesized prediction to the current block, according to a result of the determining of whether to perform the luminance compensation.

An inter-layer video encoding apparatus according to an embodiment includes: a first layer encoder configured to generate a bitstream including encoding information generated by encoding a color image and a depth image of a first layer; a luminance compensation determiner configured to, when it is determined that a prediction mode of a current block of a second layer image to be encoded is a view synthesized prediction mode wherein a current block is predicted based on an image synthesized from the first layer, determine whether to perform luminance compensation on the second layer current block to be reconstructed; and a second layer encoder configured to determine whether to apply the view synthesized prediction mode to the current block according to a result of the determining of whether to perform the luminance compensation, and encode the current block.

Provided is a computer-readable recording medium having stored thereon a program for performing the inter-layer video decoding method and the inter-layer video encoding method, according to an embodiment, on a computer.

MODE OF THE INVENTION

Hereinafter, an 'image' may indicate a still image of a video or a moving picture, i.e., the video itself.

Hereinafter, a 'sample' means data that is allocated to a sampling position of an image and is a processing target. For example, pixels in an image in a spatial domain may be samples.

Hereinafter, a "current block" may mean a block of an image to be encoded or decoded.

Hereinafter, a merge mode of encoding and decoding a current block by using neighboring blocks and a method of determining whether to apply view synthesized prediction on the current block are disclosed with reference to FIGS. 1A through 6. Also, an inter-layer video encoding method and an inter-layer video decoding method that determine a depth-based disparity vector for view synthesized prediction and perform view synthesized prediction on a current block by using the depth-based disparity vector are disclosed. Also, a method of determining whether to apply view synthesized prediction on a current block according to luminance compensation with respect to the current block is disclosed with reference to FIG. 7. A video encoding method and a video decoding method based on coding units of a tree structure, according to an embodiment, which are applicable to the inter-layer video encoding method and the inter-layer video decoding method proposed above, are disclosed with reference to FIGS. 8 through 20. Also, various embodiments to which the video encoding method and the video decoding method proposed above are applicable, are disclosed with reference to FIGS. 21 through 27.

Figure 1B:
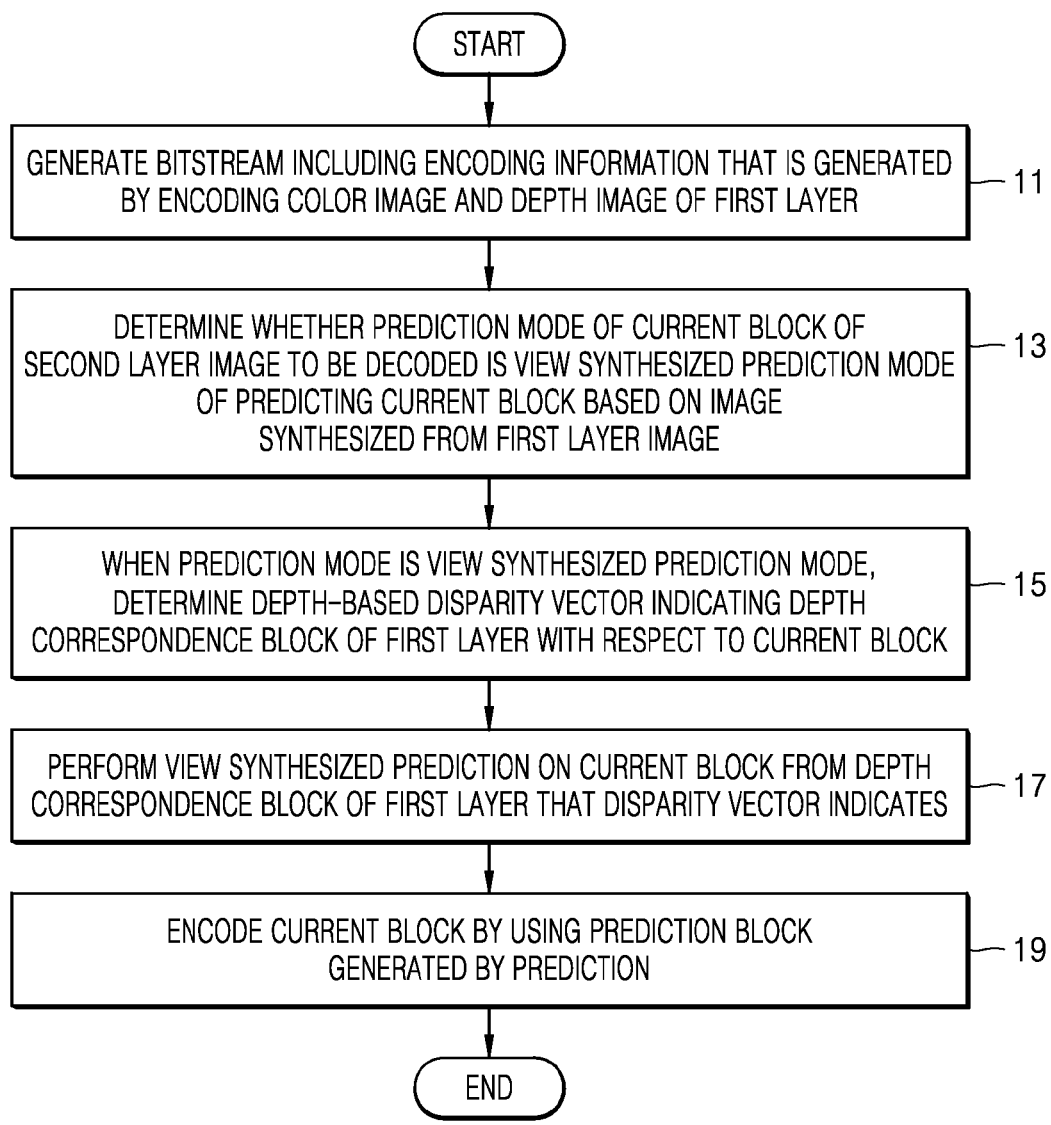
FIG. 1B illustrates a flowchart of an inter-layer video encoding method, according to an embodiment.

FIG. 1A illustrates a block diagram of an inter-layer video encoding apparatus 10 according to an embodiment. FIG. 1B illustrates a flowchart of an inter-layer video encoding method according to an embodiment.

The inter-layer video encoding apparatus 10 according to an embodiment includes a first layer encoder 12 and a second layer encoder 16. The second layer encoder 16 may include a view synthesis prediction application determiner 13, a view synthesis prediction disparity vector determiner 14, and a luminance compensation determiner 15. On the other hand, the view synthesis prediction application determiner 13 and the view synthesis prediction disparity vector determiner 14 may be positioned outside the second layer encoder 16.

The inter-layer video encoding apparatus 10 according to an embodiment may encode each of a plurality of image sequences according to layers in a similar manner to a scalable video coding technique, and may output a separate stream including encoded data of each of the layers. The inter-layer video encoding apparatus 10 may encode a first layer image sequence and a second layer image sequence to different layers.

The first layer encoder 12 may encode first layer images, and may output a first layer stream including encoded data of the first layer images.

The second layer encoder 16 may encode second layer images, and may output a second layer stream including encoded data of the second layer images.

The inter-layer video encoding apparatus 10 according to an embodiment may express the first layer stream and the second layer stream, as one bitstream, via a multiplexer, and may encode it.

For example, according to a scalable video coding method based on spatial scalability, low-resolution images may be encoded as the first layer images, and high-resolution images may be encoded as the second layer images. A result of encoding the first layer images may be output as a first layer stream, and a result of encoding the second layer images may be output as a second layer stream.

As another example, a multiview video may be encoded according to a scalable video coding method. Left-view images may be encoded as first layer images, and right-view images may be encoded as second layer images. Alternatively, center-view images, left-view images, and right-view images may be respectively encoded, wherein the center-view images may be encoded as first layer images, the left-view images may be encoded as second layer images, and the right-view images may be encoded as third layer images. Alternatively, A center-view color image, a center-view depth image, a left-view color image, a left-view depth image, a right-view color image, and a right-view depth image may be respectively encoded as a first layer image, a second layer image, a third layer image, a fourth layer image, a fifth layer image, and a sixth layer image. As another example, a center-view color image, a center-view depth image, a left-view depth image, a left-view color image, a right-view depth image, and a right-view color image may be respectively encoded as a first layer image, a second layer image, a third layer image, a fourth layer image, a fifth layer image, and a sixth layer image.

As another example, the scalable video coding method may be performed according to temporal hierarchical prediction based on temporal scalability. The first layer stream including encoding information may be output, wherein the encoding information is generated by encoding images of a base frame rate. Temporal levels may be classified according to frame rates, and may be encoded to extension layers, respectively. By further encoding images of a higher frame rate by referring to the images of the base frame rate, the second layer stream including encoding information of the high frame rate may be output.

Scalable video coding may be performed on a first layer and a plurality of extension layers (a second layer, a third layer, a $K_{th}$ layer). In the presence of three or more extension layers, first layer images and $K_{th}$ layer images may be encoded. Accordingly, a result of encoding the first layer images may be output as the first layer stream, and results of encoding the first layer images, second layers images, ..., $K_{th}$ layer images may be respectively output as first, second, ... $K_{th}$ layer streams.

The inter-layer video encoding apparatus 10 according to an embodiment may perform inter prediction for predicting a current image by referring to images in a single layer. Due to the inter prediction, a motion vector representing motion information between the current image and a reference image, and a residual component between the current image and the reference image may be predicted from a corresponding region of the first layer (a base layer).

Also, the inter-layer video encoding apparatus 10 may perform inter-layer prediction for predicting the second layer images by referring to the first layer images.

When the inter-layer video encoding apparatus 10 according to an embodiment allows three or more layers such as a first layer, a second layer, a third layer, etc., the inter-layer video encoding apparatus 10 may perform inter-layer prediction between a first layer image and a third layer image and may perform inter-layer prediction between a second layer image and the third layer image, according to a multi-layer prediction structure.

During the inter-layer prediction, a disparity vector between the current image and a reference image of another layer is inferred, a residual component that is a disparity component between the current image and a prediction image may be generated, wherein the prediction image is generated by using the reference image of the other layer.

The inter-layer video encoding apparatus 10 according to an embodiment encodes each of blocks of each of images of a video, according to layers. A type of a block may be a square, a rectangle, or a random geometric shape. The block is not limited to a data unit of a constant size. The block may be a largest coding unit, a coding unit, a prediction unit, a transformation unit, etc. from among coding units of a tree structure. A largest coding unit including coding units of a tree structure may be variously called a coding tree unit, a coding block tree, a block tree, a root block tree, a coding tree, a coding root, or a tree trunk. Video encoding and decoding methods using the coding units of a tree structure will be described with reference to FIGS. 8 through 20.

The inter prediction and the inter-layer prediction may be performed based on a data unit of the coding unit, the prediction unit, or the transformation unit.

The first layer encoder 12 according to an embodiment may generate symbol data by performing source coding operations including the inter prediction or intra prediction on the first layer images. The symbol data represents a sample value of each encoding parameter and a sample value of the residual.

For example, the encoder 12 may generate symbol data by performing the inter prediction or intra prediction, transformation, and quantization on samples of a data unit of the first layer images, and may generate the first layer stream by performing entropy encoding on the symbol data.

The second layer encoder 16 may encode the second layer images, based on the coding units of the tree structure. The second layer encoder 16 may generate symbol data by performing the inter/intra predictions, the transformation, and the quantization on samples of a coding unit of the second layer image, and may generate the second layer stream by performing entropy encoding on the symbol data.

The second layer encoder 16 according to an embodiment may perform inter-layer prediction to predict the second layer image, by using information (encoding prediction information, a decoded sample, etc.) about the first layer image. In order to encode a particular original second layer image among a second layer image sequence via the inter-layer prediction structure, the second layer encoder 16 may determine prediction information about a second layer current image by using prediction information about a reconstructed first layer image, may generate a predicted second layer image based on the determined prediction information, and thus may encode a prediction error between the original second layer image and the predicted second layer image.

The second layer encoder 16 may perform inter-layer prediction on the second layer image according to each block such as the coding unit or the prediction unit, and may determine a block of the first layer image to which a block of the second layer image is to be referred. For example, a reconstruction block of the first layer image which is positioned in correspondence to a position of a current block in the second layer image may be determined. The second layer encoder 16 may determine a second layer prediction block by using the first layer reconstruction block corresponding to the second layer block.

The second layer encoder 16 may use the second layer prediction block determined by using the first layer reconstruction block, as a reference image for inter-layer prediction on a second layer original block. The second layer encoder 16 may perform, by using the first layer reconstruction image, transformation and quantization on an error between a sample value of the second layer prediction block and a sample value of the second layer original block, i.e., a residual component according to inter-layer prediction, and thus may perform entropy encoding.

When the inter-layer video encoding apparatus 10 described above encodes a multiview video, the first layer image to be encoded may be a first view video, and the second layer image may be a second view image. Since these multiview images are captured at the same time, similarity according to images of each of the view is very high.

A disparity occurs in the multiview images since characteristics of a capturing position, a capturing angle, and an imaging tool (a camera, a lens, etc.) vary for each of the views. The disparity means a difference occurring between images of a plurality of views at the same time. Specifically, the disparity may mean a difference occurring between the same objects in images of a plurality of views. The disparity may be represented by a disparity vector (there are various methods of obtaining the disparity vector). The disparity vector means a vector representing a displacement of an object that occurs since a position of the object varies in images of a plurality of views at the same time zone according to a capturing position, a capturing angle, and an imaging tool. That is, the disparity vector may have meaning corresponding to an intra-view time-direction motion vector in a direction of view.

Encoding efficiency may be improved by performing disparity compensation prediction to find the most similar region to a block to be currently encoded in images of different views by using the disparity vector and performing encoding thereon.

The view synthesis prediction application determiner 13 may determine whether a prediction mode of the current block is a view synthesized prediction mode. That is, the view synthesis prediction application determiner 13 may determine a prediction method of minimizing a rate-distortion cost by predicting the current block by using various prediction methods, and determine the prediction mode of the current block according to the determined prediction method. In particular, the view synthesized prediction mode may be implemented by a merge mode. As one example of the merge mode, a merge candidate list may be generated by using motion (and mode) information about temporal/spatial neighboring blocks (33, 35, 34, 32, and 36 of FIG. 4A, and 45 and 44 of FIG. 4B), and one of merge candidates may be selected, and the current block may be predicted by using motion (and mode) information about the corresponding merge candidate as motion (and mode) information about the current block. The merge candidate list may vary for the current block to be encoded. A method of configuring the merge candidate will be described later with reference to FIG. 4. The inter-layer video decoding apparatus 20 may select the prediction method to be used to predict the current block from among the merge candidates by using a merge index included in a bitstream.

The process of determining the merge candidate may be performed in the same manner by the inter-layer video encoding apparatus 10 and the inter-layer video decoding apparatus 20. The merge candidate may be determined by using the encoded and decoded neighboring block or the encoding information of neighboring views.

When the neighboring block is encoded by using the view synthesized prediction mode, the view synthesis prediction application determiner 13 may determine the prediction mode of the current block as the view synthesized prediction mode. The same applies to the inter-layer video decoding apparatus 20.

When the luminance compensation determiner 15 determines to perform luminance compensation on the current block, the view synthesis prediction application determiner 13 may not apply the view synthesized prediction on the current block. This will be described later with reference to FIG. 7.

When the prediction mode of the current block is the view synthesized prediction mode, the view synthesis prediction disparity vector determiner 14 may determine a disparity vector for view synthesized prediction. The disparity vector for view synthesized prediction means a base disparity vector to be used for view synthesized prediction. Detailed descriptions thereof will be provided below with reference to FIG. 6. When the prediction mode of the current block is the view synthesized prediction mode, the view synthesis prediction disparity vector determiner 14 may determine a depth-based disparity vector as the disparity vector for view synthesized prediction.

The depth-based disparity vector means a vector determined based on a depth value of a depth image block of a first layer corresponding to a current block of a second layer.

For example, the view synthesis prediction disparity vector determiner 14 may determine the depth image block of the first layer corresponding to the block to be currently encoded, by using the disparity vector predicted by using the neighboring block of the current block or the disparity vector obtained by transforming a predetermined depth value. The view synthesis prediction disparity vector determiner 14 may determine a representative depth value by using the determined depth value of the depth image block of the first layer, and may determine the disparity vector by transforming the representative depth value. The determined disparity vector is a depth-based disparity vector because the determined disparity vector is a disparity vector determined by using the depth value of the depth image of the first layer.

For example, the view synthesis prediction disparity vector determiner 14 may determine the disparity vector by using the depth value of the depth image as follows:

$$\text{Disparity vector} = (s * \text{depth value} + o, 0) \quad \text{(Equation 1)}$$

For convenience, it is assumed that a y-component of the disparity vector, i.e., a vertical component, is 0. That is, it is assumed that a position of an object in an image is changed only horizontally, according to a change of a horizontal view in a multiview image (for example, in a case where a camera arrangement is horizontal). An x-component of the disparity vector may be calculated by multiplying s by the depth value and adding the result value to o. s is a scale factor, the depth value means a depth value of a particular pixel in a depth image, and o means an offset. The scale factor and the offset may be determined from camera parameters for a referred layer image. For example, the camera parameters may include a focal length of a camera and base line information of the camera. The base line information of the camera means information about a distance between lenses of the camera.

The depth image may store a depth value with respect to a predetermined pixel of a corresponding layer color image. The depth value may include information about a distance between a camera and a subject. For example, in a depth image having a bit depth of 8 bits, a maximum distance and a minimum distance may be mapped from 0 to 255. Since a distance and a displacement of a subject are in inverse proportion to each other, a displacement of each pixel may be estimated by using a depth value. Based on this, an image of a new view may be virtually generated. That is, the depth image may be used to provide a method of providing images of various views by synthesizing virtual views with images of small views.

For convenience, it has been assumed that the y-component of the disparity vector, i.e., the vertical component, is 0, but is not limited thereto. The vertical component may have a nonzero value. The y-component may be calculated as in the method of calculating the x-component in Equation 1.

The view synthesis prediction disparity vector determiner 14 may determine the disparity vector for inter-layer prediction, and transmit information about the determined disparity vector to the inter-layer video decoding apparatus 20 through the bitstream.

Also, the view synthesis prediction disparity vector determiner 14 may predict (or infer) the disparity vector from other encoding information (or encoded information) so as to reduce an amount of data that is transmitted based on prediction units.

For example, the disparity vector may be predicted from neighboring blocks of the block to be currently decoded. The second layer encoder 16 may perform view synthesized prediction on the block to be currently encoded, by using the disparity vector predicted (or inferred) from the neighboring blocks, and may find the most similar region to the block to be currently encoded.

Since the inter-layer video encoding apparatus 10 determines the disparity vector by using the depth image of the reference layer, a more similar region to the block to be currently encoded may be found when the view synthesized prediction is performed on the current block, as compared with the disparity vector predicted from the neighboring blocks, thereby improving encoding performance and prediction accuracy.

The depth-based disparity vector is not limited to the determining of the disparity vector by referring to the depth value of the depth image of the first layer, and may mean any disparity vectors determined by referring to the depth value. For example, the disparity vector may be determined by transforming a predetermined depth value (for example, 128; a median value when the depth value is expressed by 8 bits), and this disparity vector may also be referred to as a depth-based disparity vector. Also, when the depth image of the second layer is first decoded, the disparity vector may be determined by transforming the depth value of the depth image block corresponding to the current block of the second layer, and this disparity vector may also be referred to as a depth-based disparity vector.

When the depth-based disparity vector is determined, the view synthesis prediction disparity vector determiner 14 may determine the presence or absence of the disparity vector indicating the first layer image predicted based on the neighboring blocks adjacent to the current block and the depth-based disparity vector. The presence or absence of the disparity vector means the presence or absence of the corresponding disparity vector that has been previously predicted (or inferred). However, embodiments are not limited thereto. The absence of the disparity vector may mean whether the corresponding disparity vector is predictable (or inferable). For example, the view synthesis prediction disparity vector determiner 14 may not use the depth-based disparity vector. In this case, the view synthesis prediction disparity vector determiner 14 may determine not to use the depth-based disparity vector.

According to an embodiment, the determined information may be included in the bitstream and be transmitted to the inter-layer video decoding apparatus 20.

When the depth-based disparity vector is determined, the view synthesis prediction disparity vector determiner 14 may select the depth-based disparity vector when it is determined that both the disparity vector indicating the first layer image predicted based on the neighboring block adjacent to the current block and the depth-based disparity vector are present. As compared with the disparity vector inferred from the adjacent block, the use of the depth-based disparity vector may more accurately perform view synthesized prediction on the current block and thus select the depth-based disparity vector.

The depth-based disparity vector may be classified according to what is the disparity vector used to refer to the depth value of the depth image of the first layer at the first time.

For example, the depth-based disparity vector may include a disparity vector determined from only the depth image. That is, the disparity vector determined from only the depth image (hereinafter, referred to as a depth value disparity vector) may not use the disparity vector predicted by using the neighboring block, may refer to the depth image block of the first layer by using the disparity vector determined by transforming the predetermined depth value, and include the disparity vector predicted (or inferred) by using the depth value of the referred depth image block of the first layer. Also, the depth value disparity vector may refer to the depth image block of the first layer again by using the predicted (or inferred) disparity vector and include the disparity vector predicted (or inferred) by using the depth value of the referred depth image block of the first layer.

However, the depth value disparity vector is not limited thereto. When the disparity vector used to refer to the depth image block of the first layer at the first time is not a disparity vector predicted (or inferred) from the neighboring block, but is a disparity vector that refers to the depth image block of the first layer by using the disparity vector transformed by using a predetermined depth value, the disparity vector predicted (or inferred) by repeating the same process also is the depth value disparity vector.

The depth-based disparity vector may include a disparity vector (hereinafter, referred to as a depth oriented neighboring block disparity vector) that refers to the depth image block of the first layer by using the disparity vector predicted (or inferred) using the neighboring block predicted and is predicted by using the depth value of the depth image block of the first layer. Also, the depth oriented neighboring block disparity vector may include a disparity vector that refers to the depth image block of the first layer again by using the predicted (or inferred) disparity vector and is predicted by using the depth value of the referred depth image block of the first layer. However, the depth oriented neighboring block disparity vector is not limited thereto. When the disparity vector used to refer to the depth image block of the first layer at the first time is the disparity vector predicted (or inferred) from the neighboring block, the disparity vector predicted (or inferred) by using the above process by using this may also be called the depth oriented neighboring block disparity vector.

When the prediction mode of the current block is the view synthesized prediction mode, the view synthesis prediction disparity vector determiner 14 may generate a disparity vector by transforming a predetermined depth value, regardless of whether a disparity vector predicted using neighboring blocks is available, and infer a disparity vector indicating an image of a first layer by using the transformed disparity vector (that is, the depth value disparity vector).

When the prediction mode of the current block is the view synthesized prediction mode, the view synthesis prediction disparity vector determiner 14 may generate a disparity vector by transforming a predetermined depth value, without always using a disparity vector predicted (or inferred) by using neighboring blocks, and predict (or infer) a disparity vector indicating an image of a first layer by using the transformed disparity vector.

The second layer encoder 16 may perform view synthesized prediction on the current block from a depth correspondence block of the first layer that the predicted disparity vector indicates. That is, the second layer encoder 16 may perform view synthesized prediction on the current block by setting the predicted disparity vector as an initial disparity vector.

Details of the process by which the second layer encoder 16 performs view synthesized prediction on the current block are as follows.

The second layer encoder 16 determines a depth value of the depth correspondence block of the first layer that the initial disparity vector indicates. The second layer encoder 16 may determine another disparity vector indicating a color correspondence block of the first layer with respect to the current block, based on the determined depth value. The second layer encoder 16 may predict the current block by referring to the color correspondence block of the first layer that the other disparity vector indicates.

That is, the process of performing the view synthesized prediction on the current block includes: referring to the depth correspondence block of the first layer corresponding to the current block by using the initial disparity vector; predicting (inferring) the depth-based disparity vector by transforming the depth value of the referred depth correspondence block; and predicting the current block by referring to the color correspondence block of the first layer that the generated depth-based disparity vector indicates.

In this case, the initial disparity vector is a vector corresponding to the current block, but may be a disparity vector that refers to the depth value of the depth correspondence block of the first layer and is predicted (or inferred) by transforming the referred depth value. That is, the current block may be split into sub-blocks and a disparity vector may be generated for each of the split sub-blocks. The disparity vector of each of the sub-blocks of the current block may be used to refer to the color correspondence block of the first layer with respect to each of the sub-blocks.

The second layer encoder 16 may encode the current block by referring to the color correspondence block of each of the sub-blocks.

Specifically, the second layer encoder 16 may generate a prediction block of the current block by performing disparity compensation prediction on each of the sub-blocks. The view synthesized prediction will be described with reference to FIG. 6.

Hereinafter, the method of determining the depth-based disparity vector, which is performed by the inter-layer video encoding apparatus 10, according to an embodiment, will be described in detail with reference to FIGS. 4 through 7b.

The inter-layer video encoding apparatus 10 may perform, by using the first layer reconstruction image, transformation and quantization on an error between a sample value of a second layer prediction block and a sample value of a second layer original block, i.e., a residual component according to inter-layer prediction, and thus may perform entropy encoding. Also, entropy encoding may be performed on an error between pieces of prediction information.

As described above, the inter-layer video encoding apparatus 10 may encode a current layer image sequence by referring to first layer reconstruction images through an inter-layer prediction structure. However, the inter-layer video encoding apparatus according to an embodiment may encode a second layer image sequence according to a single layer prediction structure, without referring to other layer samples. Accordingly, it is not limited to construe that the inter-layer video encoding apparatus 10 performs only the inter prediction of the inter-layer prediction structure in order to encode the second layer image sequence.

Hereinafter, detailed operations of the inter-layer video encoding apparatus 10, which determines the depth-based disparity vector in order for inter-layer prediction, will be described with reference to FIG. 1B. In the following description, the first layer image may mean a reference view image, and the second layer image may mean an image of a view to be currently encoded.

As described above, when the inter-layer video encoding apparatus 10 encodes a multiview video, the first layer encoder 12 may encode a first view video, and the second layer encoder 16 may encode a second view video. Videos according to views may be captured by different cameras or may be obtained by using different lenses. Since characteristics of a capturing angle, illumination, or an imaging tool (a camera, a lens, etc.) for each of the views may vary, a phenomenon may occur whereby luminance is not identical in the videos obtained according to the views. Such luminance mismatch phenomenon may be related to a difference between sample values of the videos according to the views.

If luminance is not identical in the videos according to the views, an inter-layer prediction error is further increased such that encoding efficiency may be decreased. Accordingly, when the luminance compensation determiner 15 determines to perform luminance compensation by taking into account luminance inconsistency between views, the inter-layer video encoding apparatus 10 may compensate for a luminance difference in the videos according to the views and may encode the videos. For example, a luminance difference between a first view image encoded by the first layer encoder 12 and a second view image encoded by the second layer encoder 16 may be encoded. Since the luminance difference of the second view image with respect to the first view image is encoded, luminance may be compensated for when the second layer encoder 16 encodes a second view video.

According to an embodiment, a predetermined parameter may be used to compensate for a luminance difference between a first layer block and a second layer block.

The luminance compensation parameter for compensating for the luminance difference in a block unit may be transmitted while included in a bitstream, or may be determined by utilizing neighboring pixel values of a second layer current block and neighboring pixel values of a first layer reference block corresponding to the current block. For example, the luminance compensation parameter may infer the neighboring pixel values of a reference block corresponding to the neighboring pixel values of the current block by using a linear regression model or the like. Since a method of determining the luminance compensation parameter is obvious, descriptions thereof will be omitted.

FIG. 1B illustrates a flowchart of an inter-layer video encoding method according to an embodiment. FIG. 1B is a diagram for describing the inter-layer video encoding method performed by the inter-layer video encoding apparatus 10 illustrated in FIG. 1A. Accordingly, although omitted below, the contents described about the inter-layer video encoding apparatus 10 of FIG. 1A may also apply to the inter-layer video encoding method of the inter-layer video encoding apparatus 10 in FIG. 1B, according to an embodiment.

In operation 11, the first layer encoder 12 according to an embodiment may generate a bitstream including encoding information that is generated by encoding a color image and a depth image of a first layer.

In operation 13, the view synthesis prediction disparity vector determiner 14 according to an embodiment may determine whether a prediction mode of a current block of a second layer image to be decoded is a view synthesized prediction mode of predicting the current block based on an image synthesized from a first layer image.

In operation 15, when the prediction mode of the current block is the view synthesized prediction mode, the view synthesis prediction disparity vector determiner 14 according to an embodiment may determine a depth-based disparity vector indicating a depth image block of the first layer with respect to the current block.

The view synthesis prediction disparity vector determiner 14 may determine the depth image block of the first layer by using the depth-based disparity vector. At this time, the depth-based disparity vector means a disparity vector predicted (or inferred) based on a depth value.

For example, the depth-based disparity vector may be a disparity vector predicted based on a random depth value. Specifically, in the case of having an 8-bit depth, a range of the depth value is a depth value of 0 to 255. At this time, a disparity vector indicating a corresponding block of the first layer image corresponding to the current block may be predicted (or inferred) by using 128 that is a median value of the depth value.

Also, for example, the depth-based disparity vector may mean a disparity vector that infers an initial disparity vector from neighboring blocks, determines a corresponding block of a depth image of the first layer corresponding to the current block indicated by the inferred initial disparity vector, and is predicted (or inferred) based on a depth value of the determined corresponding block of the depth image.

When a second layer depth image corresponding to a second layer current block is available in a decoding stage, the view synthesis prediction disparity vector determiner 14 may determine that the disparity vector is predictable. This is because since a distance of a subject is inversely proportional to a disparity, a disparity vector of each pixel may be predicted by using a depth image corresponding to the second layer current block.

However, the contents that determine the disparity vector in order to determine the depth image block of the first layer are not limited thereto. The view synthesis prediction disparity vector determiner 14 may determine a disparity vector predicted (or inferred) in various forms and determine a depth image block by using the predicted disparity vector. That is, the view synthesis prediction disparity vector determiner 14 may previously predict (or infer) a disparity vector from a block including the current block, and may use the previously determined disparity vector in the process of performing view synthesized prediction on the current block. Alternatively, the view synthesis prediction disparity vector determiner 14 may previously determine a disparity vector while performing another process, not the process of performing view synthesized prediction on the current block, and may use the previously determined disparity vector in the process of performing view synthesized prediction on the current block.

Also, a new disparity vector may be predicted (or inferred) again by using the determined disparity vector, and a depth image block may be determined by using the new disparity vector. That is, by using disparity vectors of various forms, it is possible to determine the depth-based disparity vector indicating the depth image block of the first layer corresponding to the current block of the second layer image.

In operation 17, the second layer encoder 16 may perform view synthesized prediction on the current block from the depth correspondence block of the first layer that the disparity vector indicates. That is, the view synthesized prediction may be performed on the current block by setting the disparity vector as the initial disparity vector of the view synthesized prediction. The view synthesized prediction will be described later in detail with reference to FIG. 6.

In operation 19, the second layer encoder 16 may encode the current block by using the prediction block generated by the view synthesized prediction. The second layer encoder 16 may encode a residual component indicating a difference between a sample value of the prediction block predicted by view synthesis and an actual sample view of the actual current block.

The inter-layer video encoding apparatus 10 according to an embodiment may include a central processor (not shown) that generally controls the first layer encoder 12, the view synthesis prediction disparity vector determiner 14, and the second layer encoder 16. Alternatively, each of the first layer encoder 12, the view synthesis prediction disparity vector determiner 14, and the second layer encoder 16 may be driven by its own processor (not shown), and the processors (not shown) may interoperate with each other, so that the inter-layer video encoding apparatus 10 may operate. Alternatively, according to control by an external processor (not shown) of the inter-layer video encoding apparatus 10, the first layer encoder 12, the view synthesis prediction disparity vector determiner 14, and the second layer encoder 16 may be controlled.

The inter-layer video encoding apparatus 10 may include one or more data storage units (not shown) for storing input and output data of the first layer encoder 12, the view synthesis prediction disparity vector determiner 14, and the second layer encoder 16. The inter-layer video encoding apparatus 10 may include a memory controller (not shown) that manages an input and output of data of the one or more data storage units.

In order to output a video encoding result, the inter-layer video encoding apparatus 10 may operate in connection with an internal video encoding processor or an external video encoding processor so as to perform a video encoding operation including transformation. The internal video encoding processor of the inter-layer video encoding apparatus 10 may be a separate processor capable of performing a video encoding operation. Also, the inter-layer video encoding apparatus 10, a central processing unit (CPU), or a graphics processing unit (GPU) includes a video encoding processing module and thus performs a basic video encoding operation.

Figure 2A:
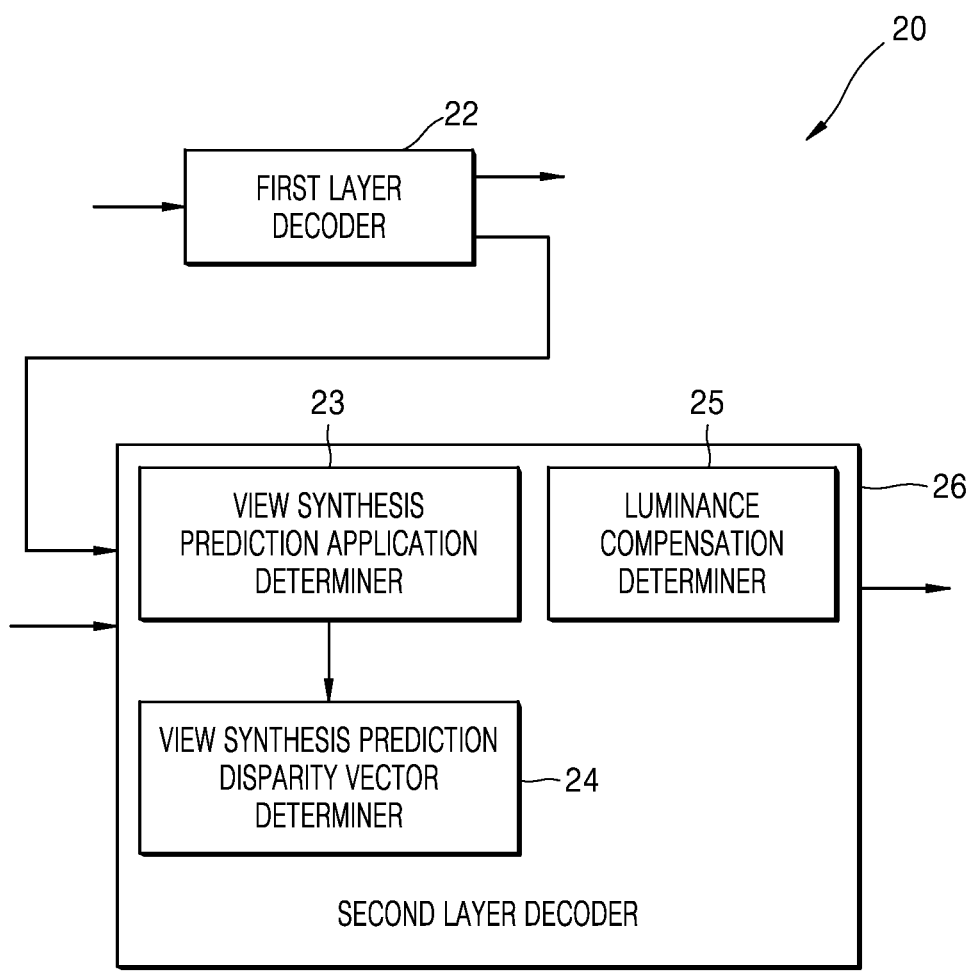
FIG. 2A illustrates a block diagram of an inter-layer video decoding apparatus, according to an embodiment.

FIG. 2A illustrates a block diagram of an inter-layer video decoding apparatus, according to an embodiment.

An inter-layer video decoding apparatus 20 according to an embodiment includes a first layer decoder 22, a view synthesis prediction application determiner 23, a view synthesis prediction disparity vector determiner 24, a second layer decoder 26, and a luminance compensation determiner 25. The view synthesis prediction disparity vector determiner 24 may be included in the second layer decoder 26. According to another embodiment, the view synthesis prediction application determiner 23 and the view synthesis prediction disparity vector determiner 24 may be positioned outside the second layer decoder 26.

The inter-layer video decoding apparatus 20 according to an embodiment may receive bitstreams according to layers, like the scalable encoding method. The number of layers of the bitstreams that the inter-layer video decoding apparatus 20 receives is not limited. However, for convenience of description, hereinafter, in an embodiment, the first layer decoder 22 of the inter-layer video decoding apparatus 20 receives and decodes a first layer stream, and the second layer decoder 26 receives and decodes a second layer stream.

For example, the inter-layer video decoding apparatus 20 based on spatial scalability may receive a stream in which image sequences having different resolutions are encoded to different layers. A low-resolution image sequence may be reconstructed by decoding the first layer stream, and a high-resolution image sequence may be reconstructed by decoding the second layer stream.

As another example, a multiview video may be decoded according to a scalable video coding technique. When a stereoscopic video stream having a plurality of layers is received, left-view images may be reconstructed by decoding the first layer stream. By further decoding the second layer stream in addition to the first layer stream, right-view images may be reconstructed.

Alternatively, when a multiview video stream having a plurality of layers is received, center-view images may be reconstructed by decoding the first layer stream. By further decoding the second layer stream in addition to the first layer stream, left-view images may be reconstructed. By further decoding a third layer stream in addition to the first layer stream, right-view images may be reconstructed. As another example, center-view color images may be reconstructed by decoding the first layer stream. By further decoding the second layer stream in addition to the first layer stream, center-view depth images may be reconstructed. By further decoding the third layer steam in addition to the first layer stream and the second layer stream, left-view color images may be reconstructed. By further decoding a fourth layer stream in addition to the second layer stream and the third layer stream, left-view depth images may be reconstructed. By further decoding a fifth layer stream in addition to the first layer stream and the second layer stream, right-view color images may be reconstructed. By further decoding a sixth layer stream in addition to the second layer stream and the fifth layer stream, right-view depth images may be reconstructed. As another example, center-view color images may be reconstructed by decoding the first layer stream. By further decoding the second layer stream in addition to the first layer stream, center-view depth images may be reconstructed. By further decoding the third layer stream in addition to the second layer stream, left-view depth images may be reconstructed. By further decoding the fourth layer stream in addition to the first layer stream and the third layer stream, left-view color images may be reconstructed. By further decoding the fifth layer stream in addition to the second layer stream, left-view depth images may be reconstructed. By further decoding the sixth layer stream in addition to the first layer stream and the fifth layer stream, right-view color images may be reconstructed.

As another example, a scalable video coding method based on temporal scalability may be performed. By decoding the first layer stream, images of a base frame rate may be reconstructed. By further decoding the second layer stream in addition to the first layer stream, images of a higher frame rate may be reconstructed.

In the presence of three or more extension layers, first layer images may be reconstructed from the first layer stream, and extension layer images may be further reconstructed by further decoding an extension layer stream by referring to the reconstructed first layer images. $K_{th}$ layer images may be further reconstructed by further decoding a $K_{th}$ layer stream by referring to the reconstructed extension layer images.

The inter-layer video decoding apparatus 20 may obtain encoded data of the first layer images and the second layer images from the first layer stream and the second layer stream, and may further obtain a motion vector generated by inter prediction, and prediction information generated by inter-layer prediction.

For example, the inter-layer video decoding apparatus 20 may decode inter-predicted data of each of layers, and may decode data that is inter-layer predicted between a plurality of layers. The reconstruction may be performed by using motion compensation and inter-layer decoding, based on a coding unit or a prediction unit.

Images of each layer stream may be reconstructed by performing motion compensation for a current image by referring to reconstructed images that are predicted via inter prediction using a same layer. The motion compensation means an operation of reconstructing a reconstructed image of the current image by using a reference image and a residual component of the current image, wherein the reference image is determined by using a motion vector of the current image.

Also, the inter-layer video decoding apparatus 20 may perform the inter-layer decoding by referring to prediction information about the first layer images, so as to reconstruct the second layer image predicted due to the inter-layer prediction. The inter-layer decoding means an operation of reconstructing prediction information about the current image by using prediction information about a reference block of another layer, so as to determine the prediction information about the current image.

The inter-layer video decoding apparatus 20 according to an embodiment may perform inter-layer decoding for reconstructing the third layer images predicted by referring to the second layer images. An inter-layer prediction structure will be described later in detail with reference to FIG. 3.

However, the second layer decoder 26 according to an embodiment may decode the second layer stream without referring to the first layer image sequence. Thus, it is not limited to construe that the second layer decoder 26 performs only inter-layer prediction in order to decode the second layer image sequence.

The inter-layer video decoding apparatus 20 decodes each of blocks of each of images of a video. The block may be a largest coding unit, a coding unit, a prediction unit, a transformation unit, etc. from among coding units of a tree structure.

The first layer decoder 22 may decode the first layer image by using encoding symbols of a parsed first layer image. If the inter-layer video decoding apparatus 20 receives streams that are encoded based on the coding units of the tree structure, the first layer decoder 22 may perform decoding on each largest coding unit of the first layer stream, based on the coding units of the tree structure.

The first layer decoder 22 may perform entropy decoding on each largest coding unit, and thus may obtain encoding information and the encoded data. The first layer decoder 22 may perform inverse-quantization and inverse-transformation on the encoded data obtained from the stream, and thus may reconstruct a residual component. The first layer decoder 22 according to another embodiment may directly receive a bitstream of quantized transform coefficients. As a result of the inverse-quantization and the inverse-transformation that are performed on the quantized transform coefficients, a residual component of images may be reconstructed.

The first layer decoder 22 may determine a prediction image by performing motion compensation on same layer images, and may reconstruct the first layer images by combining the prediction image and the residual component.

The second layer decoder 26 may generate a second layer prediction image by using samples of a reconstructed first layer image according to the inter-layer prediction structure. The second layer decoder 26 may decode the second layer stream and thus may obtain a prediction error according to inter-layer prediction. The second layer decoder 26 may combine the second layer prediction image and the prediction error, thereby generating a reconstructed second layer image.

The second layer decoder 26 may determine the second layer prediction image by using the reconstructed first layer image decoded by the first layer decoder 22. The second layer decoder 26 may determine a block of the first layer image to be referred to by a block such as a coding unit or a prediction unit of the second layer image according to the inter-layer prediction structure. For example, a reconstruction block of the first layer image positioned in the second layer image in correspondence to a position of a current block may be determined. The second layer decoder 26 may determine a second layer prediction block by using a first layer reconstruction block corresponding to a second layer block.

The second layer decoder 26 may use the second layer prediction block determined by using the first layer reconstruction block according to the inter-layer prediction structure, as a reference image for inter-layer predicting a second layer original block. In this case, the second layer decoder 26 may reconstruct the second layer block by synthesizing a sample value of the second layer prediction block determined by using the reconstructed first layer image and the residual component according to the inter-layer prediction.

When the inter-layer video decoding apparatus 20 decodes a multiview video, a first layer image to be encoded may be a first view video, and a second layer image may be a second view video.

The view synthesis prediction application determiner 23 may determine whether a prediction mode of a current block is a view synthesized prediction mode. That is, the view synthesis prediction application determiner 23 may determine the prediction mode of the current block based on encoding information included in a received bitstream.

The view synthesis prediction application determiner 23 may determine whether the prediction mode of the current block is a view synthesized prediction mode. That is, the view synthesis prediction application determiner 23 may determine a prediction method of minimizing a rate-distortion cost by predicting the current block by using various prediction methods, and determine the prediction mode of the current block according to the determined prediction method. In particular, the view synthesized prediction mode may be implemented by a merge mode. As one example of the merge mode, a merge candidate list may be generated by using motion (and mode) information about temporal/spatial neighboring blocks (33, 35, 34, 32, and 36 of FIG. 4A, and 45 and 44 of FIG. 4B), one of merge candidates may be selected, and the current block may be predicted by using motion (and mode) information about the corresponding merge candidate as motion (and mode) information about the current block. The merge candidate list may vary for the current block to be encoded. A method of configuring the merge candidate will be described later with reference to FIG. 4.

When the luminance compensation determiner 25 determines to perform luminance compensation on the current block, the view synthesis prediction application determiner 23 may not apply the view synthesized prediction on the current block. This will be described later with reference to FIG. 7.

When the prediction mode of the current block is the view synthesized prediction mode, the view synthesis prediction disparity vector determiner 24 may generate a bitstream to which a constant merge candidate index is allocated and in which a separate merge candidate index is not included. Accordingly, when the separate merge candidate index is not included in the bitstream, the view synthesis prediction disparity vector determiner 24 may determine that the prediction mode of the current block is the view synthesized prediction mode.

When the neighboring block is encoded by using the view synthesized prediction mode, the inter-layer video encoding apparatus 10 may determine that the prediction mode of the current block is the view synthesized prediction mode. In this case, the view synthesis prediction disparity vector determiner 24 may also determine that the prediction mode of the current block is the view synthesized prediction mode, based on encoding information about the neighboring block.

When the prediction mode of the current block is the view synthesized prediction mode, the view synthesis prediction disparity vector determiner 24 may determine a disparity vector for view synthesized prediction. Specifically, when the prediction mode of the current block is the view synthesized prediction mode, the view synthesis disparity vector determiner 24 may determine a depth-based disparity vector.

The view synthesis prediction disparity vector determiner 24 may determine the disparity vector for the inter-layer prediction and receive information about the determined disparity vector from the inter-layer video encoding apparatus 10 through the bitstream. Also, the view synthesis prediction disparity vector determiner 24 may predict (or infer) the disparity vector from other encoding information in order to reduce an amount of data based on a prediction unit.

For example, the disparity vector may be predicted from neighboring blocks of the block to be currently decoded. The second layer decoder 26 may perform view synthesized prediction on the block to be currently encoded, by using the disparity vector predicted (or inferred) from the neighboring blocks, and may find the most similar region to the block to be currently encoded.

Since the inter-layer video decoding apparatus 20 determines the disparity vector by using the depth image of the reference layer, a more similar region to the block to be currently encoded may be found when the view synthesized prediction is performed on the current block, as compared with the disparity vector predicted from the neighboring blocks, thereby improving encoding performance and prediction accuracy.

The depth-based disparity vector is not limited to the determining of the disparity vector by referring to the depth value of the depth image of the first layer, and may mean any disparity vectors determined by referring to the depth value. For example, the disparity vector may be determined by transforming a predetermined depth value (for example, 128), and this disparity vector may also be referred to as a depth-based disparity vector. Also, when the depth image of the second layer is first decoded, the disparity vector may be determined by transforming the depth value of the depth image block corresponding to the current block of the second layer, and this disparity vector may also be referred to as a depth-based disparity vector.

When the depth-based disparity vector is determined, the view synthesis prediction disparity vector determiner 24 may determine the presence or absence of the disparity vector indicating the first layer image predicted based on the neighboring blocks adjacent to the current block and the depth-based disparity vector. The presence or absence of the disparity vector means the presence or absence of the corresponding disparity vector that has been previously predicted (or inferred).

When the view synthesis prediction disparity vector determiner 24 determines the depth-based disparity vector, if it is determined that both the disparity vector indicating the first layer image predicted based on the neighboring blocks adjacent to the current block and the depth-based disparity vector are present, the view synthesis prediction disparity vector determiner 24 may select the depth-based disparity vector. As compared with the disparity vector inferred from the neighboring blocks, the depth-based disparity vector may more accurately perform the view synthesized prediction on the current block, thereby improving encoding efficiency.

When the prediction mode of the current block is the view synthesized prediction mode, the view synthesis prediction disparity vector determiner 24 may generate a disparity vector by transforming a predetermined depth value, regardless of whether a disparity vector predicted using neighboring blocks is available, and infer a disparity vector indicating an image of a first layer by using the transformed disparity vector. When the prediction mode of the current block is the view synthesized prediction mode, the inter-layer video decoding apparatus 20 may generate a disparity vector by transforming a predetermined depth value, without always using a disparity vector predicted (or inferred) by using neighboring blocks, and predict (or infer) a disparity vector indicating an image of a first layer by using the transformed disparity vector.

The second layer decoder 26 may perform view synthesized prediction on the current block from a depth correspondence block of the first layer that the predicted disparity vector indicates. That is, the second layer decoder 26 may perform view synthesized prediction on the current block by setting the predicted disparity vector as an initial disparity vector. The second layer decoder 26 may determine the depth correspondence block of the first layer that the initial disparity vector indicates.

The second layer decoder 26 may determine another disparity vector indicating a color correspondence block of the first layer with respect to the current block, based on the depth value of the depth correspondence block.

The second layer decoder 26 may predict the current block by referring to the color correspondence block of the first layer that the other disparity vector indicates. That is, the view synthesized prediction includes: referring to the depth correspondence block of the first layer corresponding to the current block by always using the initial disparity vector; predicting (inferring) the depth-based disparity vector by transforming the depth value of the referred depth correspondence block; and predicting the current block by referring to the color correspondence block of the first layer that the generated depth-based disparity vector indicates. In this case, the initial disparity vector is a vector corresponding to the current block, but may be a disparity vector that refers to the depth value of the depth correspondence block of the first layer and is predicted (or inferred) by transforming the referred depth value. That is, the current block may be split into sub-blocks and a disparity vector may be generated for each of the split sub-blocks. The disparity vector of each of the sub-blocks of the current block may be used to refer to the color correspondence block of the first layer with respect to each of the sub-blocks. The inter-layer video decoding apparatus 20 may decode the current block by referring to the color correspondence block of each of the sub-blocks. Specifically, the inter-layer video decoding apparatus 20 may generate a prediction block of the current block by performing disparity compensation prediction on each of the sub-blocks. The view synthesized prediction will be described with reference to FIG. 6.

Hereinafter, the method of determining the disparity vector, which is performed by the inter-layer video decoding apparatus 20, according to an embodiment, will be described in detail with reference to FIGS. 4 through 7B.

According to a spatial scalable video coding technique, when the first layer decoder 22 reconstructs the first layer image having a resolution different from that of the second layer image, the second layer decoder 26 may interpolate the reconstructed first layer image so as to resize the reconstructed first layer image to have the same resolution as that of the second layer original image. The interpolated reconstructed first layer image may be determined as the second layer prediction image for inter-layer prediction.

Therefore, the first layer decoder 22 of the inter-layer video decoding apparatus 20 may reconstruct the first layer image sequence by decoding the first layer stream, and the second layer decoder 26 may reconstruct the second layer image sequence by decoding the second layer stream.

When the luminance compensation determiner 25 determines to perform luminance compensation by taking into account a luminance mismatch between views, the inter-layer video decoding apparatus 20 may reconstruct a video by compensating for a luminance difference between videos according to views. For example, a luminance difference between a first view image decoded by the first layer decoder 22 and a second view image decoded by the second layer decoder 26 may be obtained from a bitstream. Since the luminance difference of the second view image with respect to the first view image is obtained, when the second layer decoder 26 decodes the second view video, the luminance compensation may be performed on the first layer image.

The luminance compensation determiner 25 according to an embodiment may adaptively select a luminance compensation model to be used when luminance compensation is performed by taking into account characteristics of a predetermined data unit such as a picture or a block of a current image and may determine luminance compensation parameters for the selected luminance compensation model.

Hereinafter, detailed operations of the inter-layer video decoding apparatus 20 that determines a disparity vector for inter-layer prediction are described in detail with reference to FIG. 2B. In the descriptions below, a first layer image may mean a reference view image, and a second layer image may mean a current view image to be decoded.

Figure 2B:
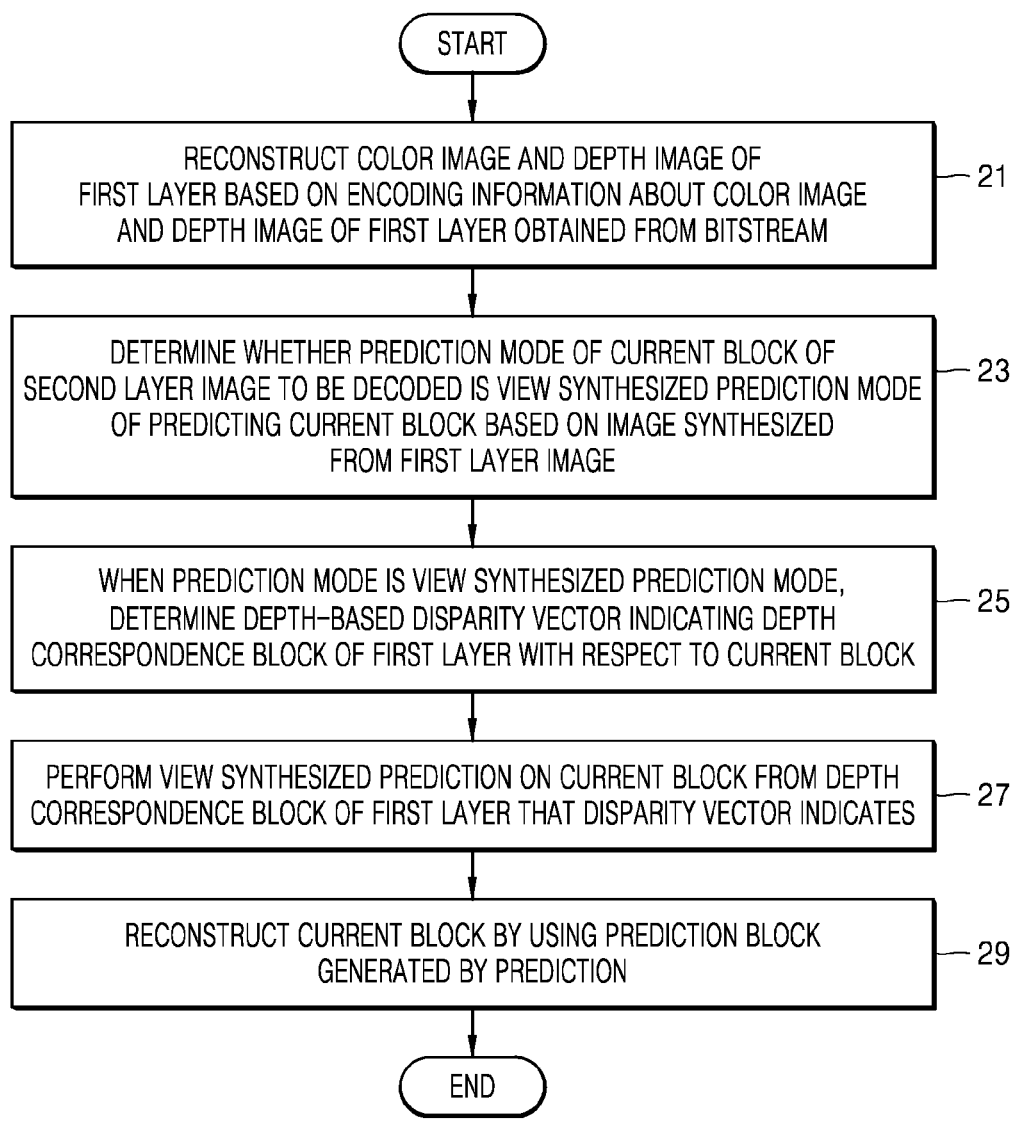
FIG. 2B illustrates a flowchart of an inter-layer video decoding method, according to an embodiment.

FIG. 2B illustrates a flowchart of an inter-layer video decoding method, according to an embodiment. Accordingly, although omitted below, the contents described about the inter-layer video decoding apparatus 20 of FIG. 2A may also apply to the inter-layer video decoding method of the inter-layer video decoding apparatus 20 in FIG. 2B, according to an embodiment.

In operation 21, the first layer encoder 22 according to an embodiment may reconstruct a color image and a depth image of a first layer based on encoding information about a color image and a depth image of the first layer obtained from a bitstream.

In operation 23, the view synthesis prediction disparity vector determiner 24 according to an embodiment determines whether a prediction mode of a current block of a second layer image to be decoded is a view synthesized prediction mode of predicting the current block based on an image synthesized from the first layer image.

In operation 25, when the prediction mode of the current block is the view synthesized prediction mode, the view synthesis prediction disparity vector determiner 24 according to an embodiment may determine a depth-based disparity vector indicating a depth correspondence block of the first layer with respect to the current block. On the other hand, the view synthesis prediction disparity vector determiner 24 may determine a depth image block of the first layer by using the depth-based disparity vector.

When a second layer depth image corresponding to a second layer current block is available in a decoding stage, the view synthesis prediction disparity vector determiner 24 may determine that the disparity vector is predictable. This is because since a distance of a subject is inversely proportional to a disparity, a disparity vector of each pixel may be predicted by using a depth image corresponding to the second layer current block.

However, the contents that determine the disparity vector in order to determine the depth image block of the first layer are not limited thereto. The view synthesis prediction disparity vector determiner 24 may determine a disparity vector predicted (or inferred) in various forms and determine a depth image block by using the predicted disparity vector. Also, a new disparity vector may be predicted (or inferred) again by using the determined disparity vector, and a depth image block may be determined by using the new disparity vector. That is, by using disparity vectors of various forms, it is possible to determine the depth-based disparity vector indicating the depth image block of the first layer corresponding to the current block of the second layer image.

In operation 27, the second layer decoder 26 may perform view synthesized prediction on the current block from the depth correspondence block of the first layer that the disparity vector indicates. That is, the view synthesized prediction may be performed on the current block by setting the disparity vector as the initial disparity vector of the view synthesized prediction. The view synthesized prediction will be described later in detail with reference to FIG. 6.

In operation 29, the second layer decoder 26 may reconstruct the current block by using the prediction block generated by the view synthesized prediction. The second layer decoder 26 may reconstruct the current block by synthesizing a residual component of the current block obtained from the bitstream and a sample value of a prediction block.

The inter-layer video decoding apparatus 20 according to an embodiment may include a central processor (not shown) that generally controls a first layer decoder 22, a view synthesis prediction disparity vector determiner 24, and a second layer decoder 26. Alternatively, each of the first layer decoder 22, the view synthesis prediction disparity vector determiner 24, and the second layer decoder 26 may be driven by its own processor (not shown), and the processors (not shown) may interoperate with each other, so that the inter-layer video decoding apparatus 20 may operate. Alternatively, according to control by an external processor (not shown) of the inter-layer video decoding apparatus 20, the first layer decoder 22, the view synthesis prediction disparity vector determiner 24, and the second layer decoder 26 may be controlled.

The inter-layer video decoding apparatus 20 according to an embodiment may include one or more data storage units (not shown) for storing input and output data of the first layer decoder 22, the view synthesis prediction disparity vector determiner 24, and the second layer decoder 26. The inter-layer video decoding apparatus 20 may include a memory controller (not shown) that manages an input and output of data of the one or more data storage units.

The inter-layer video decoding apparatus 20 according to an embodiment may interoperate with an internally-embedded internal video decoding processor or an external video decoding processor in order to reconstruct a video due to video decoding, so that the inter-layer video decoding apparatus 20 may perform a video decoding operation including inverse-transformation. The internal video decoding processor of the inter-layer video decoding apparatus 20 according to an embodiment may be a separate processor or may be implemented in a manner that the inter-layer video decoding apparatus 20, a CPU or a GPU includes a video decoding processing module and thus performs a basic video decoding operation.

An inter-layer prediction structure, which may be performed by the inter-layer video encoding apparatus 10 according to an embodiment, will be described in detail with reference to FIG. 3.

Figure 3:
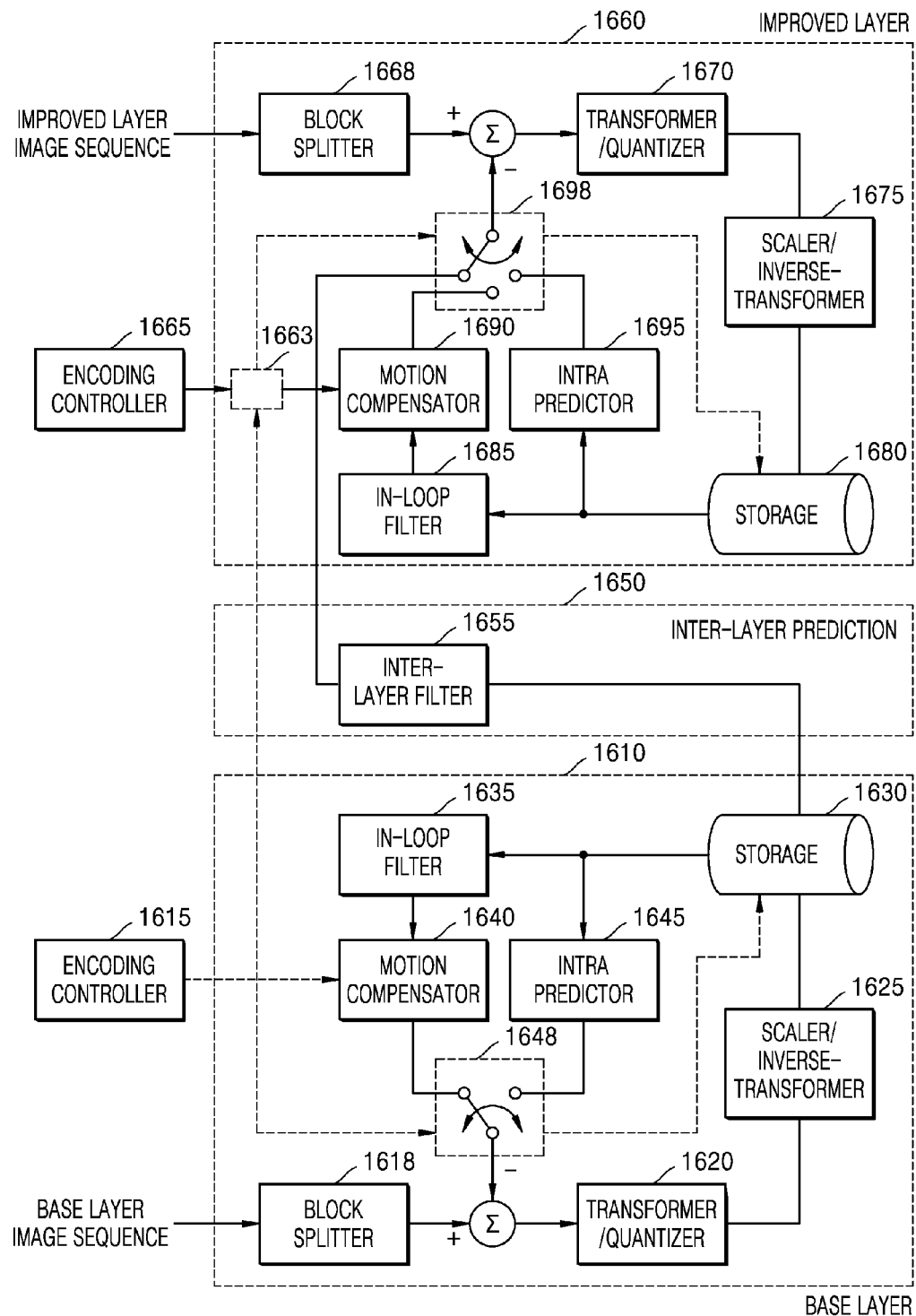
FIG. 3 illustrates an inter-layer prediction structure, according to an embodiment.

FIG. 3 illustrates an inter-layer prediction structure according to an embodiment.

An inter-layer encoding system 1600 includes a base layer encoding stage 1610, an improved layer encoding stage 1660, and an inter-layer prediction stage 1650 between the base layer encoding stage 1610 and the improved layer encoding stage 1660. The base layer encoding stage 1610 and the improved layer encoding stage 1660 may be included in the inter-layer encoder 12.

The base layer encoding stage 1610 receives a base layer image sequence and encodes each image. The improved layer encoding stage 1660 receives an improved layer image sequence and encodes each image. Redundant operations of the base layer encoding stage 1610 and the improved layer encoding stage 1620 will be simultaneously described later.

An input image (a low-resolution image and a high-resolution image) is split into a largest coding unit, a coding unit, a prediction unit, a transformation unit, etc. by block splitters 1618 and 1668. In order for encoding of the coding unit output from the block splitters 1618 and 1668, intra prediction or inter prediction may be performed on the prediction unit of the coding unit. Prediction switches 1648 and 1698 may perform inter prediction by referring to a previous reconstructed image output from motion compensators 1640 and 1690, or may perform intra prediction by using a neighboring prediction unit of a current prediction unit in a current input image output from intra predictors 1645 and 1695, according to whether a prediction mode of the prediction unit is an intra prediction mode or an inter prediction mode. Residual information for each prediction unit may be generated through inter prediction.

Residual information between a prediction unit and a neighboring image is input to transformers/quantizers 1620 and 1670 according to the prediction unit of the coding unit. The transformers/quantizers 1620 and 1670 may perform transformation and quantization according to a transformation unit, based on the transformation unit of the coding unit, and output a quantized transformation coefficient.

The scalers/inverse-transformers 1625 and 1675 may perform scaling and inverse transformation on the quantized transformation coefficient according to the transformation unit of the coding unit and generate residual information of a spatial domain. When the mode is controlled as an inter mode by the prediction switches 1648 and 1698, the residual information may be synthesized with the previous reconstructed image or the neighboring prediction unit, and thus a reconstructed image including the current prediction unit may be generated. The reconstructed current image may be stored in storages 1630 and 1680. The reconstructed current image may be transferred to the intra predictors 1645 and 1695 and the motion compensators 1640 and 1690 according to a prediction mode of a prediction unit to be subsequently encoded.

In particular, in the case of the inter mode, in-loop filters 1635 and 1685 may perform at least one of de-blocking filtering and sample adaptive offset (SAO) filtering on the reconstructed image stored in the storages 1630 and 1680, according to a coding unit. At least one of the de-blocking filtering and the SAO filtering may be performed on at least one of the coding unit, and the prediction unit and the transformation unit included in the coding unit.

The de-blocking filtering is filtering for alleviating a blocking phenomenon of a data unit, and the SAO filtering is filtering for compensating for a pixel value transformed by data encoding and decoding. Data filtered by the in-loop filters 1635 and 1685 may be transferred to the motion compensators 1640 and 1690 according to the prediction unit. In order for encoding of a coding unit of a next order, which is output from the block splitters 1618 and 1668, residual information between a next coding unit and the reconstructed current image output by the motion compensators 1640 and 1690 and the block splitters 1618 and 1668 may be generated.

In this manner, the above-described encoding operation may be repeated for each coding unit of the input image.

Also, in order for inter-layer prediction, the improved layer encoding stage 1660 may refer to the reconstructed image stored in the storage 1630 of the base layer encoding stage 1610. An encoding controller 1615 of the base layer encoding stage 1610 may control the storage 1630 of the base layer encoding stage 1610 to transfer the reconstructed image of the base layer encoding stage 1610 to the improved layer encoding stage 1660. In the inter-layer prediction stage 1650, the inter-layer filter 1655 may perform de-blocking filtering or SAO filtering on a reconstructed base layer image output from the storage 1610 of the base layer encoding stage 1610. When a resolution of the image of the base layer is different from a resolution of the image of the improved layer, the inter-layer prediction stage 1650 may upsample the reconstructed image of the base layer and transfer the upsampled reconstructed image to the improved layer encoding stage 1660. When the inter-layer prediction is performed according to the control of the switch 1698 of the improved layer encoding stage 1660, inter-layer prediction may be performed on the improved layer image by referring to the reconstructed base layer image transferred through the inter-layer prediction stage 1650.

In order for encoding of the image, various encoding modes for a coding unit, a prediction unit, and a transformation unit may be set. For example, as an encoding mode for a coding unit, a depth, split information (a split flag), etc., may be set. As an encoding mode for a prediction unit, a prediction mode, a partition type, intra direction information, reference list information, etc., may be set. As an encoding mode for a transformation unit, a transformation depth, split information, etc., may be set.

The base layer encoding stage 1610 may determine a coding depth, a prediction mode, a partition type, an intra direction/reference list, a transformation depth, etc., which have the highest encoding efficiency, according to a result of performing encoding by applying various depths for a coding unit, various prediction modes for a prediction unit, various partition types, various intra directions, various reference lists, and various transformation depths for transformation units. However, embodiments are not limited to the listed encoding modes determined by the base layer encoding stage 1610.

The encoding controller 1615 of the base layer encoding stage 1610 may perform control so that various encoding modes are approximately applicable to the operations of the respective elements. Also, in order for the inter-layer encoding of the improved layer encoder 1660, the encoding controller 1615 may control the improved layer encoding stage 1660 to determine the encoding mode or the residual information by referring to the encoding result of the base layer encoding stage 1610.

For example, the improved layer encoding stage 1660 may use the encoding mode of the base layer encoding stage 1610 as the encoding mode for the improved layer image as it is, or may determine the encoding mode for the improved layer image by referring to the encoding mode of the base layer encoding stage 1610. The encoding controller 1615 of the base layer encoding stage 1610 may control a control signal of the encoding controller 1665 of the improved layer encoding stage 1660 of the base layer encoding stage 1610, so that the improved layer encoding stage 1660 uses a current encoding mode from the encoding mode of the base layer encoding stage 1610 in order to determine the current encoding mode.

Similar to the inter-layer encoding system 1600 according to the inter-layer prediction method as illustrated in FIG. 3, an inter-layer decoding system according to an inter-layer prediction method may also be implemented. That is, an inter-layer decoding system of a multilayer video may receive a base layer bitstream and an improved layer bitstream. In a base layer decoding stage of the inter-layer decoding system, base layer images may be reconstructed by decoding the base layer bitstream. In an improved layer decoding stage of the inter-layer decoding system of the multilayer video, improved layer images may be reconstructed by decoding the improved layer bitstream by using a reconstructed base layer image and parsed encoding information.

When inter-layer prediction is performed by the inter-layer video encoding apparatus 10 according to an embodiment, the inter-layer video decoding apparatus 20 may reconstruct multilayer images according to the inter-layer decoding system described above.

Hereinafter, an embodiment in which the inter-layer video encoding apparatus 10 and the inter-layer video decoding apparatus 20 apply an inter-layer prediction structure to a multiview video will be described in detail with reference to FIGS. 4A through 7B. In an inter view prediction structure of a multiview video, since individual view videos are respectively allocated to one layer, the inter view prediction structure may also be construed as the inter-layer prediction structure.

Hereinafter, an inter-layer video encoding technique and an inter-layer video decoding technique for determining a disparity vector by using a reference layer depth image, according to an embodiment, will be described with reference to FIGS. 4A through 6.

Figure 4A:
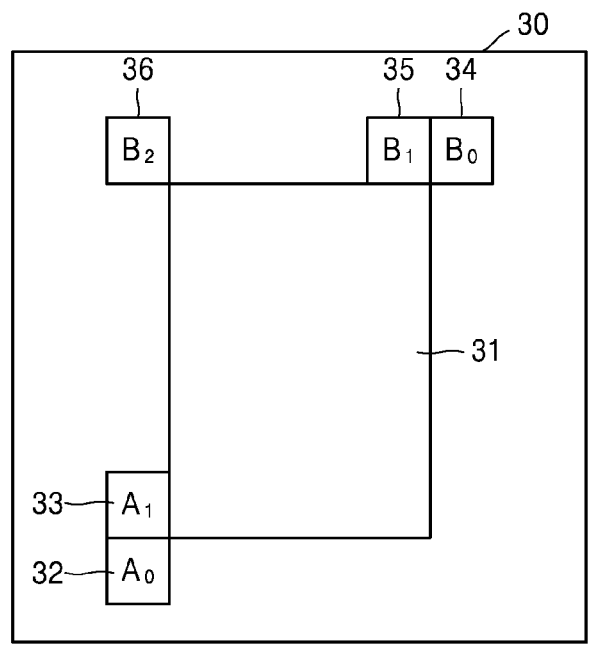
FIG. 4A illustrates spatial prediction candidates that are used for an inter prediction mode, according to an embodiment.

FIG. 4A illustrates spatial prediction candidates that are used for an inter prediction mode, according to an embodiment.

Referring to FIG. 4A, candidate blocks to be referred to by the inter-layer decoding apparatus 20 in order to determine prediction information of a current block 31 in a current picture 30 may be prediction units spatially adjacent to the current block 31. For example, a neighboring block A0 32 positioned at a left lower outside of a left lower sample of the current block 31, a neighboring block A1 33 positioned at a left outside of the left lower sample of the current block 31, a neighboring block B0 34 positioned at a right upper outside of a right upper sample of the current block 31, a neighboring block B1 35 adjacent to an upper outside of the left upper sample of the current block 31, and a neighboring block B2 36 positioned at a left upper outside of the left upper sample of the current block 31 may become candidate blocks. In order to determine blocks that may become the candidate blocks, the neighboring blocks 32, 33, 34, 35, and 36 of predetermined positions may be searched in the order of the neighboring blocks A1 33, B1 35, B0 34, A0 32, and B2 36.

For example, as spatial candidate blocks, four neighboring blocks may be selected from among the neighboring blocks A1 33, B1 35, B0 34, A0 32, and B2 36. That is, motion information about the four spatial candidate blocks may be included in a candidate list for inter prediction.

The inter-layer decoding apparatus 20 may include only blocks having motion information, i.e., inter-predicted blocks, among the blocks A1 33, B1 35, B0 34, A0 32, and B2 36 in prediction candidates for inter prediction, and may exclude blocks having no motion information from the prediction candidates. Also, the inter-layer decoding apparatus 20 may exclude blocks having redundant motion information from the prediction candidates for inter prediction.

The positions and the number of neighboring blocks that may be included in the spatial prediction candidates are not limited to the above example and may be changed. The blocks used to determine the spatial prediction candidates may be a coding unit or a prediction unit.

Figure 4B:
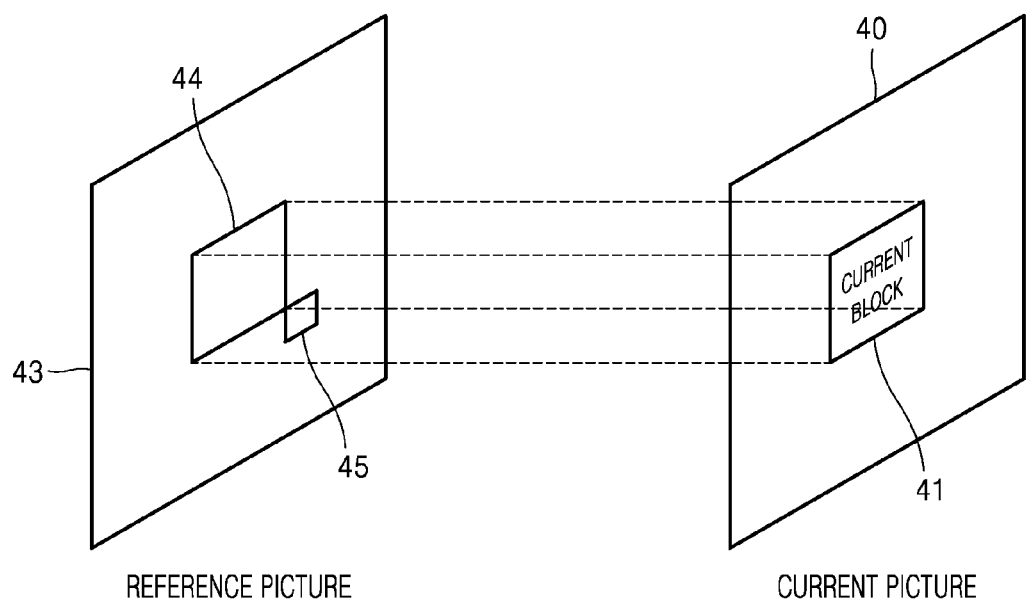
FIG. 4B illustrates temporal prediction candidates that are used in an inter prediction mode, according to an embodiment.

FIG. 4B illustrates temporal prediction candidates used for an inter prediction mode, according to an embodiment.

Referring to FIG. 4B, in order for the inter-layer video decoding apparatus 20 to perform inter prediction on a current block 41 included in a current picture 40, at least one among from the current block 41 and a co-located block 44 and a neighboring block of the block 44 of the same position, which are included in a reference picture 43, may be included in a temporal prediction candidate. For example, a right lower block 45 of the block 44 of the same position may be included in the temporal prediction candidate. The block used to determine the temporal prediction candidate may be a coding unit or a prediction unit.

Figure 5A:
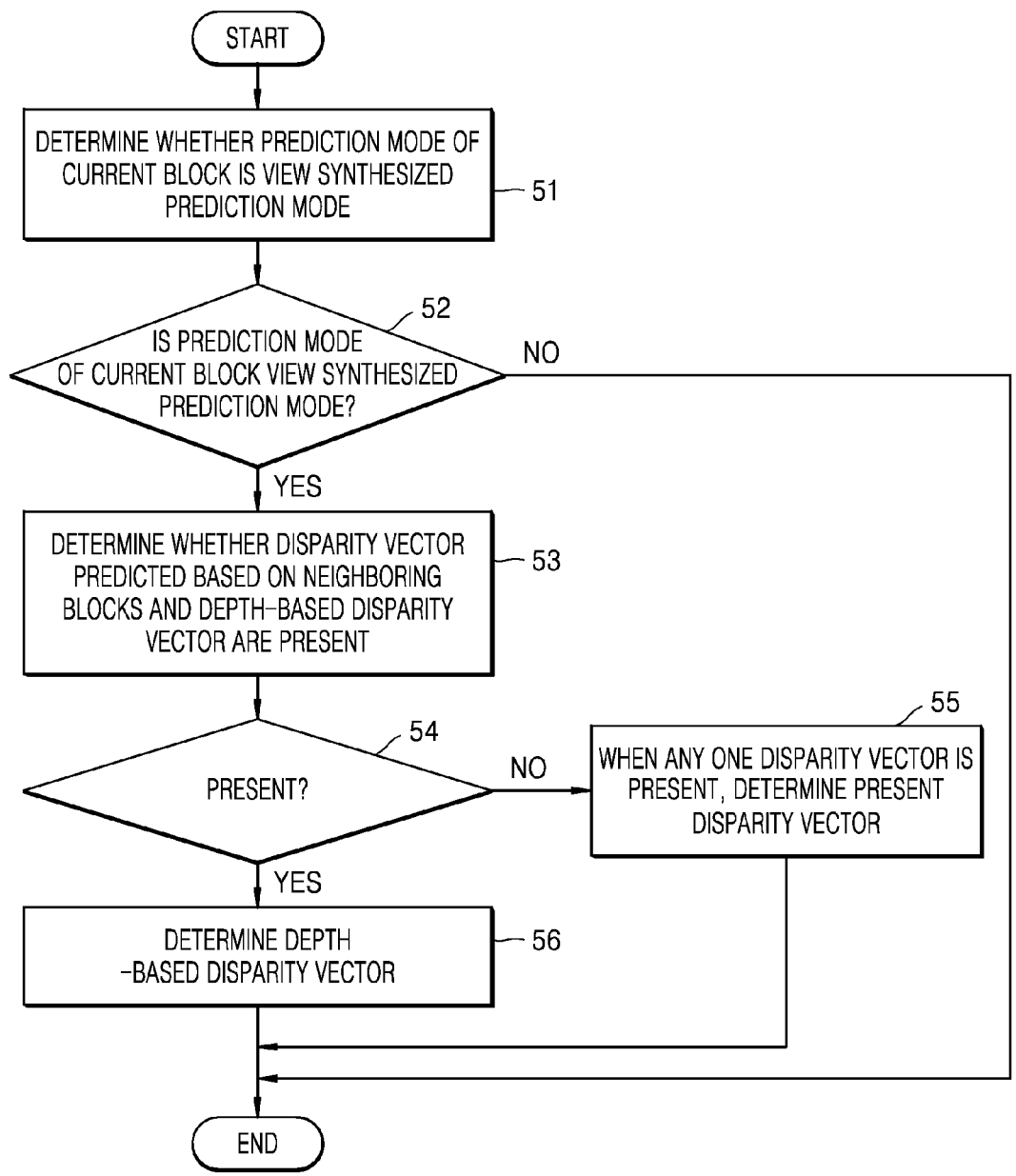
FIG. 5A illustrates a flowchart by which an inter-layer video decoding apparatus determines a disparity vector that is used for view synthesized prediction, according to an embodiment of the present invention.
Figure 5B:
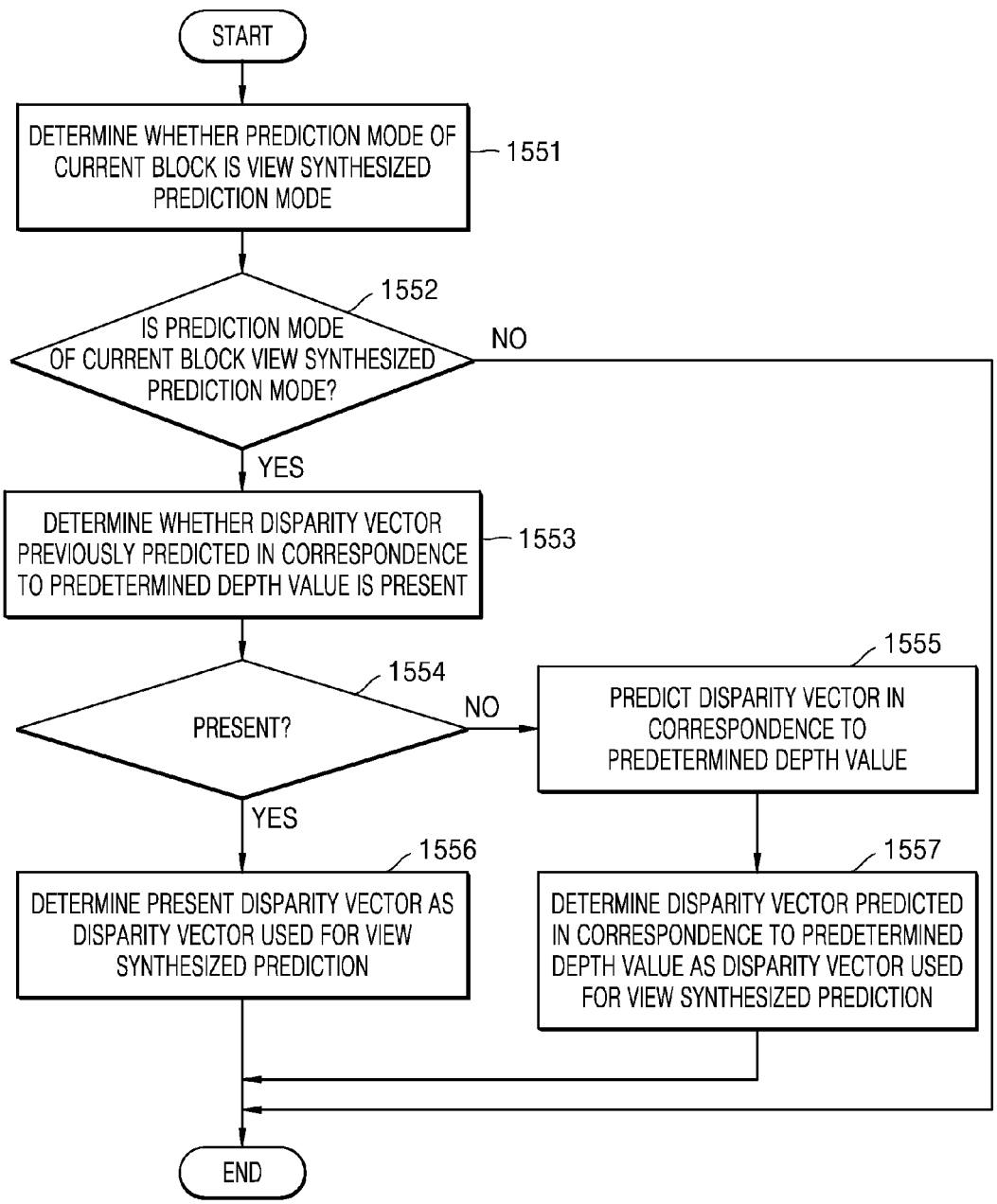
FIG. 5B illustrates a flowchart by which an inter-layer video decoding apparatus determines a disparity vector that is used for view synthesized prediction, according to another embodiment of the present invention.
Figure 6:
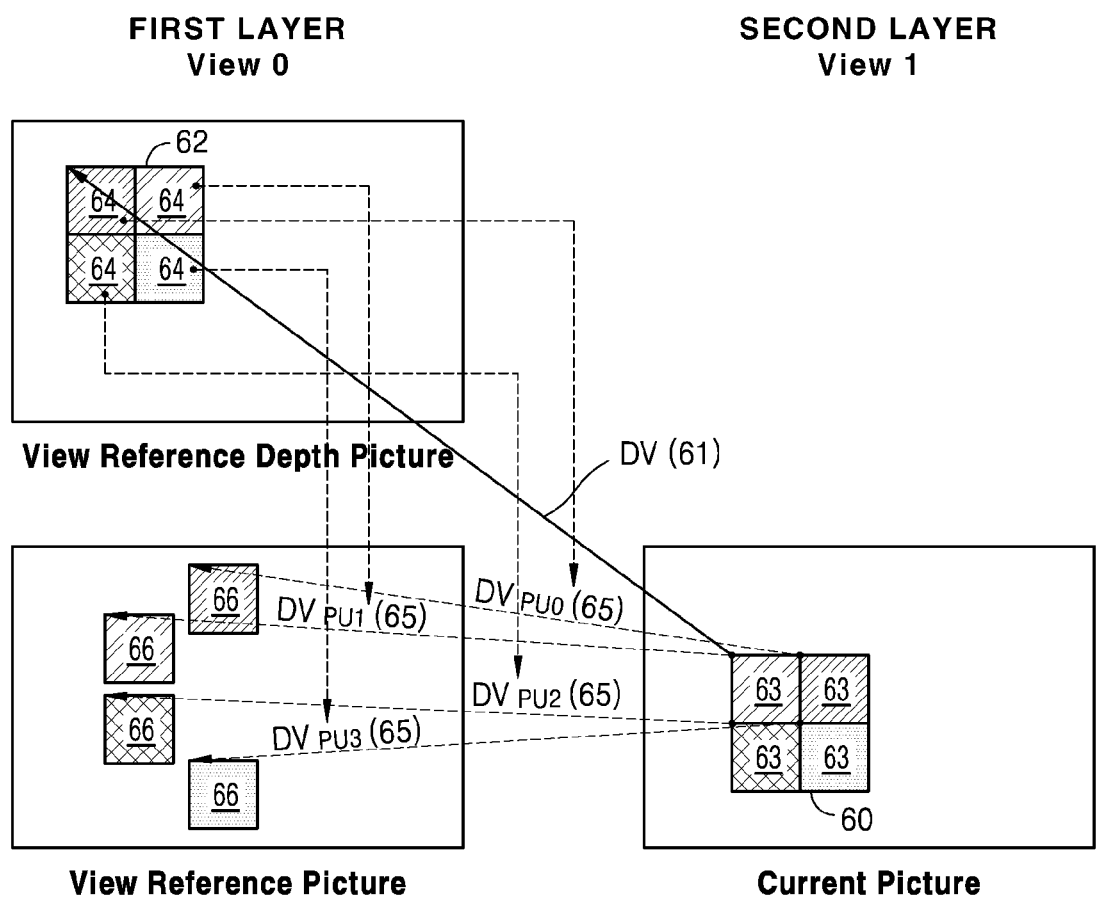
FIG. 6 is a diagram for describing a process by which an inter-layer video decoding apparatus performs view synthesized prediction on a current block to be encoded.

With reference to FIGS. 5A through 6, the following description will be given about a method and apparatus for, when the inter-layer video decoding apparatus 20 according to an embodiment performs view synthesized prediction on a current block, improving encoding efficiency by determining a depth-based disparity vector and performing view synthesized prediction on the current block by using the determined disparity vector.

FIGS. 5A and 5B are merely an example in which the inter-layer video decoding apparatus determines a disparity vector based on a depth image, and a view synthesized prediction mode is not limited thereto.

FIGS. 5A and 5B illustrate flowcharts of determining a disparity vector that the inter-layer video decoding apparatus uses to perform view synthesized prediction, according to an embodiment.

FIG. 5A illustrates a flowchart of determining a disparity vector that the inter-layer video decoding apparatus uses to perform view synthesized prediction, according to an embodiment.

Referring to FIG. 5A, in operation 51, an inter-layer video decoding apparatus 20 according to an embodiment determines whether a prediction mode of a block to be currently encoded is a view synthesized prediction mode.

When it is determined in operation 52 that the prediction mode of the current block is the view synthesized prediction mode, the inter-layer video decoding apparatus 20 may determine in operation 53 whether a disparity vector predicted based on neighboring blocks of the current block and a depth-based disparity vector are present.

In operation 54, when it is determined that the disparity vector predicted based on the neighboring blocks of the current block and the depth-based disparity vector are not present, if one of the disparity vector predicted based on the neighboring blocks and the depth-based disparity vector is present, the inter-layer video decoding apparatus 20 may determine the present disparity vector.

On the other hand, in operation 54, when it is determined that the disparity vector predicted based on the neighboring blocks and the depth-based disparity vector are present, the inter-layer video decoding apparatus 20 may determine the depth-based disparity vector.

In operation 55 or 56, the view synthesized prediction may be performed on the current block by using the determined disparity vector.

FIG. 5B illustrates a flowchart of determining a disparity vector that the inter-layer video decoding apparatus uses to perform view synthesized prediction, according to another embodiment.

In operation 1551, an inter-layer video decoding apparatus 20 according to an embodiment may determine whether a prediction mode of a current block is a view synthesized prediction mode.

When it is determined in operation 1552 that the prediction mode of the current block is the view synthesized prediction mode, the inter-layer video decoding apparatus 20 according to an embodiment may determine in operation 1553 whether a disparity vector previously predicted in correspondence to a predetermined depth value is present.

In operation 1553, the inter-layer video decoding apparatus 20 according to an embodiment may determine whether a disparity vector previously predicted in correspondence to a predetermined depth value is present. In particular, the inter-layer video decoding apparatus 20 may determine whether a disparity vector indicating a depth image block of a first layer corresponding to the current block is present.

When it is determined in operation 1554 that the disparity vector previously predicted in correspondence to the predetermined depth value is not present, the inter-layer video decoding apparatus 20 according to an embodiment may predict the disparity vector in correspondence to the predetermined depth value in operation 1555.

In operation 1557, the inter-layer video decoding apparatus 20 according to an embodiment may determine the disparity vector predicted in correspondence to the predetermined depth value, as the disparity vector to be used for the view synthesized prediction.

On the other hand, when it is determined in operation 1554 that the disparity vector predicted in correspondence to the predetermined depth value is present, the inter-layer video decoding apparatus 20 according to an embodiment may determine the present disparity vector as the disparity vector to be used for the view synthesized prediction. That is, the present disparity vector may be determined as an initial disparity vector to be used for the view synthesized prediction.

FIG. 6 is a diagram for describing a process by which an inter-layer video decoding apparatus performs view synthesized prediction on a current block to be encoded.

A detailed process of, when the view synthesized prediction is performed on the current block, determining a depth-based disparity vector with respect to sub-blocks of the current block will be described with reference to FIG. 6.

A view synthesized prediction method is one of the prediction methods used in the inter-layer prediction and means a method that splits a current block into a plurality of sub-blocks, determines a disparity vector of each of the sub-blocks from a depth value of a first layer depth image, and performs inter-layer prediction by referring to sub-blocks of a first layer that the disparity vector of each of the sub-blocks indicates. In the view synthesized prediction method, the inter-layer video decoding apparatus 20 determines a depth correspondence block of the first layer by using the initial disparity vector. The initial disparity vector may be inferred from a disparity vector of a neighboring block of the current block.

The inter-layer video decoding apparatus 20 splits the depth corresponding block of the first layer into sub-blocks. Each of the sub-blocks is a block corresponding to a sub-block of the current block. The inter-layer video decoding apparatus 20 may predict (or infer) a disparity vector with respect to each sub-block of the current block by using a depth value of each of the sub-blocks.

Specifically, the inter-layer video decoding apparatus 20 may obtain depth values of four edges of each of the sub-blocks of the depth correspondence image, compare the obtained depth values of the four edges, and set a maximum depth value as a representative depth value. The inter-layer video decoding apparatus 20 transforms the representative depth value into a disparity vector. The transformed disparity vector is determined as the disparity vector of the sub-block of the current block corresponding to the corresponding sub-block. The inter-layer video decoding apparatus 20 may determine the disparity vector of the sub-block of the current block by repeating the above processes on each of the sub-blocks of the depth block. The inter-layer video decoding apparatus 20 may perform disparity compensation on each sub-block of the current block by using the determined disparity vector and generate a prediction block of the current block as a result.

Referring to FIG. 6, the inter-layer video decoding apparatus 20 determines a depth correspondence block 62 of a first layer corresponding to a current block 60 by using an initial disparity vector 61 of the current block 60. The current block may be split into sub-blocks 63, and a depth correspondence block 62 may include sub-blocks 64 so as to correspond thereto. The inter-layer video decoding apparatus 20 may obtain depth values of four edges of each of the sub-blocks 64 and determine a maximum value of the obtained depth values of the four edges as a representative depth value. The inter-layer video decoding apparatus 20 may transform the representative depth value into a disparity vector and determine a disparity vector 65 for the sub-blocks 63 from each of the sub-blocks 64

The inter-layer video decoding apparatus 20 may determine a color correspondence block 66 of a first layer corresponding to each of the sub-blocks 63 by using the disparity vector 65, and the inter-layer video decoding apparatus 20 may generate a prediction block for the sub-block 63 by referring to the color correspondence block 66 of the first layer. The inter-layer video decoding apparatus 20 may generate a prediction block of the current block 60 by using the prediction block for the sub-block 63. The inter-layer video decoding apparatus 20 may reconstruct the current block by using a sample value of the prediction block of the current block and a residual component of the current block received from a bitstream.

When the inter-layer video decoding apparatus 20 determines a corresponding block of a first layer image corresponding to a sub-block of a block to be currently encoded and encodes the current block, the current block is predicted by referring to an image synthesized by combining sub-blocks of the first layer image. Therefore, the above-described prediction method is called a view synthesized prediction method. In this case, since a disparity vector of each of the sub-blocks of the current block is determined from a depth value, the disparity vector of each of the sub-blocks of the current block is a depth-based disparity vector. In this case, the current block 60 may be a prediction unit, but is not necessarily limited thereto. The current block 60 may be a coding unit. In this case, the sub-block of the coding unit may be a prediction unit.

However, the present invention is not limited to an embodiment in which the current block is split into a plurality of sub-blocks when the view synthesized prediction is performed. The view synthesized prediction method may determine a depth-based disparity vector of a sub-block by using a sub-block having the same size as the current block, without splitting the current block into a plurality of sub-blocks, and predict the current block by referring to a corresponding block of a first layer image that the determined disparity vector indicates.

Figure 7:
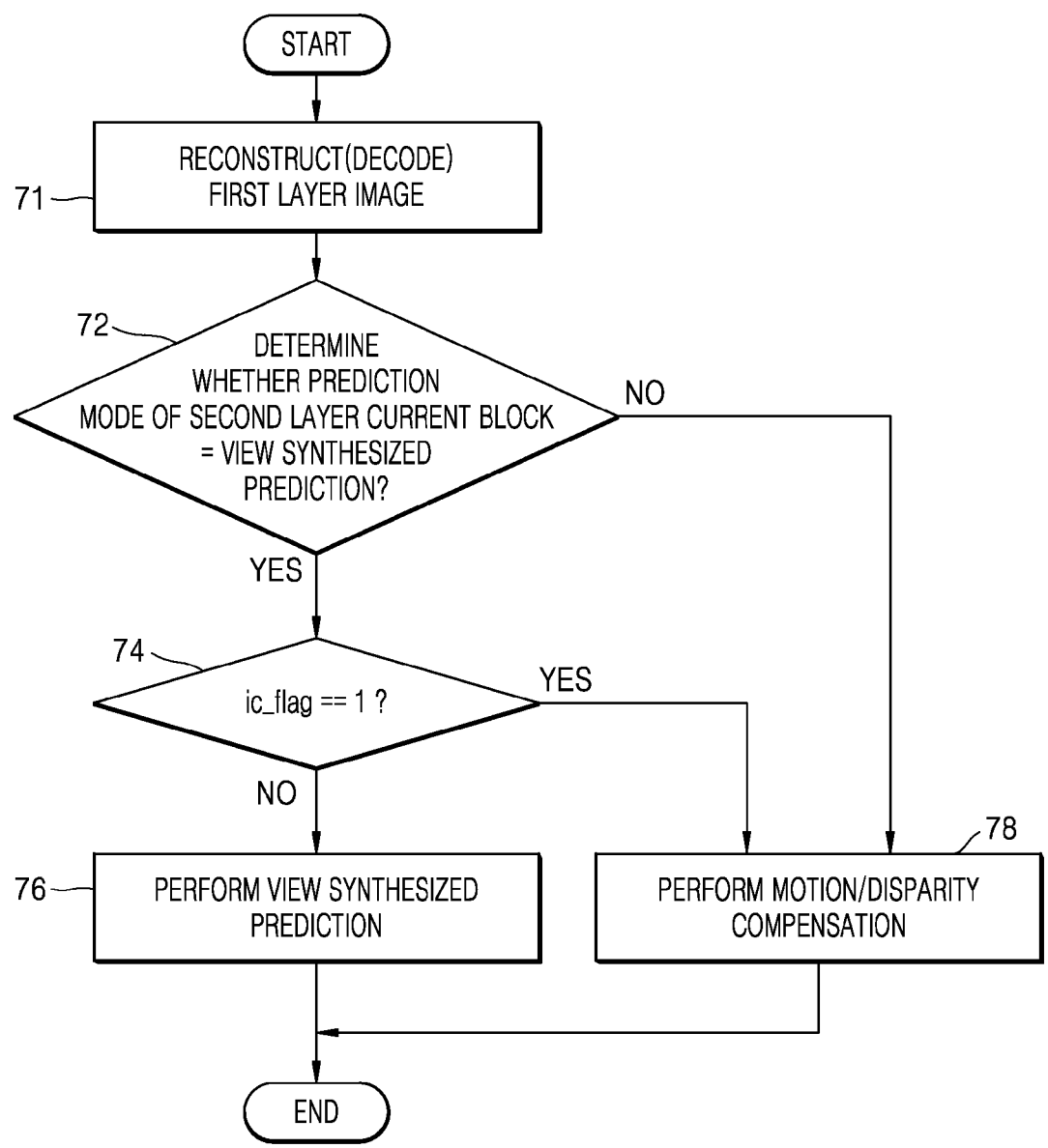
FIG. 7 is a flowchart by which an inter-layer video decoding apparatus determines whether to apply (or permit) a view synthesized prediction mode on a current block according to luminance compensation, according to an embodiment.

FIG. 7 is a flowchart by which an inter-layer video decoding apparatus determines whether to perform a view synthesized prediction mode according to luminance compensation, according to an embodiment.

In operation 71, an inter-layer video decoding apparatus 20 according to an embodiment may reconstruct a color image and a depth image of a first layer based on encoding information about the color image and the depth image of the first layer obtained from a received bitstream.

In operation 72, the inter-layer video decoding apparatus 20 according to an embodiment may determine whether a prediction mode of a current block of a second layer image to be decoded is a view synthesized prediction mode. When neighboring blocks of the current block are encoded by using the view synthesized prediction mode, the inter-layer video decoding apparatus 20 may determine the prediction mode of the current block as the view synthesized prediction mode. For example, in the case of a merge mode that generates a merge candidate list by using motion (and mode) information about temporal/spatial neighboring blocks (33, 35, 34, 32, and 36 of FIG. 4A, and 45 and 44 of FIG. 4B) of the current block, selects one from among merge candidates, and predicts the current block by using motion (or mode) information about the corresponding merge candidate as motion (or mode) information about the current block, if the mode of one selected merge candidate is encoded in the view synthesized prediction mode, the prediction mode of the current block may be determined as the view synthesized prediction mode.

In operation 72, as described above with reference to FIGS. 4 through 6, when it is determined that the prediction mode of the current block is the view synthesized prediction mode wherein prediction is performed based on the image synthesized from the first layer image, the inter-layer video decoding apparatus 20 may proceed to operation 74 to determine whether to perform luminance compensation on the current block. When the prediction mode of the current block is not the view synthesized prediction mode, the inter-layer video decoding apparatus 20 may proceed to operation 78 to reconstruct first layer images by performing motion compensation by using the disparity vector of the selected merge candidate and compensate for a luminance difference with respect to the first layer images according to a result of the determining of whether to perform luminance compensation (ic_flag). In operation 74, the inter-layer video decoding apparatus 20 according to an embodiment may determine whether to perform luminance compensation on the current block. The video decoding apparatus 20 may obtain the information 'ic_flag' about whether to perform the luminance compensation on the current block from the received bitstream, and determine whether to perform the luminance compensation on the current block. The information 'ic_flag" about the luminance compensation of the current block may be obtained from the received bitstream, or may be determined according to an encoding mode such as a coding type or a prediction direction of the current block.

The disparity vector for predicting the current block may be differently determined according to a result of the determining of whether to perform the luminance compensation on the current block. That is, a first layer reference block corresponding to the current block may be differently configured, and the current block may be predicted and reconstructed by using the differently configured reference block. When it is determined to perform the luminance compensation on the current block (ic_flag==1), the inter-layer video decoding apparatus 20 according to an embodiment proceeds to operation 78. If it is determined not to perform the luminance compensation on the current block (ic_flag==0), the inter-layer video decoding apparatus 20 according to an embodiment proceeds to operation 76 to perform the view synthesized prediction.

In operation 76, the inter-layer video decoding apparatus 20 according to an embodiment may perform the view synthesized prediction described above with reference to FIGS. 4 through 6. That is, the view synthesized prediction is permitted only when the luminance compensation is not performed on the current block. As described above with reference to FIG. 6, since the view synthesized prediction predicts the disparity vector by splitting the current block into a plurality of sub-blocks, the performing the luminance compensation on each of the sub-blocks may increase an amount of calculation.

In operation 78, the inter-layer video decoding apparatus 20 according to an embodiment may perform motion compensation on the entire current block, and may perform the luminance compensation on the entire current block when ic_flag is 1. That is, when the luminance compensation is performed on the current block, the view synthesized prediction mode is not used. The inter-layer video decoding apparatus 20 may infer a disparity vector from a block temporally and spatially adjacent to the current block and determine a first layer reference block corresponding to the current block.

For example, the first layer reference block may be determined by using the disparity vector of the merge candidate selected from among the temporal/spatial neighboring blocks (33, 35, 34, 32, and 36 of FIG. 4A, and 45 and 44 of FIG. 4B) of the current block, and the current block may be reconstructed by using the determined reference block.

In operation 78, the inter-layer video decoding apparatus 20 may compensate for a luminance difference between the first layer reference block and a second layer current block with respect to the entire current block.

The method of performing the luminance compensation in the view synthesized prediction mode of the inter-layer video decoding apparatus 20 as illustrated in FIG. 7 may be performed according to pseudo code of Table 1 below.

TABLE 1

I.1.1.1.1.1     Derivation process for luma motion vectors for merge mode
This process is only invoked when merge_flag[xPb][yPb] is equal to 1, where (xPb,yPb) specify
the top-left sample of the current luma prediction block relative to the top-left luma sample of
the current picture.
Inputs to this process are:
        a luma location (xCb, yCb) of the top-left sample of the current luma coding block
relative to the top-left luma sample of the current picture,
        a luma location (xPb, yPb) of the top-left sample of the current luma prediction block
relative to the top-left luma sample of the current picture,
        a variable nCbS specifying the size of the current luma coding block,
        two variables nPbW and nPbH specifying the width and the height of the luma
prediction block,
        a variable partIdx specifying the index of the current prediction unit within the current
coding unit.
Outputs of this process are:
        the luma motion vectors mvL0 and mvL1,
        the reference indices refIdxL0 and refIdxL1,
        the prediction list utilization flags predFlagL0 and predFlagL1,
        the flag ivpMvFlag, specifying, whether the current PU is coded using inter-view
motion prediction,
        the flag vspModeFlag, specifying, whether the current PU is coded using view
synthesis prediction,
        the flag subPbMotionFlag, specifying, whether the motion data of the current PU has
sub prediction block size motion accuracy,
        the flag dispDerivedDepthFlag, specifying, whether the current PU uses disparity
derived depth,
        the variable dispDerivedDepthVal (when dispDerivedDepthFlag is equal to 1).
The function differentMotion(N, M) is specified as follows:
        If one of the following conditions is true, differentMotion(N, M) is equal to 1:
        predFlagLXN != predFlagLXM (with X being replaced by 0 and 1),
        mvLXN != mvLXM (with X being replaced by 0 and 1),
        refIdxLXN != refIdxLXM (with X being replaced by 0 and 1),
        Otherwise, differentMotion(N, M) is equal to 0.
The motion vectors mvL0 and mvL1, the reference indices refIdxL0 and refIdxL1, and the
prediction utilization flags predFlagL0 and predFlagL1 are derived by the following ordered
steps:
1.      The derivation process for the base merge candidate list as specified in subclause
I.8.5.3.2.19 is invoked with the luma location (xCb, yCb), the luma location (xPb, yPb), the
variables nCbS, nPbW, nPbH, and the partition index partIdx as inputs, and the output being a
modified luma location (xPb, yPb), the modified variables nPbW and nPbH, the modified
variable partIdx, the luma location (xOrigP, yOrigP), the variables nOrigPbW and nOrigPbH,
the merge candidate list baseMergeCandList, the luma motion vectors mvL0N and mvL1N, the
reference indices refIdxL0N and refIdxL1N, and the prediction list utilization flags
predFlagL0N and predFlagL1N, with N being replaced by all elements of baseMergeCandList.

TABLE 1-continued

2. For N being replaced by A1, B1, B0, A0 and B2, the following applies:
If N is an element in baseMergeCandList, availableFlagN is set equal to 1.
Otherwise (N is not an element in baseMergeCandList), availableFlagN is set equal to 0.
3. Depending on iv_mv_pred_flag[nuh_layer_id] and DispAvailabilityIdc[xPb][yPb], the following applies:
If iv_mv_pred_flag[nuh_layer_id] is equal to 0 or DispAvailabilityIdc[xPb][yPb] is not equal to DISP NONE, the flags availableFlagIvMC, availableIvMCShift and availableFlagIvDC are set equal to 0.
Otherwise (iv_mv_pred_flag[nuh_layer_id] is equal to 1), the derivation process for the inter-view merge candidates as specified in subclause I.8.5.3.2.11 is invoked with the luma location (xPb, yPb), the variables nPbW and nPbH as inputs, and the output is assigned to the availability flags availableFlagIvMC, availablelvMCShift and availableFlagIvDC, the reference indices refIdxLXIvMC, refIdxLXIvMCShift and refIdxLXIvDC, the prediction list utilization flags predFlagLXIvMC, predFlagLXIvMCShift and predFlagLXIvDC,and the motion vectors mvLXIvMC, mvLXIvMCShift and mvLXIvDC (with X being 0 or 1, respectively).
4. Depending on view_synthesis_pred_flag[nuh_layer_id], DispAvailabilityIdc[xPb][yPb], and, dbbp_flag[the following applies:
If_view_synthesis_pred_flag[is equal to 0, DispAvailabilityIdc[xPb][yPb]is equal to DISP_NONE, or dbbp_flag[xPb][yPb] is equal to 1, the flag availableFlagVSP is set equal to 0.
Otherwise (view_synthesis_pred_flag[nuh_layer_id] is equal to 1, DispAvailabilityIdc[xPb][yPb] is not equal to DISP_NONE, and dbbp_flag[xPb][yPb] is equal to 0), the derivation process for a view synthesis prediction merge candidate as specified in subclauseI.8.5.3.2.14 is invoked with the luma locations (xPb, yPb) and the variables nPbW and nPbH as inputs, and the outputs are the availability flag availableFlagVSP, the reference indices refIdxL0VSP and refIdxL1VSP, the prediction list utilization flags predFlagL0VSP and predFlagL1VSP, and the motion vectors mvL0VSP and mvL1VSP.
5. Depending on mpi_flag[nuh_layer_id], the following applies:
If mpi_flag[nuh_layer_id] is equal to 0, the variables availableFlagT and availableFlagD are set equal to 0.
Otherwise (mpi_flag[nuh_layer_id] is equal to 1), the following applies:
The derivation process for inter layer predicted sub prediction block motion vector candidates as specified in subclause I.8.5.3.2.17 is invoked with the luma location (xPb, yPb), the variables nPbW and nPbH, the variable refViewIdx being equal to −1, and the variable mvDisp being equal to (0, 0) as inputs, and the outputs are the prediction utilization flag predFlagLXT, the motion vector mvLXT and the reference indices refIdxLXT (with X being 0 or 1, respectively).
The flag availableFlagT is set equal to (predFlagL0T || predFlagL1T).
The derivation process for the disparity derived merging candidates as specified in subclause I.8.5.3.2.20 is invoked with the luma location (xPb, yPb), the variables nPbW and nPbH as inputs, and the outputs are the flag availableFlagD, the prediction utilization flag predFlagLXD, the reference index refIdxLXD, the motion vector mvLXD (with X being 0 or 1, respectively), and the variable dispDerivedDepthVal.
6. The variables availableFlagIvDCShift, and the variables predFlagLXIvDCShift, refIdxLXIvDCShift and mvLXIvDCShift (for X in the range of 0 to 1, inclusive) are derived as specified in the following:
availableFlagIvDCShift = ( !availableFlagIvMCShift && !DepthFlag && availableFlagIvDC ) (I 99)
predFlagLXIvDCShift = availableFlagIvDCShift ? predFlagLXIvDC : 0     (I 100)
refIdxLXIvDCShift = availableFlagIvDCShift ? refIdxLXIvDC : −1     (I 101)
mvLXIvDCShift[ 0 ] = availableFlagIvDCShift ? mvLXIvDC[ 0 ] + 4 : 0     (I 102)
mvLXIvDCShift[ 1 ] = availableFlagIvDCShift ? mvLXIvDC[ 1 ] : 0
7. The merging candidate list, extMergeCandList, is constructed as follows:
    i = 0
    if( availableFlagT )
      extMergeCandList[ i++ ] = T
    if( availableFlagD )
      extMergeCandList[ i++ ] = D
    if( availableFlagIvMC && ( !availableFlagT || differentMotion( T, IvMC ) ) )
      extMergeCandList[ i++ ] = IvMC
    N = DepthFlag ? T : IvMC
    if( availableFlagA1 && ( !availableFlagN || differentMotion( N, A1 ) ) )
      extMergeCandList[ i++ ] = A1
    if( availableFlagB1 && ( !availableFlagN || differentMotion( N, B1 ) ) )
      extMergeCandList[ i++ ] = B1
    if( availableFlagB0 )
      extMergeCandList[ i++ ] = B0 (I 104)
    if( availableFlagIvDC && ( !availableFlagA1 || differentMotion( A1, IvDC ) ) &&
      ( !availableFlagB1 || differentMotion( B1, IvDC ) ) &&
( i < ( 5 + NumExtraMergeCand ) ) )
      extMergeCandList[ i++ ] = IvDC
    if( availableFlagVSP && !ic_flag && iv_res_pred_weight_idx = = 0 &&     i < ( 5 + NumExtraMergeCand ) )
      extMergeCandList[ i++ ] = VSP
    if( availableFlagA0 && i < ( 5 + NumExtraMergeCand ) )

TABLE 1-continued

```
                extMergeCandList[ i++ ] = A0
            if( availableFlagB2 && i < ( 5 + NumExtraMergeCand ) )
                extMergeCandList[ i++ ] = B2
            if( availableFlagIvMCShift && i < ( 5 + NumExtraMergeCand )
&&                                                                                  ( !availableFlagIvMC ||
differentMotion( IvMC, IvMCShift ) ) )
                extMergeCandList[ i++ ] = IvMCShift
            if( availableFlagIvDCShift && i < ( 5 + NumExtraMergeCand ) )
                extMergeCandList[ i++ ] = IvDCShift
            j = 0
            while( i < MaxNumMergeCand ) (I 105)
                N = baseMergeCandList[ j++ ]
                if( N != A1 && N != B1 && N != B0
&& N != A0 && N != B2 )
                    extMergeCandList[ i++ ] = N
8.          The variable N is derived as specified in the following:
            If ( nOrigPbW + nOrigPbH ) is equal to 12, the following applies:
            N = baseMergeCandList[ merge_idx[ xOrigP ][ yOrigP ] ] (I106)
            Otherwise, ( ( nOrigPbW + nOrigPbH ) is not equal to 12 ), the following applies:
            N = extMergeCandList[ merge_idx[ xOrigP ][ yOrigP ] ] (I107)
9.          The derivation process for a view synthesis prediction flag as specified in
subclauseI.8.5.3.2.18is invoked with the luma location (the luma location (the variables nPbW
and nPbH, the merge candidate indicator N as the inputs, and the output is the
mergeCandIsVspFlag.
10.         The variable vspModeFlag is derived as specified in the following:
vspModeFlag = mergeCandIsVspFlag && !ic_flag &&
            ( iv_res_pred_weight_idx = = 0) && availableFlagVSP
            (I108)
11.         The variable subPbMotionFlag is derived as specified in the following:
subPbMotionFlag = ( ( N = = IvMC) || vspModeFlag ) && !dbbp_flag
            (I109)
12.         The following assignments are made with X being replaced by 0 or 1:
mvLX = subPbMotionFlag ? 0 : mvLXN (I 110)
refIdxLX = subPbMotionFlag ? ?1: refIdxLXN (I 111)
predFlagLX = subPbMotionFlag ? 0 : predFlagLXN
            (I112)
13.         When all of the following conditions are true, refIdxL1 is set equal to −1 and
predFlagL1 is set equal to 0:
            predFlagL0 and predFlagL1 are equal to 1
            ( nOrigPbW + nOrigPbH ) is equal to 12 or dbbp_flag is equal to 1
14.         The disparity availability flag ivpMvFlag is derived as follows:
ivpMvFlag = !DepthFlag && ( ( N = = IvMC) || ( N = = IvMCShift ) ) (I113)
15.         The variable dispDerivedDepthFlag is derived as follows:
dispDerivedDepthFlag = ( N = = D )
```

The flow of FIG. 7 may be equally applied even when the luminance compensation is performed on the first layer reference block, not the second layer current block.

In operations 72 through 78, an example in which the inter-layer video decoding apparatus 20 performs the luminance compensation in the view synthesized prediction mode has been described, and the operation of the inter-layer video encoding apparatus 10 has been omitted, but it will be understood by those of skill in the art that an operation corresponding to the operation described above with reference to FIG. 7 may be performed by the video encoding apparatus 10.

As described above, the inter-layer video encoding apparatus 10 and the inter-layer video decoding apparatus 20 according to the embodiments split blocks of divided video data into coding units of a tree structure, and coding units, prediction units, and transformation units are used for interlayer prediction or inter-prediction of the coding unit. Hereinafter, with reference to FIGS. 8 through 20, a video encoding method and apparatus therefor and a video decoding method and apparatus therefor based on coding units and transformation units of a tree structure according to embodiments, are described.

Figure 8:
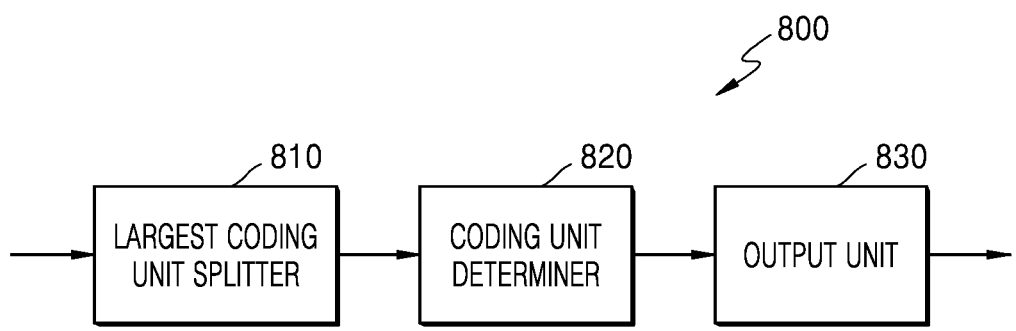
FIG. 8 illustrates a block diagram of a video encoding apparatus based on coding units of a tree structure, according to an embodiment.

FIG. 8 illustrates a block diagram of a video encoding apparatus based on coding units of a tree structure 100, according to an embodiment of the present invention.

The video encoding apparatus involving video prediction based on coding units of the tree structure 100 includes a coding unit determiner 120 and an output unit 130. Hereinafter, for convenience of description, the video encoding apparatus involving video prediction based on coding units of the tree structure 100 is referred to as the 'video encoding apparatus 100'.

The coding unit determiner 120 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 120 encodes at least one split region obtained by splitting a region of the largest coding unit according to depths, and determines a depth to output a finally encoded image data according to the at least one split region. That is, the coding unit determiner 120 determines a final depth by encoding the image data by using the deeper coding units according to depths, according to the largest coding unit of the current picture, and selecting a depth having the least encoding error. The determined final depth and image data according to largest coding units are output to the output unit 130.

The image data in the largest coding unit is encoded based on the deeper coding units corresponding to at least one depth equal to or below the maximum depth, and results of encoding the image data based on each of the deeper coding units are compared. A depth having the least encoding error may be selected after comparing encoding errors of the deeper coding units. At least one final depth may be selected for each largest coding unit.

The size of the largest coding unit is split because a coding unit is hierarchically split as a depth deepens, and the number of coding units increases. Also, even if coding units correspond to the same depth in one largest coding unit, it is determined whether to split each of the coding units into a lower depth by measuring an encoding error with respect to data of each of the coding units. Accordingly, even when data is included in one largest coding unit, the encoding errors according to depths may differ according to regions in the one largest coding unit, and thus the final depths may differ according to regions in the image data. Thus, one or more final depths may be set in one largest coding unit, and the data of the largest coding unit may be divided according to coding units of one or more final depths.

Accordingly, the coding unit determiner 120 according to an embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be independently determined in different regions. Equally, a final depth in a current region may be independently determined from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, has to be performed on all of the deeper coding units generated as the depth deepens. For convenience of description, the prediction encoding and the transformation will now be described based on a coding unit of a current depth, in at least one largest coding unit.

The video encoding apparatus 100 may variously select a size or shape of a data unit for encoding the image data. In order to encode the image data, operations, such as prediction encoding, transformation, and entropy encoding, are performed, and at this time, the same data unit may be used for all operations or a data unit may vary in each of the operations.

For example, the video encoding apparatus 100 may select not only a coding unit for encoding the image data, but may also select a data unit different from the coding unit so as to perform the prediction encoding on the image data of the coding unit.

In order to perform prediction encoding in the largest coding unit, the prediction encoding may be performed based on a coding unit corresponding to a final depth, i.e., based on a coding unit that is no longer split into coding units of a lower depth. Hereinafter, the coding unit that is no longer split and becomes a base unit for prediction encoding will now be referred to as a 'prediction unit'. A partition obtained by splitting the prediction unit may include a prediction unit and a data unit obtained by splitting at least one selected from a height and a width of the prediction unit. A partition may be a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding may be independently performed on one prediction unit in a coding unit, thereby selecting a prediction mode generating a least encoding error.

The video encoding apparatus 100 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. That is, with respect to the transformation unit, the transformation unit having the tree structure may be set according to the transformation depths.

Split information according to depths requires not only information about a depth but also requires information related to prediction and transformation. Accordingly, the coding unit determiner 120 not only determines a depth having a least encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 120 may measure an encoding error of deeper coding units according to depths by using Rate-Distortion Optimization based on Lagrangian multipliers.

The output unit 130 outputs, in bitstreams, the image data of the largest coding unit, which is encoded based on the at least one depth determined by the coding unit determiner 120, and information according to depths.

The encoded image data may be obtained by encoding residual data of an image.

The information according to depths may include depth information, partition mode information about the prediction unit, prediction mode information, and transformation unit split information.

Final depth information may be defined by using split information according to depths, which indicates whether encoding is performed on coding units of a lower depth instead of a current depth. If the current depth of the current coding unit is a depth, the current coding unit is encoded by using the coding unit of the current depth, and thus split information of the current depth may be defined not to split the current coding unit to a lower depth. On the contrary, if the current depth of the current coding unit is not the depth, the encoding has to be performed on the coding unit of the lower depth, and thus the split information of the current depth may be defined to split the current coding unit to the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 130 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 130 may be classified into encoding information according to deeper coding units, and encoding information according to prediction units. The encoding information according to the deeper coding units may include the prediction mode information and the partition size information. The encoding information according to the prediction units may include information about an estimated direction during an inter mode, about a reference image index of the inter mode, about a motion vector, about a chroma component of an intra mode, and about an interpolation method during the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 130 may encode and output reference information, prediction information, and slice type information that are related to prediction.

According to the simplest embodiment for the video encoding apparatus 100, the deeper coding unit may be a coding unit obtained by dividing a height or width of a coding unit of an upper depth, which is one layer above, by two. That is, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 100 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The inter-layer video encoding apparatus 10 described above with reference to FIG. 1A may include the video encoding apparatuses 100 corresponding to the number of layers so as to encode single layer images in each of the layers of a multilayer video. For example, the first layer encoder 12 may include one video encoding apparatus 100, and the second layer encoder 14 may include the video encoding apparatuses 100 corresponding to the number of second layers.

When the video encoding apparatus 100 encodes first layer images, the coding unit determiner 120 may determine a prediction unit for inter-image prediction for each of coding units of a tree structure according to each largest coding unit, and may perform the inter-image prediction on each prediction unit.

When the video encoding apparatus 100 encodes the second layer images, the coding unit determiner 120 may determine prediction units and coding units of a tree structure according to each largest coding unit, and may perform inter-prediction on each of the prediction units.

The video encoding apparatus 100 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

Figure 9:
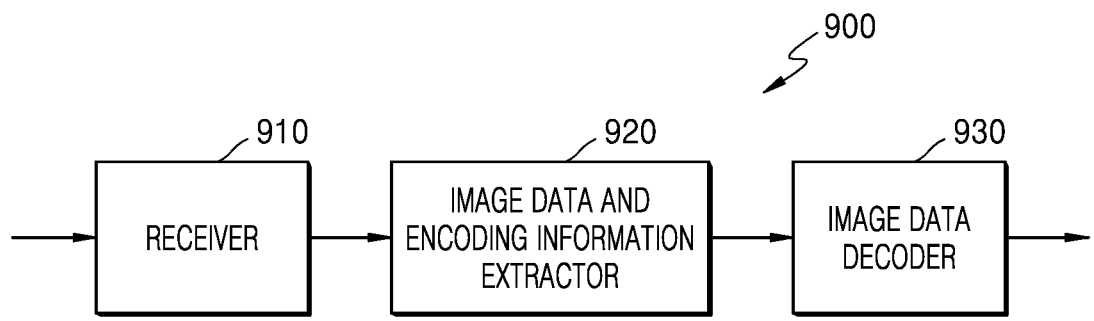
FIG. 9 illustrates a block diagram of a video decoding apparatus based on coding units of a tree structure, according to an embodiment.

FIG. 9 illustrates a block diagram of a video decoding apparatus based on coding units of a tree structure 200, according to an embodiment.

The video decoding apparatus involving video prediction based on coding units of the tree structure 200 according to the embodiment includes a receiver 210, an image data and encoding information extractor 220, and an image data decoder 230. Hereinafter, for convenience of description, the video decoding apparatus involving video prediction based on coding units of the tree structure 200 according to the embodiment is referred to as the 'video decoding apparatus 200'.

Definitions of various terms, such as a coding unit, a depth, a prediction unit, a transformation unit, and various types of split information for decoding operations of the video decoding apparatus 200 according to the embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each largest coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts a final depth and split information about the coding units having a tree structure according to each largest coding unit, from the parsed bitstream. The extracted final depth and the extracted split information are output to the image data decoder 230. That is, the image data in a bitstream is split into the largest coding unit so that the image data decoder 230 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 220 are a depth and split information determined to generate a minimum encoding error when an encoder, such as the video encoding apparatus 100, repeatedly performs encoding for each deeper coding unit according to depths according to each largest coding unit. Accordingly, the video decoding apparatus 200 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 220 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 230 reconstructs the current picture by decoding the image data in each largest coding unit based on the depth and the split information according to each of the largest coding units. That is, the image data decoder 230 may decode the encoded image data based on the read information about the partition mode, the prediction mode, and the transformation unit for each coding unit from among the coding units having the tree structure included in each largest coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to depths.

In addition, the image data decoder 230 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 230 may determine a depth of a current largest coding unit by using split information according to depths. If the split information indicates that image data is no longer split in the current depth, the current depth is a depth. Accordingly, the image data decoder 230 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The inter-layer video decoding apparatus 20 described above with reference to FIG. 2A may include the video decoding apparatuses 200 corresponding to the number of views, so as to reconstruct first layer images and second layer images by decoding a received first layer image stream and a received second layer image stream.

When the first layer image stream is received, the image data decoder 230 of the video decoding apparatus 200 may split samples of the first layer images, which are extracted from the first layer image stream by an extractor 220, into coding units according to a tree structure of a largest coding unit. The image data decoder 230 may perform motion compensation, based on prediction units for the inter-image prediction, on each of the coding units according to the tree structure of the samples of the first layer images, and may reconstruct the first layer images.

When the second layer image stream is received, the image data decoder 230 of the video decoding apparatus 200 may split samples of the second layer images, which are extracted from the second layer image stream by the extractor 220, into coding units according to a tree structure of a largest coding unit. The image data decoder 230 may perform motion compensation, based on prediction units for the inter-image prediction, on each of the coding units of the samples of the second layer images, and may reconstruct the second layer images.

The extractor 220 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 200 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
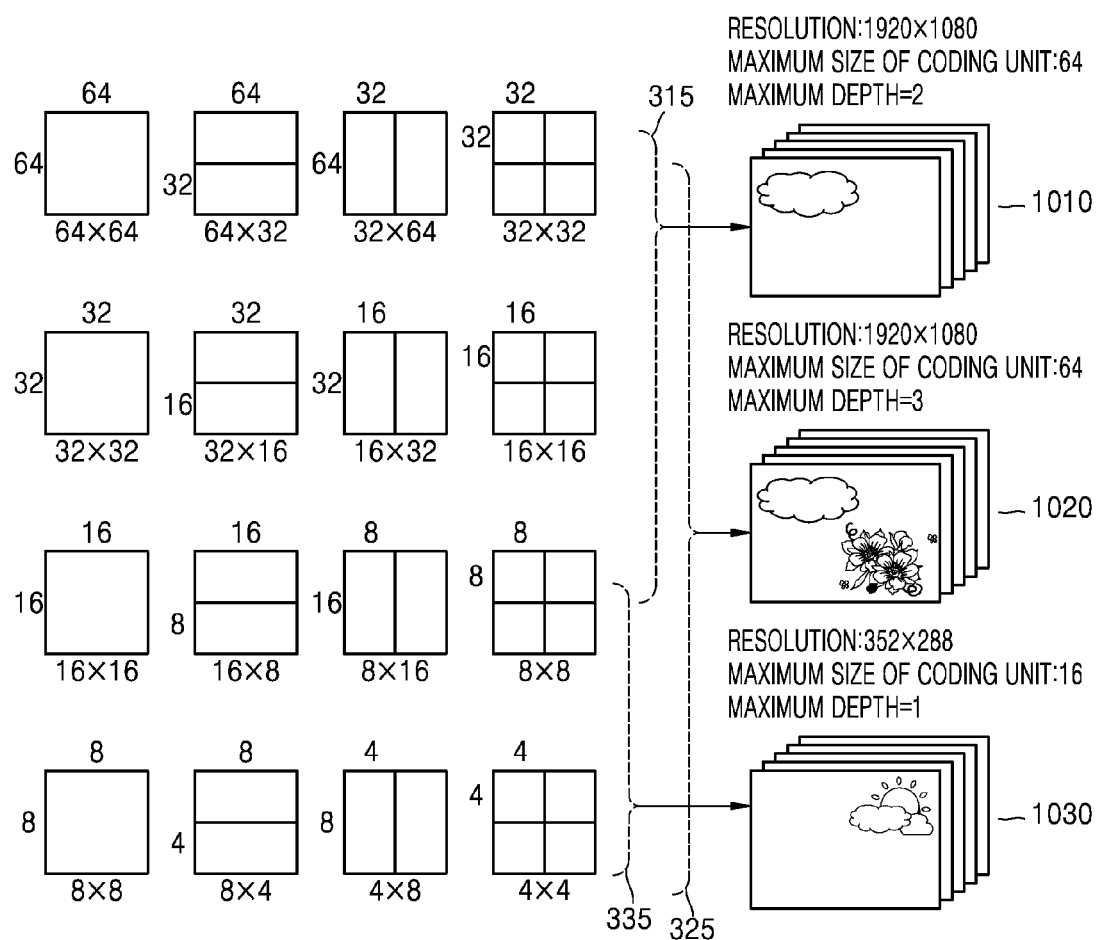
FIG. 10 illustrates a concept of coding units, according to an embodiment of the present invention.

FIG. 10 illustrates a concept of coding units, according to an embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a largest coding unit having a long axis size of 64, and coding units having long axis sizes of 32 and 16 since depths are deepened to two layers by splitting the largest coding unit twice. On the other hand, since the maximum depth of the video data 330 is 1, coding units 335 of the video data 330 may include a largest coding unit having a long axis size of 16, and coding units having a long axis size of 8 since depths are deepened to one layer by splitting the largest coding unit once.

Since the maximum depth of the video data 320 is 3, coding units 325 of the video data 320 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
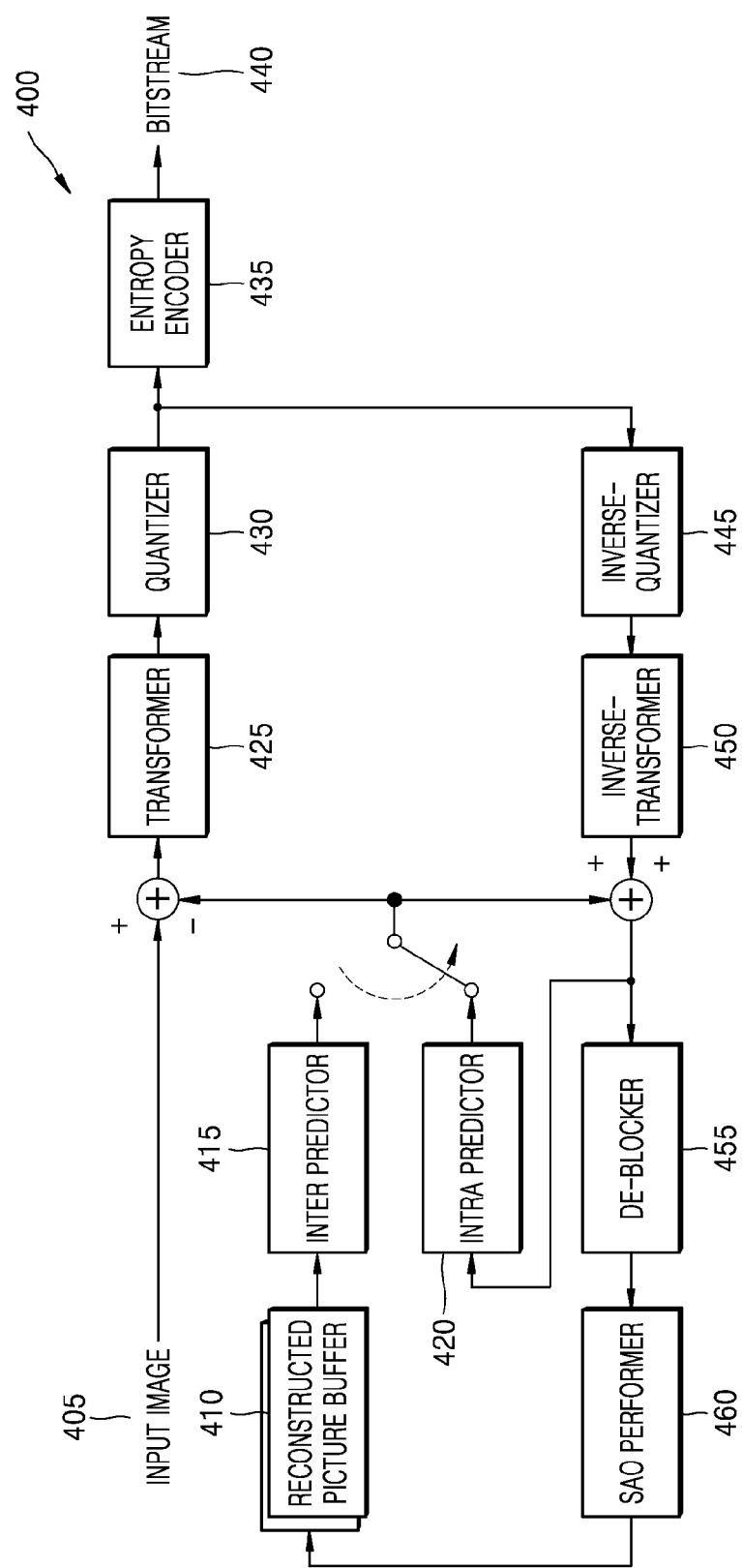
FIG. 11 illustrates a block diagram of an image encoder based on coding units, according to an embodiment of the present invention.

FIG. 11 illustrates a block diagram of an image encoder 400 based on coding units, according to an embodiment.

The image encoder 400 according to the embodiment performs operations necessary for encoding image data in a picture encoder 120 of the video encoding apparatus 100. That is, an intra predictor 420 performs intra prediction on coding units in an intra mode according to prediction units, from among a current image 405, and an inter predictor 415 performs inter prediction on coding units in an inter mode by using the current image 405 and a reference image obtained from a reconstructed picture buffer 410 according to prediction units. The current image 405 may be split into largest coding units and then the largest coding units may be sequentially encoded. In this regard, encoding may be performed on coding units of a tree structure which are split from the largest coding unit.

Residue data is generated by removing prediction data regarding coding units of each mode that is output from the intra predictor 420 or the inter predictor 415 from data regarding encoded coding units of the current image 405, and the residue data is output as a quantized transformation coefficient according to transformation units via a transformer 425 and a quantizer 430. The quantized transformation coefficient is reconstructed as the residue data in a spatial domain via an inverse-quantizer 445 and an inverse-transformer 450. The reconstructed residue data in the spatial domain is added to prediction data for coding units of each mode that is output from the intra predictor 420 or the inter predictor 415 and thus is reconstructed as data in a spatial domain for coding units of the current image 405. The reconstructed data in the spatial domain is generated as reconstructed images via a de-blocker 455 and an SAO performer 460. The reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 via an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the inverse-quantizer 445, the inverse-transformer 450, the de-blocker 455, and the SAO performer 460, perform operations based on each coding unit among coding units having a tree structure according to each largest coding unit.

In particular, the intra predictor 420 and the inter predictor 415 may determine a partition mode and a prediction mode of each coding unit from among the coding units having a tree structure by taking into account a maximum size and a maximum depth of a current largest coding unit, and the transformer 425 may determine whether to split a transformation unit having a quadtree structure in each coding unit from among the coding units having a tree structure.

Figure 12:
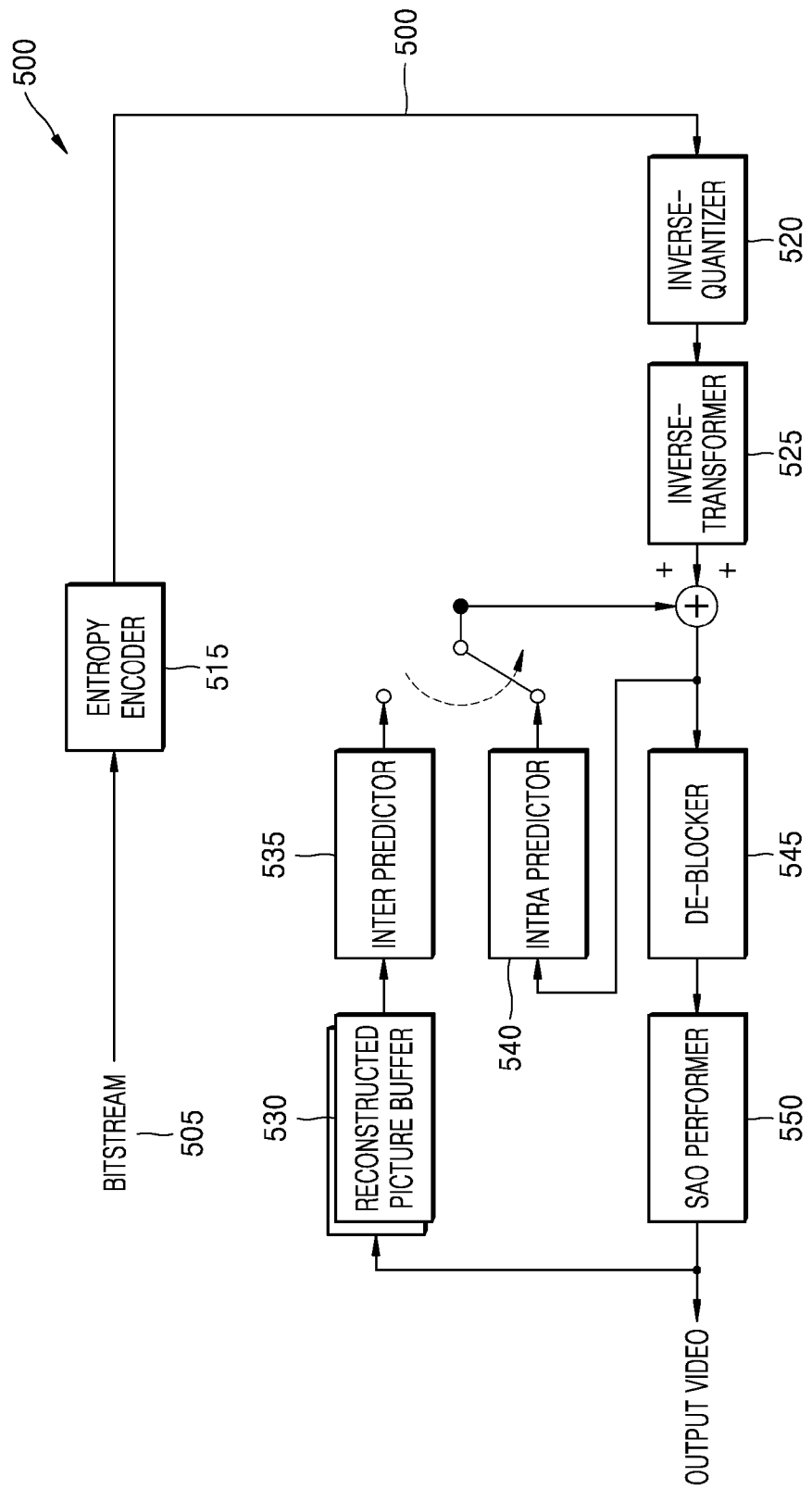
FIG. 12 illustrates a block diagram of an image decoder based on coding units, according to an embodiment of the present invention.

FIG. 12 illustrates a block diagram of an image decoder 500 based on coding units, according to an embodiment.

An entropy decoder 515 parses decoding-target encoded image data and encoding information required for decoding from a bitstream 505. The encoded image data is a quantized transformation coefficient, and an inverse-quantizer 520 and an inverse-transformer 525 reconstructs residue data from the quantized transformation coefficient.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residue data regarding coding units of each mode which passed through the intra predictor 540 or the inter predictor 535 are summed, and thus data in a spatial domain regarding coding units of the current image 405 may be reconstructed, and the reconstructed data in the spatial domain may be output as a reconstructed image 560 via a de-blocker 545 and an SAO performer 550. Reconstructed images stored in the reconstructed picture buffer 530 may be output as reference images.

In order to decode the image data in a picture decoder 230 of the video decoding apparatus 200, operations after the entropy decoder 515 of the image decoder 500 according to an embodiment may be performed.

In order for the image decoder 500 to be applied in the video decoding apparatus 200 according to an embodiment, all elements of the image decoder 500, i.e., the entropy decoder 515, the inverse-quantizer 520, the inverse-transformer 525, the inter predictor 540, the inter predictor 535, the de-blocker 545, and the SAO performer 550 may perform operations based on coding units having a tree structure for each largest coding unit.

In particular, the SAO performer 550 and the inter predictor 535 may determine a partition mode and a prediction mode for each of the coding units having a tree structure, and the inverse-transformer 525 may determine whether to split a transformation unit according to a quadtree structure for each of the coding units.

The encoding operation of FIG. 10 and the decoding operation of FIG. 11 describe each of videostream encoding and decoding operations in a single layer, respectively. Thus, if the encoder 12 of FIG. 1A encodes a videostream of two or more layers, the image encoder 400 may be provided for each layer. Similarly, if the decoder 26 of FIG. 2A decodes a videostream of two or more layers, the image decoder 500 may be provided for each layer.

Figure 13:
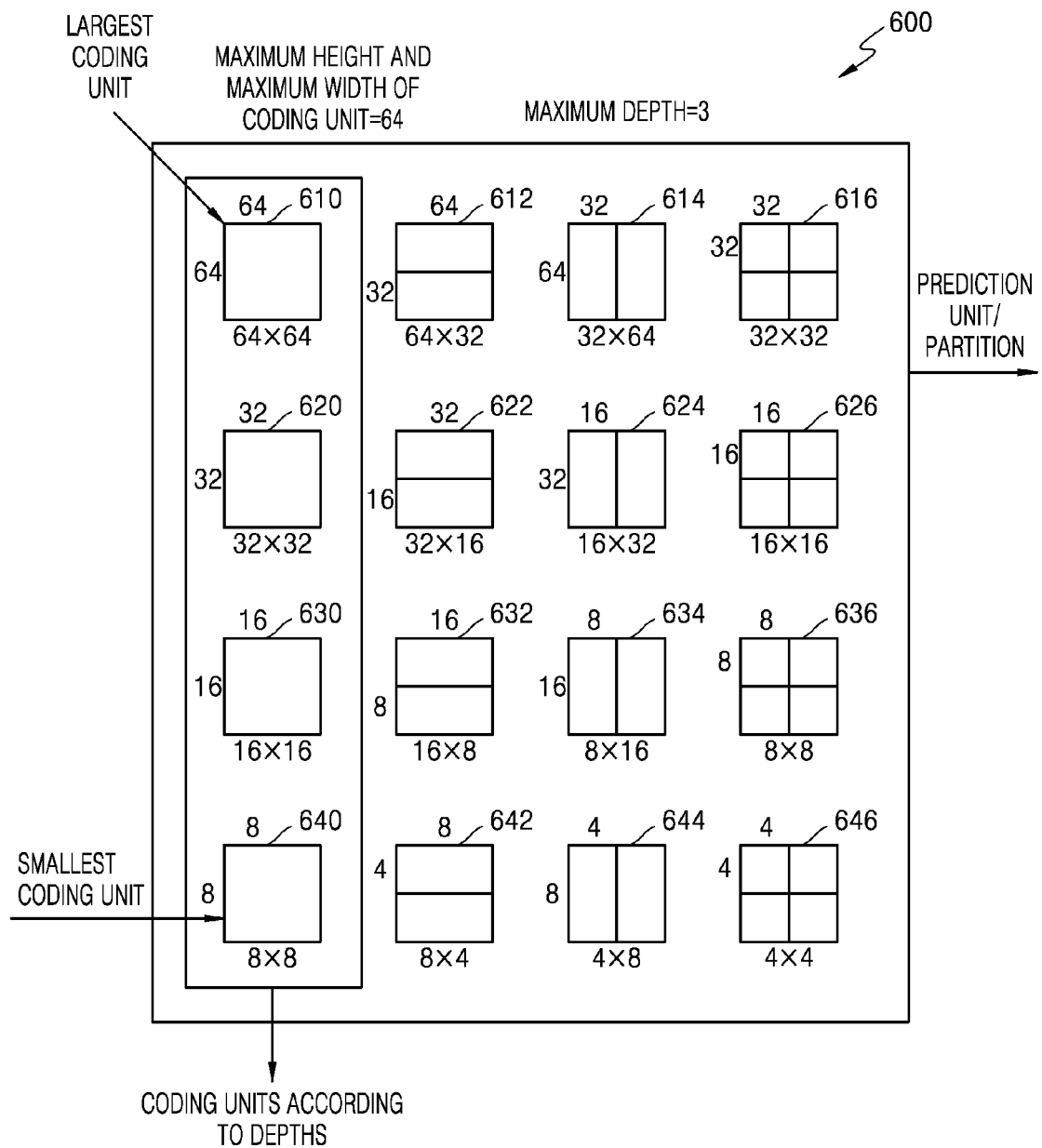
FIG. 13 illustrates deeper coding units according to depths, and partitions, according to an embodiment of the present invention.

FIG. 13 illustrates a diagram illustrating deeper coding units according to depths, and partitions, according to an embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 600 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 600, a height and a width of the deeper coding unit are each split. Also, a prediction unit and partitions, which are bases for prediction encoding of each deeper coding unit, are shown along a horizontal axis of the hierarchical structure of coding units 600.

That is, a coding unit 610 is a largest coding unit in the hierarchical structure of coding units 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having the size of 8×8 and the depth of 3 is a smallest coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the coding unit 610 having the size of 64×64, i.e. a partition 610 having a size of 64×64, partitions 612 having the size of 64×32, partitions 614 having the size of 32×64, or partitions 616 having the size of 32×32.

Equally, a prediction unit of the coding unit 620 having the size of 32×32 and the depth of 1 may be split into partitions included in the coding unit 620 having the size of 32×32, i.e. a partition 620 having a size of 32×32, partitions 622 having a size of 32×16, partitions 624 having a size of 16×32, and partitions 626 having a size of 16×16.

Equally, a prediction unit of the coding unit 630 having the size of 16×16 and the depth of 2 may be split into partitions included in the coding unit 630 having the size of 16×16, i.e. a partition 630 having a size of 16×16 included in the coding unit 630, partitions 632 having a size of 16×8, partitions 634 having a size of 8×16, and partitions 636 having a size of 8×8.

Equally, a prediction unit of the coding unit 640 having the size of 8×8 and the depth of 3 may be split into partitions included in the coding unit 640 having the size of 8×8, i.e. a partition 640 having a size of 8×8 included in the coding unit 640, partitions 642 having a size of 8×4, partitions 644 having a size of 4×8, and partitions 646 having a size of 4×4.

In order to determine a depth of the largest coding unit 610, the coding unit determiner 120 of the video encoding apparatus 100 has to perform encoding on coding units respectively corresponding to depths included in the largest coding unit 610.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 600. Alternatively, the minimum encoding error may be searched for by comparing representative encoding errors according to depths, by performing encoding for each depth as the depth deepens along the vertical axis of the hierarchical structure of coding units 600. A depth and a partition generating the minimum encoding error in the largest coding unit 610 may be selected as a depth and a partition mode of the largest coding unit 610.

Figure 14:
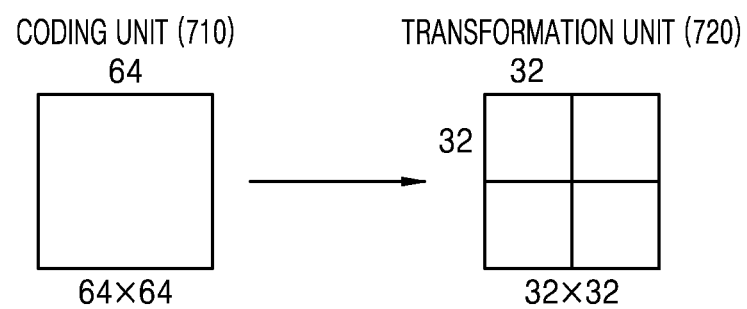
FIG. 14 illustrates a relationship between a coding unit and transformation units, according to an embodiment of the present invention.

FIG. 14 illustrates a relationship between a coding unit and transformation units, according to an embodiment.

The video encoding apparatus 100 or the video decoding apparatus 200 encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 100 or the video decoding apparatus 200, when a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to an original image may be selected.

Figure 15:
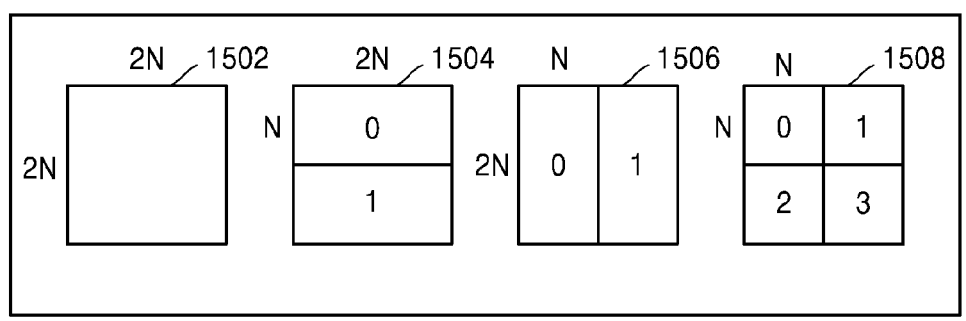
FIG. 15 illustrates a plurality of pieces of encoding information, according to an embodiment of the present invention.
Figure 15:
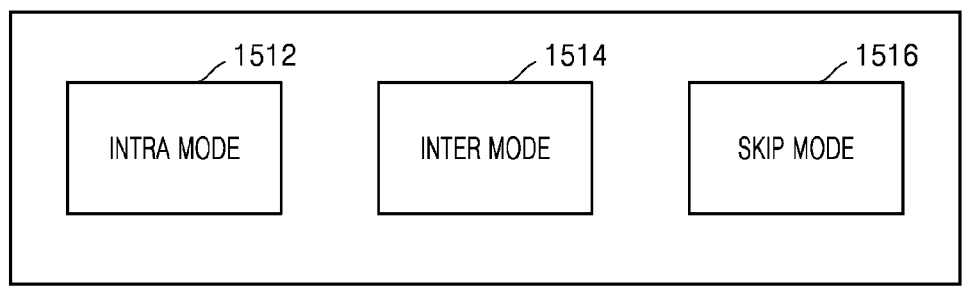
Figure 15:
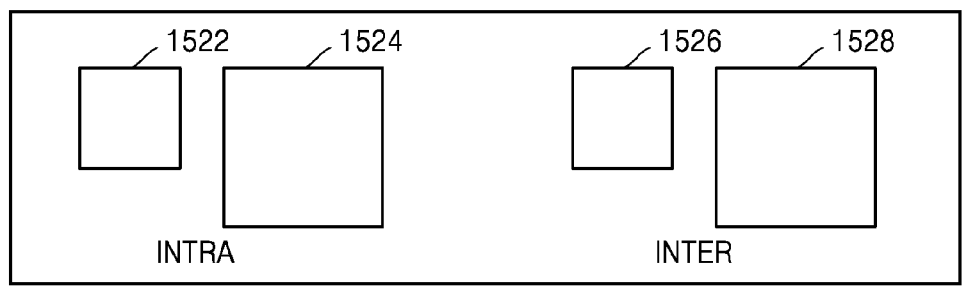

FIG. 15 illustrates a plurality of pieces of encoding information, according to an embodiment.

The output unit 130 of the video encoding apparatus 100 may encode and transmit, as split information, partition mode information 800, prediction mode information 810, and transformation unit size information 820 for each coding unit corresponding to a depth.

The partition mode information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the partition mode information 800 about a current coding unit is set to indicate one of the partition 804 having a size of 2N×N, the partition 806 having a size of N×2N, and the partition 808 having a size of N×N.

The prediction mode information 810 indicates a prediction mode of each partition. For example, the prediction mode information 810 may indicate a mode of prediction encoding performed on a partition indicated by the partition mode information 800, i.e., an intra mode 812, an inter mode 814, or a skip mode 816.

The transformation unit size information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 210 of the video decoding apparatus 200 may extract and use the partition mode information 800, the prediction mode information 810, and the transformation unit size information 820 for decoding, according to each deeper coding unit.

Figure 16:
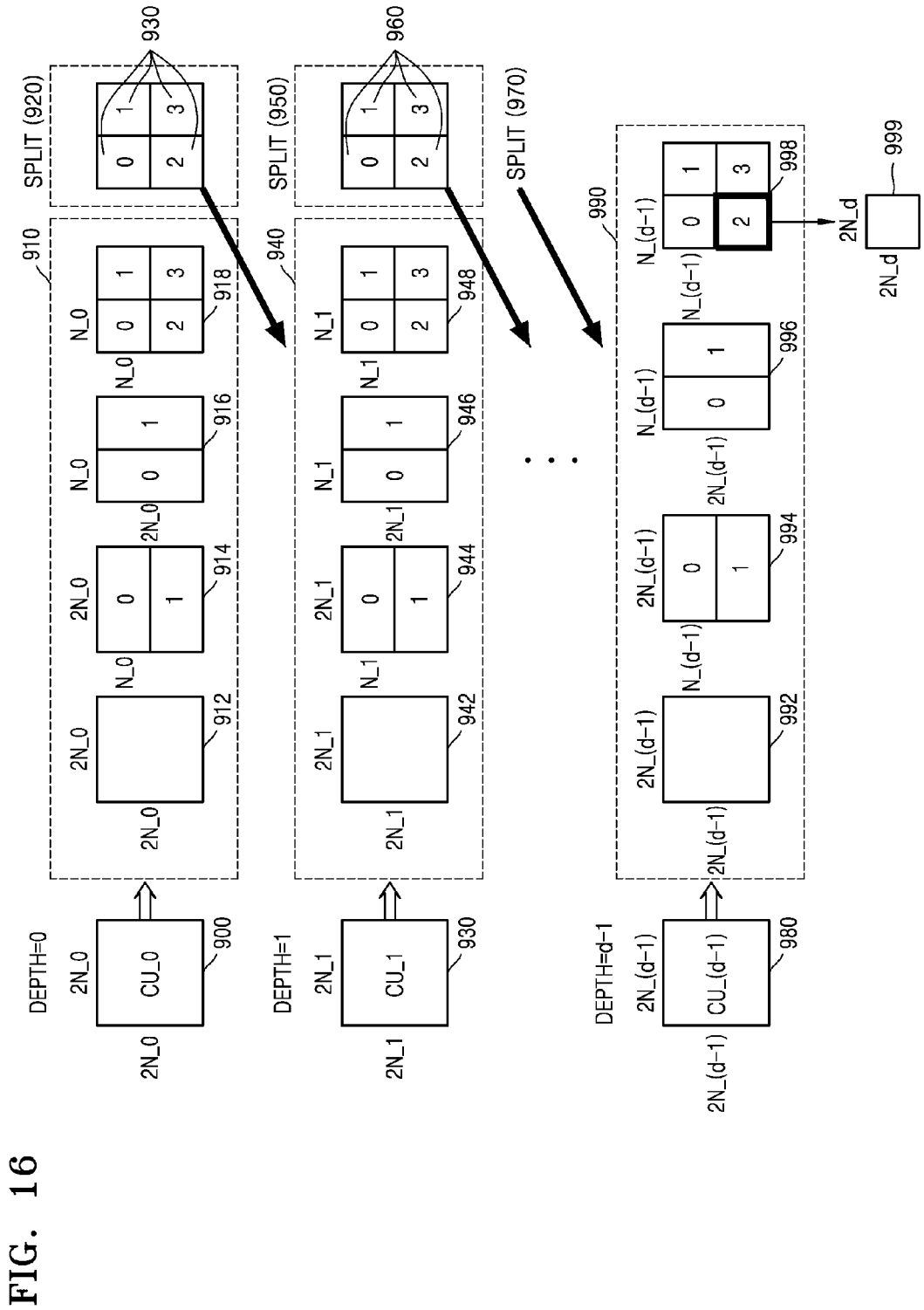
FIG. 16 illustrates coding units, according to an embodiment of the present invention.

FIG. 16 illustrates deeper coding units according to depths, according to an embodiment.

Split information may be used to indicate a change in a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition mode 912 having a size of 2N_0×2N_0, a partition mode 914 having a size of 2N_0× N_0, a partition mode 916 having a size of N_0×2N_0, and a partition mode 918 having a size of N_0×N_0. Only the partition modes 912, 914, 916, and 918 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition modes 912, 914, and 916 having the sizes of 2N_0×2N_0, 2N_0×N_0 and N_0×2N_0, the prediction unit 910 may not be split into a lower depth.

If the encoding error is the smallest in the partition mode 918 having the size of N_0×N_0, a depth is changed from 0 to 1 and split is performed (operation 920), and encoding may be repeatedly performed on coding units 930 of a partition mode having a depth of 2 and a size of N_0×N_0 so as to search for a minimum encoding error.

A prediction unit 930 for prediction encoding the coding unit 930 having a depth of 1 and a size of 2N_1×2N_1 (=N_0×N_0) may include a partition mode 942 having a size of 2N_1×2N_1, a partition mode 944 having a size of 2N_1×N_1, a partition mode 946 having a size of N_1×2N_1, and a partition mode 948 having a size of N_1×N_1.

If an encoding error is the smallest in the partition mode 948 having the size of N_1×N_1, a depth is changed from 1 to 2 and split is performed (in operation 950), and encoding may be repeatedly performed on coding units 960 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 970), a prediction unit 990 for prediction encoding a coding unit 980 having a depth of d−1 and a size of 2N_(d−1)×2N_(d−1) may include partitions of a partition mode 992 having a size of 2N_(d−1)×2N_(d−1), a partition mode 994 having a size of 2N_(d−1)×N_(d−1), a partition mode 996 having a size of N_(d−1)×2N_(d−1), and a partition mode 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition type 998 having the size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 900 is determined to be d−1 and a partition mode of the current largest coding unit 900 may be determined to be N_(d−1)×N_(d−1). Also, since the maximum depth is d, split information for the coding unit 952 corresponding to a depth of d−1 is not set.

A data unit 999 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 100 according to the embodiment may select a depth having the least encoding error by comparing encoding errors according to depths of the coding unit 900 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 220 of the video decoding apparatus 200 according to the embodiment may extract and use a depth and prediction unit information about the coding unit 900 so as to decode the coding unit 912. The video decoding apparatus 200 according to the embodiment may determine a depth, in which split information is '0', as a depth by using split information according to depths, and may use, for decoding, split information about the corresponding depth.

Figure 17:
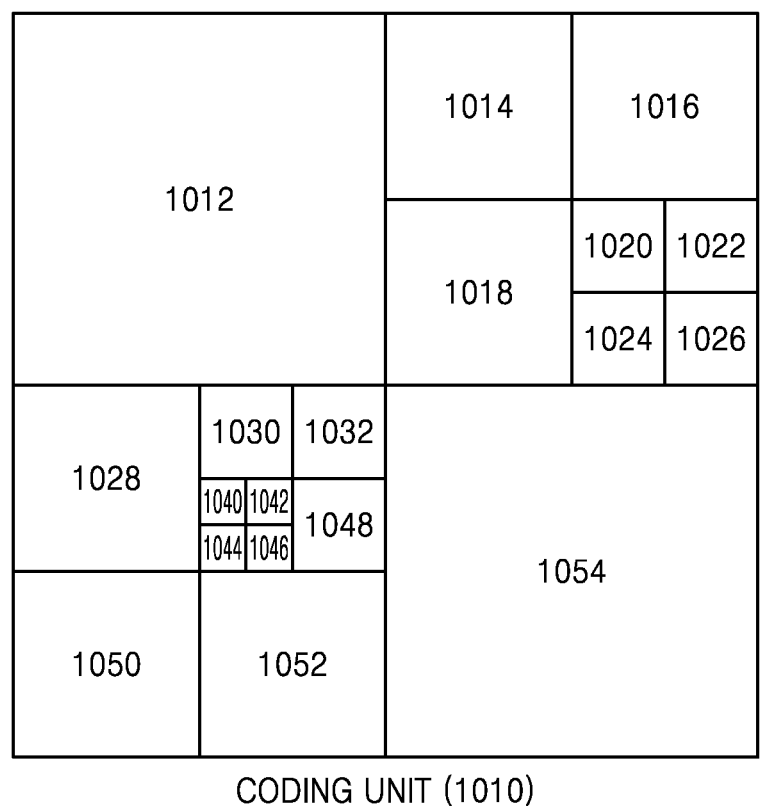
FIGS. 17, 18, and 19 illustrate relationship between coding units, prediction units, and transformation units, according to embodiments of the present invention.
Figure 18:
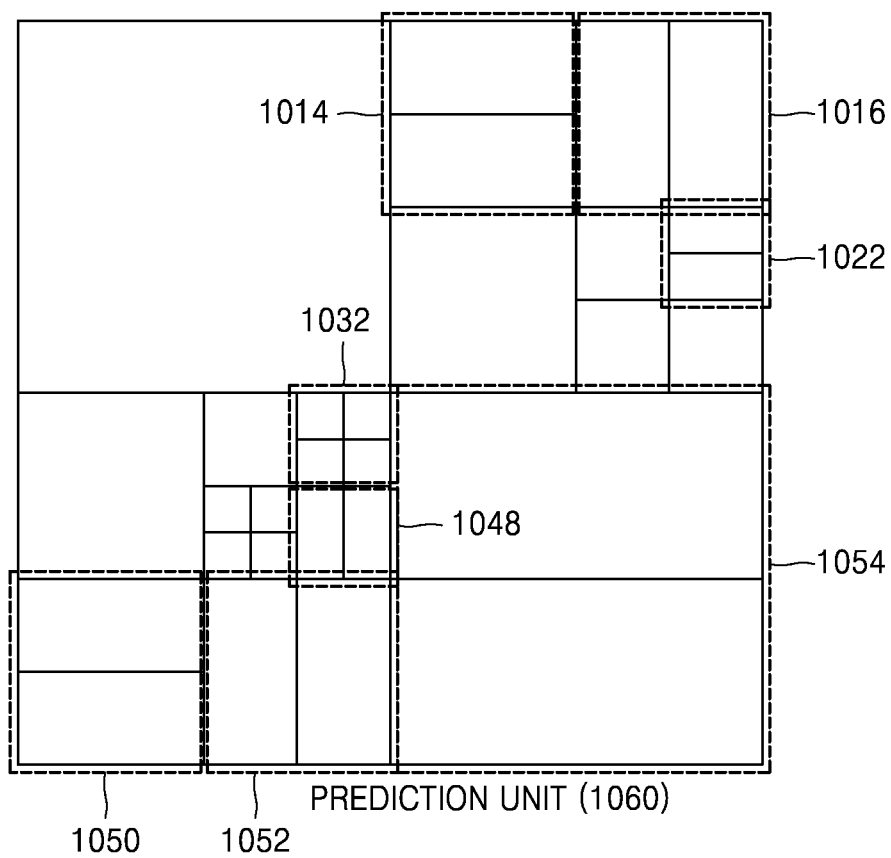
Figure 19:
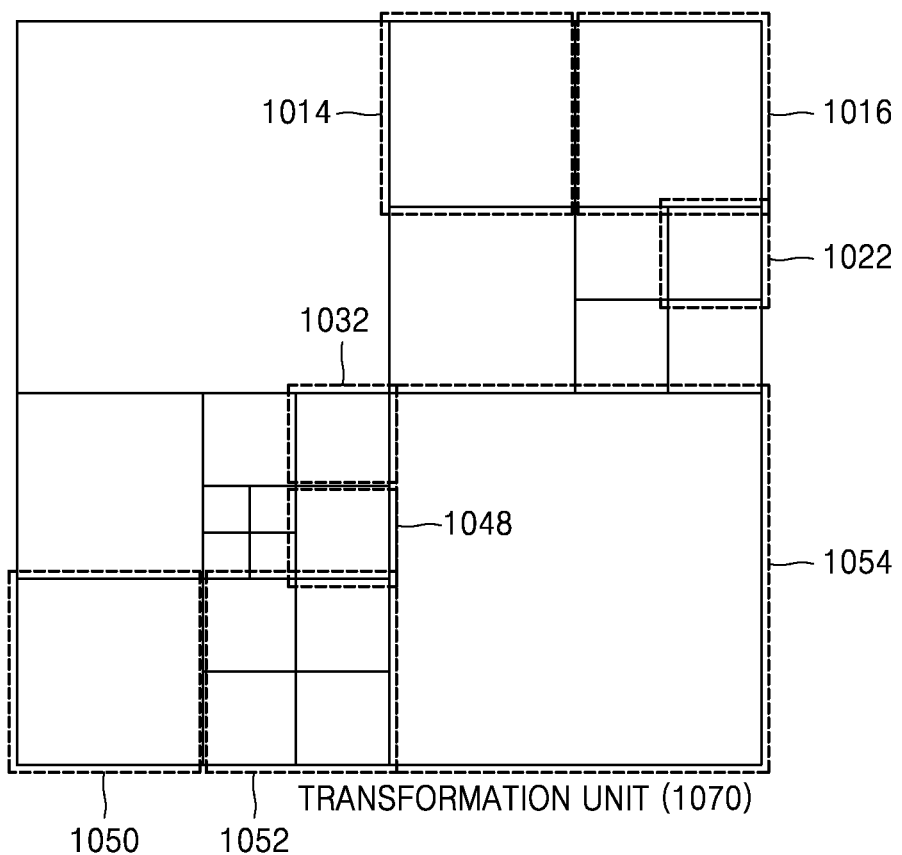

FIGS. 17, 18, and 19 illustrate a relationship between coding units, prediction units, and transformation units, according to an embodiment.

Coding units 1010 are deeper coding units according to depths determined by the video encoding apparatus 100, in a largest coding unit. Prediction units 1060 are partitions of prediction units of each of the coding units 1010 according to depths, and transformation units 1070 are transformation units of each of the coding units according to depths.

When a depth of a largest coding unit is 0 in the deeper coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

Some partitions 1014, 1016, 1022, 1032, 1048, 1050, 1052, and 1054 from among the prediction units 1060 are obtained by splitting the coding unit. That is, partitions 1014, 1022, 1050, and 1054 are a partition mode having a size of 2N×N, partitions 1016, 1048, and 1052 are a partition mode having a size of N×2N, and a partition 1032 is a partition mode having a size of N×N. Prediction units and partitions of the deeper coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, 1052, and 1054 in the transformation units 1060 are data units different from those in the prediction units 1060 in terms of sizes and shapes. That is, the video encoding apparatus 100 and the video decoding apparatus 200 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition mode information, prediction mode information, and transformation unit size information. Table 2 below shows the encoding information that may be set by the video encoding apparatus 100 and the video decoding apparatus 200 according to the embodiments.

TABLE 2

Split Information 0
(Encoding on Coding Unit having Size of 2N × 2N and Current Depth of d)

| Prediction Mode | Partition Type | | Size of Transformation Unit | | Split Information 1 |
|---|---|---|---|---|---|
| Intra Inter Skip (Only 2N × 2N) | Symmetrical Partition Type | Asymmetrical Partition Type | Split Information 0 of Transformation Unit | Split Information 1 of Transformation Unit | Repeatedly Encode Coding Units having Lower Depth of d + 1 |
| | 2N × 2N | 2N × nU | 2N × 2N | N × N (Symmetrical Partition Type) | |
| | 2N × N | 2N × nD | | | |
| | N × 2N | nL × 2N | | N/2 × N/2 (Asymmetrical Partition Type) | |
| | N × N | nR × 2N | | | |

The output unit 130 of the video encoding apparatus 100 according to the embodiment may output the encoding information about the coding units having a tree structure, and the image data and encoding information extractor 220 of the video decoding apparatus 200 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having the sizes of 2N×nU and 2N×nD may be respectively obtained by splitting the height of the prediction unit in 1:3 and 3:1, and the asymmetrical partition modes having the sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having the size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
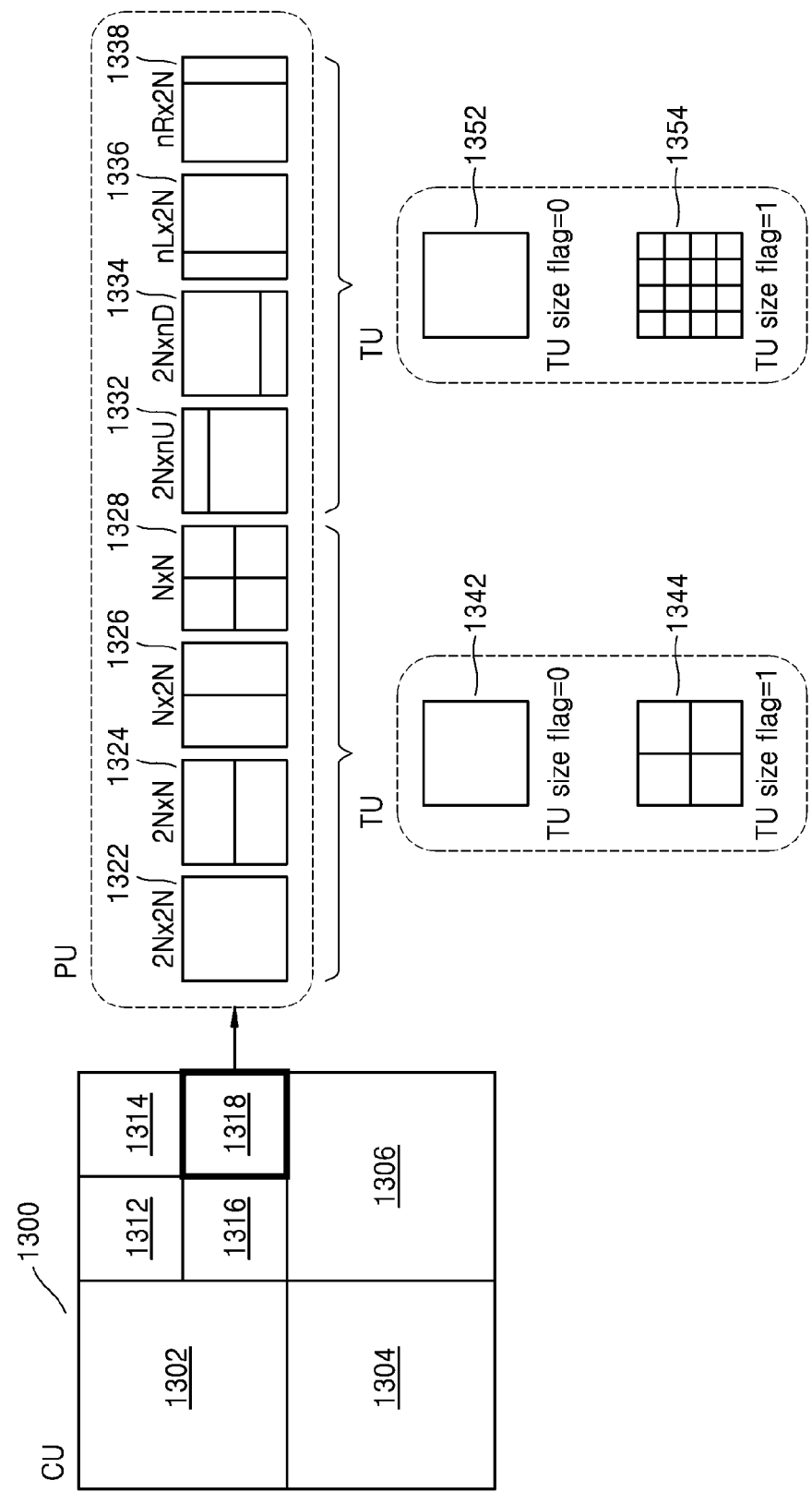
FIG. 20 illustrates a relationship between a coding unit, a prediction unit, and a transformation unit, according to encoding mode information of Table 1.

FIG. 20 illustrates a relationship between a coding unit, a prediction unit, and a transformation unit, according to encoding mode information of Table 2.

A largest coding unit 1300 includes coding units 1302, 1304, 1306, 1312, 1314, 1316, and 1318 of depths. Here, since the coding unit 1318 is a coding unit of a depth, split information may be set to 0. Partition mode information of the coding unit 1318 having a size of 2N×2N may be set to be one of partition modes including 2N×2N 1322, 2N×N 1324, N×2N 1326, N×N 1328, 2N×nU 1332, 2N×nD 1334, nL×2N 1336, and nR×2N 1338.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 1322, 2N×N 1324, N×2N 1326, and N×N 1328, if the transformation unit split information is 0, a transformation unit 1342 having a size of 2N×2N is set, and if the transformation unit split information is 1, a transformation unit 1344 having a size of N×N may be set.

When the partition mode information is set to be one of asymmetrical partition modes 2N×nU 1332, 2N×nD 1334, nL×2N 1336, and nR×2N 1338, if the transformation unit split information (TU size flag) is 0, a transformation unit 1352 having a size of 2N×2N may be set, and if the transformation unit split information is 1, a transformation unit 1354 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 100 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 200 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit may be defined by Equation (1):

$$\text{CurrMinTuSize}=\max(\text{MinTransformSize},\text{RootTuSize}/(2^{\wedge}\text{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize}=\min(\text{MaxTransformSize},\text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and pictures sequences may be reconstructed. The reconstructed video may be reproduced by a reproducing apparatus, may be stored in a storage medium, or may be transmitted via a network.

The one or more embodiments may be written as computer programs and may be implemented in general-use digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the inter-layer video encoding methods and/or the video encoding method, which are described with reference to FIGS. 1A through 20, will be collectively referred to as 'the video encoding method'. Also, the inter-layer video decoding methods and/or the video decoding method, which are described with reference to FIGS. 1A through 20, will be collectively referred to as 'the video decoding method'.

Also, a video encoding apparatus including the inter-layer video encoding apparatus 10, the video encoding apparatus 100, or the image encoder 400 which are described with reference to FIGS. 1A through 20 will be collectively referred as a 'video encoding apparatus'. Also, a video decoding apparatus including the inter-layer video decoding apparatus 20, the video decoding apparatus 200, or the image decoder 500 which are described with reference to FIGS. 1A through 20 will be collectively referred to as a 'video decoding apparatus'.

A computer-readable recording medium storing a program, e.g., a disc 26000, according to an embodiment will now be described in detail.

Figure 21:
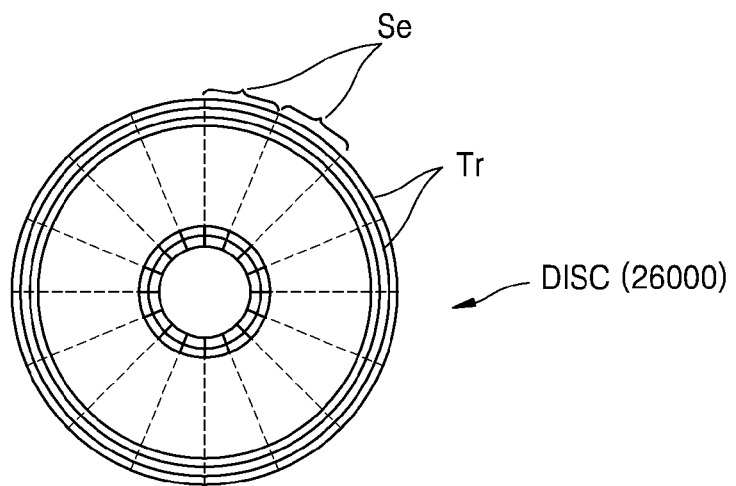
FIG. 21 illustrates a physical structure of a disc in which a program is stored, according to an embodiment.

FIG. 21 illustrates a diagram of a physical structure of the disc 26000 in which a program is stored, according to an embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
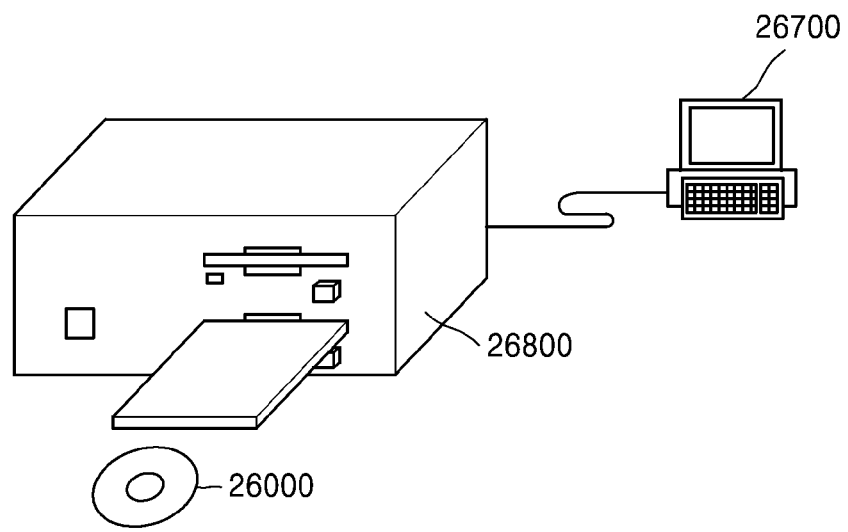
FIG. 22 illustrates a disc drive for recording and reading a program by using the disc.

FIG. 22 illustrates a diagram of a disc drive 26800 for recording and reading a program by using the disc 26000. A computer system 26700 may store a program that executes at least one selected from a video encoding method and a video decoding method according to an embodiment, in the disc 26000 via the disc drive 26800. In order to run the program stored in the disc 26000 in the computer system 26700, the program may be read from the disc 26000 and be transmitted to the computer system 26700 by using the disc drive 26800.

The program that executes at least one of a video encoding method and a video decoding method according to an embodiment may be stored not only in the disc 26000 illustrated in FIGS. 21 and 22 but also may be stored in a memory card, a ROM cassette, or a solid state drive (SSD).

A system to which the video encoding method and the video decoding method described above are applied will be described below.

Figure 23:
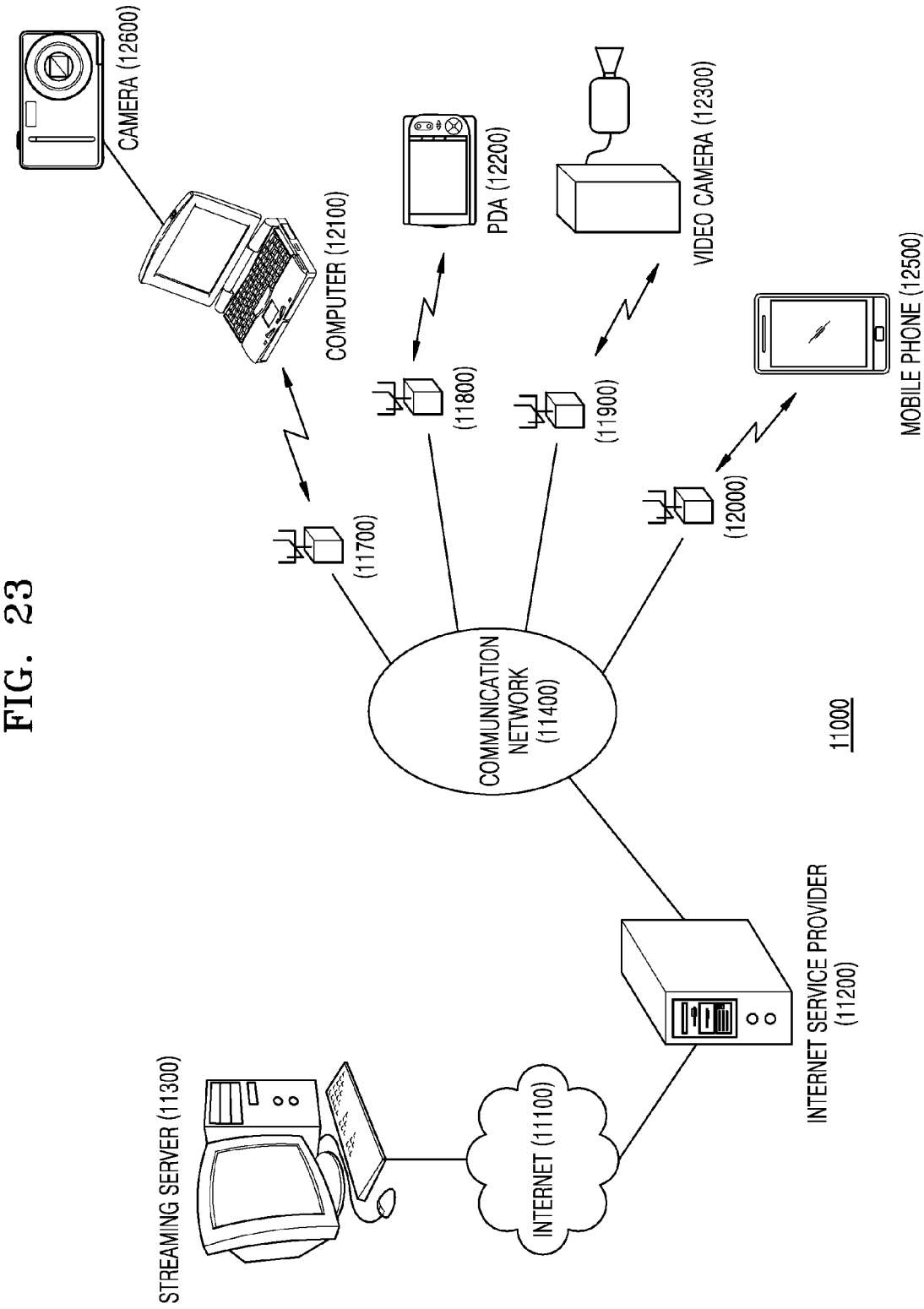
FIG. 23 illustrates an overall structure of a content supply system for providing a content distribution service.

FIG. 23 illustrates a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
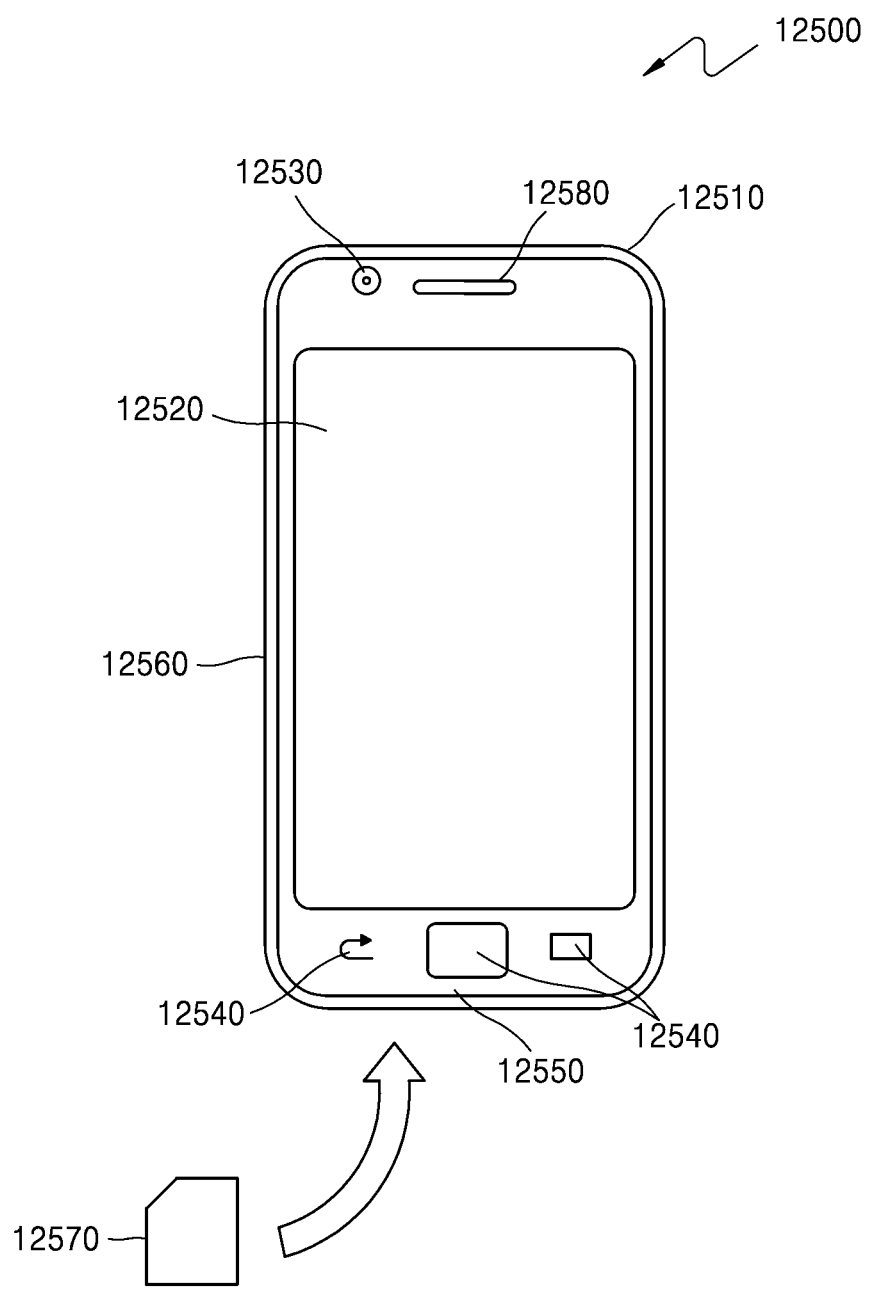
FIGS. 24 and 25 illustrate external and internal structures of a mobile phone to which a video encoding method and a video decoding method are applied, according to embodiments.
Figure 25:
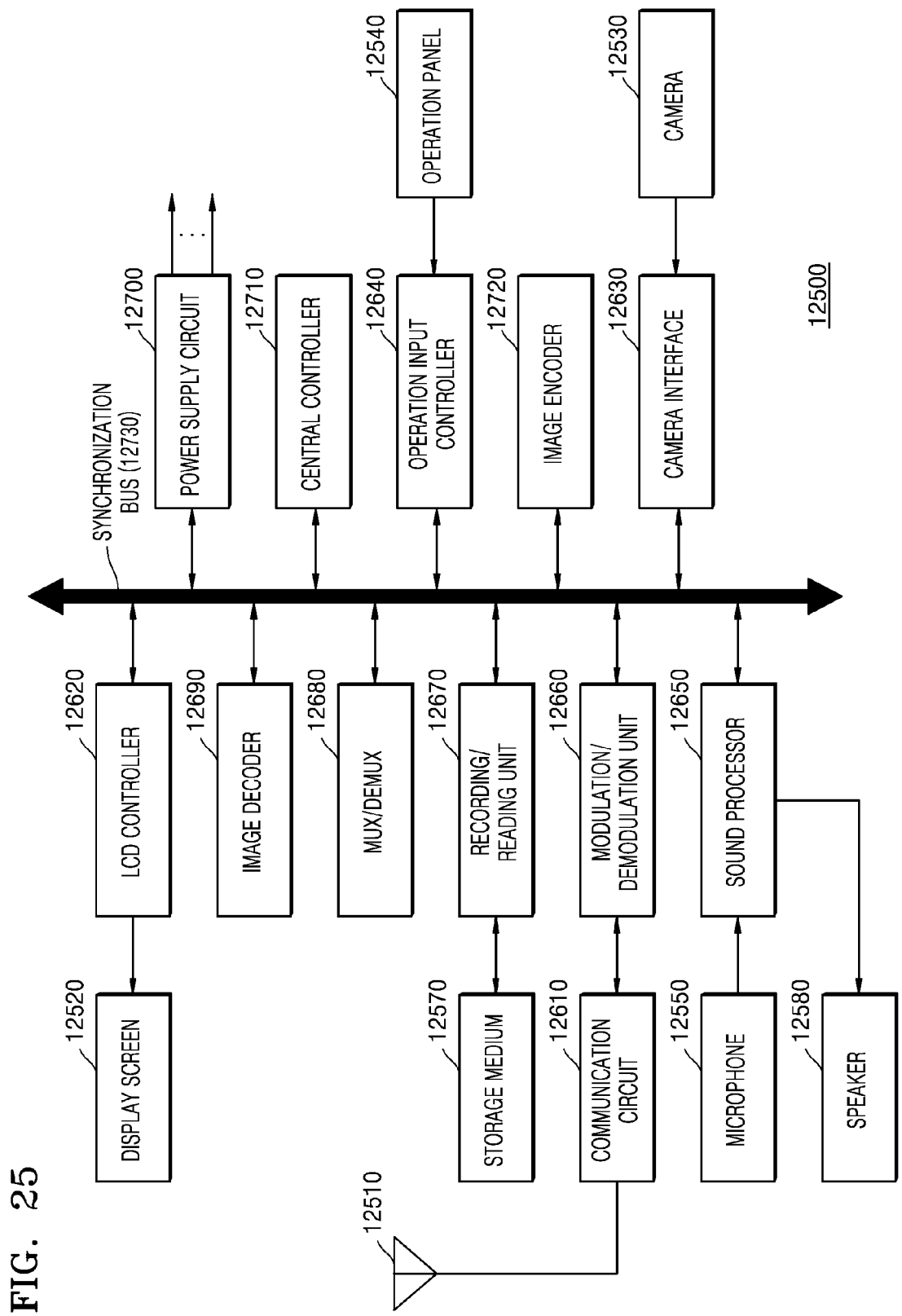

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to an embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen.

The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory, e.g., a secure digital (SD) card or an electrically erasable and programmable read only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random access memory (RAM).

While the mobile phone 12500 transmits communication data to the outside, a digital signal is generated by the mobile phone 12500 under control of the central controller 12710. For example, the sound processor 12650 may generate a digital sound signal, the video encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., email, is transmitted during a data communication mode, text data of the text message is input via the operation panel 12540 and is transmitted to the central controller 12610 via the operation input controller 12640. By control of the central controller 12610, the text data is transformed into a transmission signal via the modulation/demodulation unit 12660 and the communication circuit 12610 and is transmitted to the wireless base station 12000 via the antenna 12510.

In order to transmit image data during the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the video decoder 12690, the sound processor 12650, or the LCD controller 12620, according to the type of the digital signal.

During the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When during the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the video decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transmitting terminal including only the video encoding apparatus, or may be a receiving terminal including only the video decoding apparatus.

Figure 26:
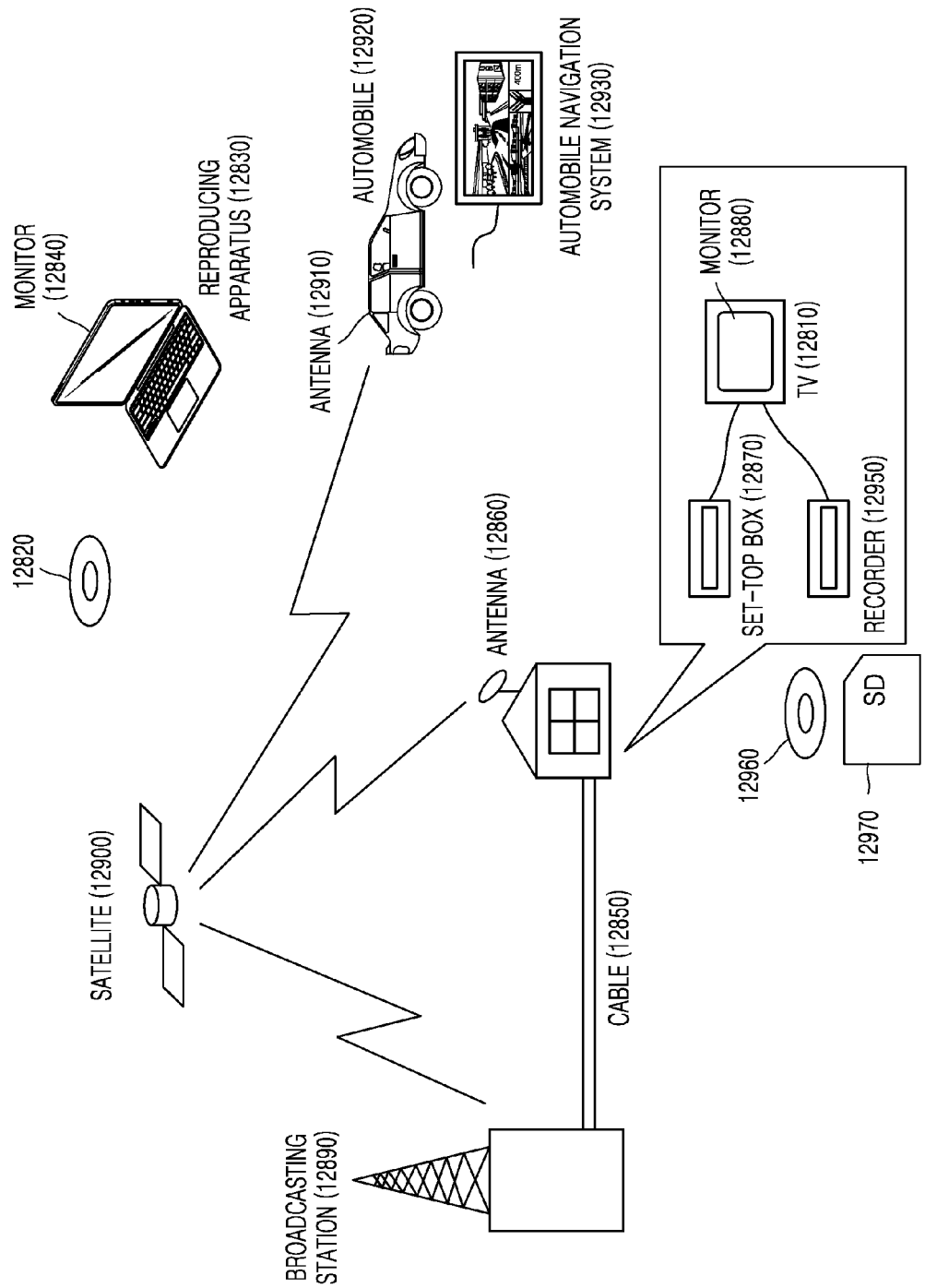
FIG. 26 illustrates a digital broadcasting system employing a communication system according to the present invention.

A communication system according to an embodiment is not limited to the communication system described above with reference to FIG. 24. For example, FIG. 26 illustrates a digital broadcasting system employing a communication system, according to an embodiment. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the exemplary embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be stored in a storage medium. In more detail, an image signal may be stored in a DVD disc 12960 by a DVD recorder or may be stored in a hard disc by a hard disc recorder 12950. As another example, the video signal may be stored in an SD card 12970. If the hard disc recorder 12950 includes the video decoding apparatus according to the exemplary embodiment, a video signal recorded on the DVD disc 12960, the SD card 12970, or another storage medium may be reproduced on the TV monitor 12880.

The automobile navigation system 12930 may not include the camera 12530, the camera interface 12630, and the image encoder 12720 of FIG. 26. For example, the computer 12100 and the TV receiver 12810 may not include the camera 12530, the camera interface 12630, and the image encoder 12720 of FIG. 26.

Figure 27:
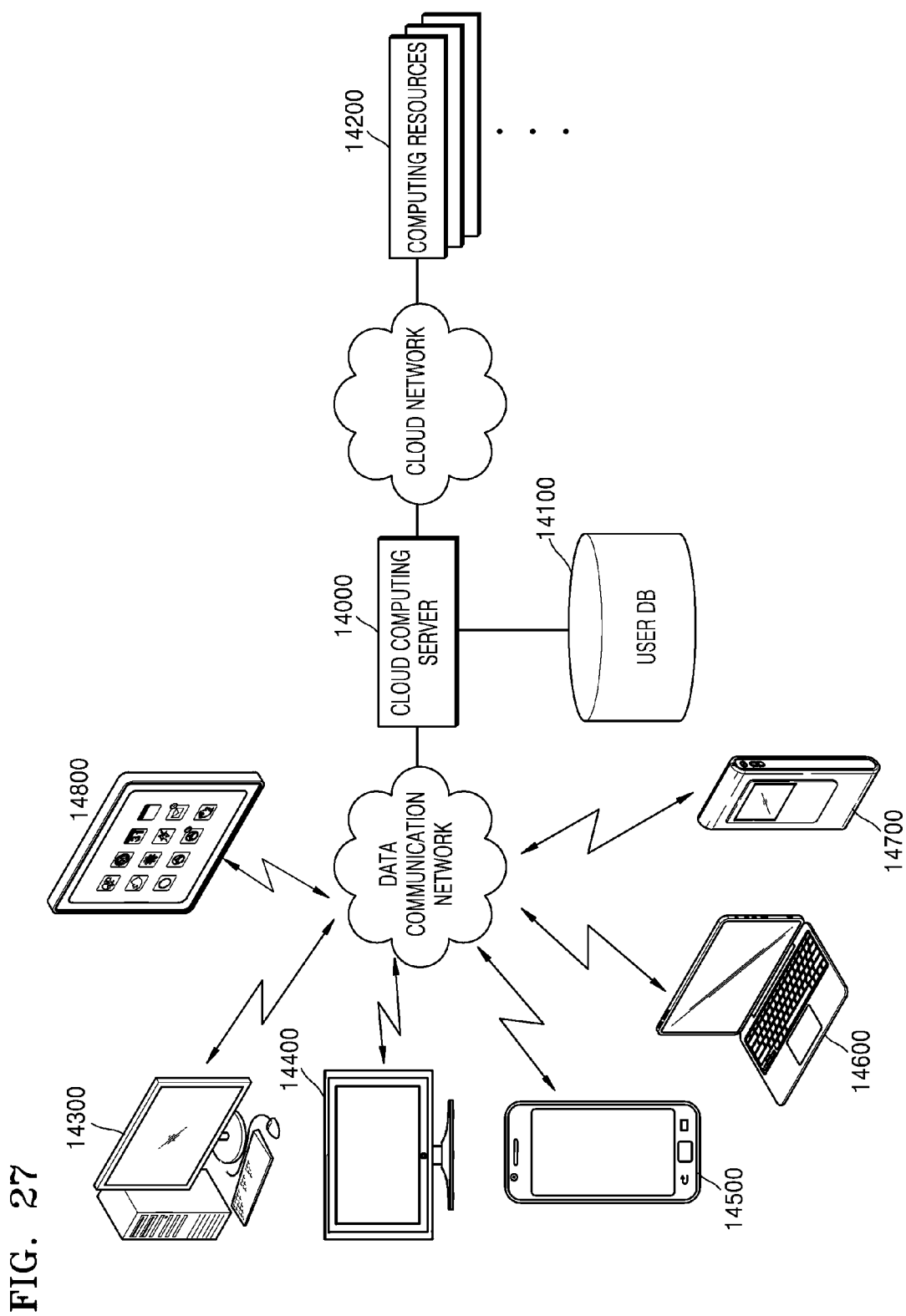
FIG. 27 illustrates a network structure of a cloud computing system using a video encoding apparatus and a video decoding apparatus, according to an embodiment of the present invention.

FIG. 27 is a diagram illustrating a network structure of a cloud computing system using a video encoding apparatus and a video decoding apparatus, according to an embodiment.

The cloud computing system may include a cloud computing server 14100, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of the video encoding method, the video decoding method, the video encoding apparatus, and the video decoding apparatus according to the exemplary embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to the exemplary embodiments described above with reference to FIGS. 21 through 27.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

The invention claimed is:

1. An inter-layer video decoding method implemented by a processor, the method comprising:
    reconstructing, by the processor, a color image and a depth image of a first layer based on encoding information about the color image and the depth image of the first layer obtained from a bitstream;
    when it is determined that a prediction mode of a current block of a second layer image to be decoded is a view synthesized prediction mode wherein prediction is performed based on an image synthesized from the first layer image, determining, by the processor, whether to perform luminance compensation on the second layer current block to be reconstructed; and
    reconstructing, by the processor, the current block by determining to apply the view synthesized prediction mode to the current block only when it is determined not to perform the luminance compensation.

2. The inter-layer video decoding method of claim 1, wherein
    the determining of the prediction mode of the current block as the view synthesized prediction mode comprises determining, by the processor, the prediction mode of the current block as the view synthesized prediction mode when a block selected for predicting the current block from among blocks temporally and spatially adjacent to the current block is decoded in the view synthesized prediction mode.

3. The inter-layer video decoding method of claim 1, further comprising:
    determining, by the processor, a depth correspondence block of the first layer by inferring an initial disparity vector for the current block, from the block selected for predicting the current block from among the blocks temporally and spatially adjacent to the current block;
    determining, by the processor, a depth value of the depth correspondence block and determining another disparity vector indicating a color correspondence block of the first layer with respect to the current block; and
    predicting, by the processor, the current block by referring to the color correspondence block of the first layer that the other disparity vector indicates.

4. The inter-layer video decoding method of claim 1, wherein
    when it is determined to perform the luminance compensation, the method further comprises determining, by the processor, not to apply the view synthesized prediction mode to the current block, and
    the inter-layer video decoding method further comprises:
    determining, by the processor, a first layer reference block corresponding to the current block by inferring a disparity vector from the block selected for predicting the current block among the blocks temporally and spatially adjacent to the current block; and
    reconstructing, by the processor, the current block by predicting the current block by using the first layer reference block.

5. The inter-layer video decoding method of claim 4, further comprising, when it is determined to perform the luminance compensation, compensating, by the processor, for a luminance difference between the first layer reference block and the second layer current block with respect to the current block.

6. An inter-layer video encoding method implemented by a processor, the method comprising:
    generating, by the processor, a bitstream including encoding information generated by encoding a color image and a depth image of a first layer;
    when it is determined that a prediction mode of a current block of a second layer image to be encoded is a view synthesized prediction mode wherein a current block is predicted based on an image synthesized from the first layer, determining, by the processor, whether to perform luminance compensation on the second layer current block to be reconstructed; and
    determining, by the processor, to apply the view synthesized prediction mode to the current block only when it is determined not to perform the luminance compensation.

7. The inter-layer video encoding method of claim 6, wherein
    the determining of the prediction mode of the current block as the view synthesized prediction mode comprises determining, by the processor, the prediction mode of the current block as the view synthesized prediction mode when a block selected for predicting the current block from among blocks temporally and spatially adjacent to the current block is decoded in the view synthesized prediction mode.

8. The inter-layer video encoding method of claim 6, further comprising:
determining, by the processor, a depth correspondence block of the first layer by inferring an initial disparity vector for the current block, from the block selected for predicting the current block from among the blocks temporally and spatially adjacent to the current block;
determining, by the processor, a depth value of the depth correspondence block and determining another disparity vector indicating a color correspondence block of the first layer with respect to the current block; and
predicting, by the processor, the current block by referring to the color correspondence block of the first layer that the other disparity vector indicates.

9. The inter-layer video encoding method of claim 6, wherein when it is determined to perform the luminance compensation, the method further comprises determining, by the processor, not to apply the view synthesized prediction mode to the current block, and
the inter-layer video encoding method further comprises:
determining, by the processor, a first layer reference block corresponding to the current block by inferring a disparity vector from the block selected for predicting the current block among the blocks temporally and spatially adjacent to the current block; and
reconstructing, by the processor, the current block by predicting the current block by using the first layer reference block.

10. The inter-layer video encoding method of claim 9, further comprising, when it is determined to perform the luminance compensation, compensating, by the processor, for a luminance difference between the first layer reference block and the second layer current block with respect to the current block.

11. An inter-layer video decoding apparatus comprising:
a processor configured to reconstruct a color image and a depth image of a first layer based on encoding information about the color image and the depth image of the first layer obtained from a bitstream;
when it is determined that a prediction mode of a current block of a second layer image to be decoded is a view synthesized prediction mode wherein prediction is performed based on an image synthesized from a first layer image, determine whether to perform luminance compensation on the second layer current block to be reconstructed; and
reconstruct the current block by determining to apply the view synthesized prediction mode to the current block only when it is determined not to perform the luminance compensation.

* * * * *